(12) United States Patent
Kim

(10) Patent No.: US 8,880,044 B2
(45) Date of Patent: Nov. 4, 2014

(54) MOBILE TERMINAL AND METHOD OF DISPLAYING INFORMATION THEREIN

(75) Inventor: Jong Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 812 days.

(21) Appl. No.: 12/359,867

(22) Filed: Jan. 26, 2009

(65) Prior Publication Data

US 2009/0247234 A1  Oct. 1, 2009

(30) Foreign Application Priority Data

Mar. 25, 2008 (KR) .................. 10-2008-0027336

(51) Int. Cl.
*H04L 29/08* (2006.01)
*G06F 3/0488* (2013.01)
*G06F 3/0482* (2013.01)
*G06F 3/041* (2006.01)

(52) U.S. Cl.
CPC ............ *G06F 3/041* (2013.01); *G06F 3/04886* (2013.01); *G06F 3/0482* (2013.01); *G06F 3/04883* (2013.01)
USPC ..................... 455/414.4; 455/414.1; 455/466; 455/418; 715/793; 715/802; 715/810; 345/418; 345/475; 345/155

(58) Field of Classification Search
CPC ... G06F 3/0488; G06F 3/0416; G06F 3/0482; G06F 3/017; H04M 2250/22; H04M 1/72519; H04M 1/72583; G09G 2354/00; G09G 2356/00; G09G 2370/04
USPC ............... 455/566, 414.1, 466; 345/594, 657, 345/173; 715/700
See application file for complete search history.

(56) References Cited

U.S. PATENT DOCUMENTS

| | | | |
|---|---|---|---|
| 6,771,291 B1 * | 8/2004 | DiStefano, III ............... | 715/762 |
| 2001/0012001 A1 * | 8/2001 | Rekimoto et al. ............ | 345/173 |
| 2004/0070573 A1 * | 4/2004 | Graham ........................ | 345/179 |
| 2004/0174399 A1 * | 9/2004 | Wu et al. ....................... | 345/863 |
| 2006/0066588 A1 * | 3/2006 | Lyon et al. .................... | 345/173 |
| 2006/0161871 A1 * | 7/2006 | Hotelling et al. ............. | 715/863 |
| 2007/0250566 A1 * | 10/2007 | Appelman et al. ............ | 709/204 |
| 2008/0201438 A1 * | 8/2008 | Mandre ......................... | 709/206 |
| 2009/0128498 A1 * | 5/2009 | Hollemans et al. ........... | 345/173 |

FOREIGN PATENT DOCUMENTS

| | | |
|---|---|---|
| CN | 1331815 | 1/2002 |
| JP | 2008-009759 | 1/2008 |
| KR | 10-2007-0052849 | 5/2007 |
| WO | 2007/089766 | 8/2007 |

* cited by examiner

*Primary Examiner* — Quan M Hua
(74) *Attorney, Agent, or Firm* — Lee, Hong, Degerman, Kang & Waimey

(57) ABSTRACT

A mobile terminal is presented. The mobile terminal includes a display including a touchscreen, and a controller for performing an editing operation on information displayed on the touchscreen according to a state of an object in near-proximity to the displayed information.

10 Claims, 62 Drawing Sheets

```
        ┌─────────────────────────┐
        │  ◄      Data search   ► │
        ├─────────────────────────┤
1510 ──── 1. First data         □ │
        │ 2. Second data         □ │
1511 ──── 3. Third data         ☑ │
        │ 4. Fourth data         □ │
        │ 5. Fifth data          □ │
        │ 6. Sixth data          □ │
        │ 7. Seventh data        □ │
        └─────────────────────────┘
```

FIG. 21B

```
        ┌─────────────────────────┐
        │  ◄                    ► │
        ├─────────────────────────┤
1510 ──── 1. First data         □ │
        │ 2. Sec ┌─────────────┐ □ │
1511 ──── 3. Thi │ 1. Copy    □│ ☑ │
        │ 4. Fou │ 2. Cut     □│ □ │
        │ 5. Fif │ 3. Delete  □│ □ │
        │ 6. Six │ 4. Transmission □│ □ │
        │ 7. Sev │ 5. Edition □│ □ │
        │        │ 6. Upload  □│   │
        │        │ 7. Store   □│──── 1530
        │        └─────────────┘   │
        └─────────────────────────┘
```

| | Data search | |
|---|---|---|
| | 1. First data | ☐ |
| | 2. Second data | ☐ |
| 6011 — | 3. Third data | ☑ |
| | 4. Fourth data | ☐ |
| | 5. fifth data | ☐ |
| | 6. Sixth data | ☐ |
| | 7. Seventh data | ☐ |

FIG. 61A

| | Data search | |
|---|---|---|
| | 1. First data | ☐ |
| | 2. Second data | ☐ |
| 6011 — | 3. Third data | ☑ |
| | 4. Fourth data | 1.Copy |
| | 5. fifth data | 2.Cut |
| | 6. Sixth data | 3.Delete |
| | 7. Seventh data | |

```
  ◄        Data search         ►
  1. First data                □
  2. Second data               □
6011 — 3. Third data           ☑
  4. Fourth data               □
  5. fifth data                □
  6. Sixth data                □
  7. Seventh data              □
```

FIG. 62C

```
  ◄        Data search         ►
  1. First data                □
  2. Second data               □
  3. Fourth data               □
  4. fifth data                □
  5. Sixth data                □
  6. Seventh data              □
  7. Eighth data               □
```

MOBILE TERMINAL AND METHOD OF DISPLAYING INFORMATION THEREIN

CROSS-REFERENCE TO RELATED APPLICATIONS

Pursuant to 35 U.S.C. §119(a), this application claims the benefit of earlier filing date and right of priority to Korean Application No. 10-2008-0027336, filed on Mar. 25, 2008, the contents of which are hereby incorporated by reference herein in their entirety.

BACKGROUND OF THE INVENTION

1. Field of the Invention

The present invention relates to a mobile terminal including a touchscreen and specifically to a method of selecting information on a touchscreen.

2. Discussion of the Related Art

A mobile terminal is a device which may be configured to perform various functions. Examples of such functions include data and voice communications, capturing images and video via a camera, recording audio, playing music files via a speaker system, and displaying images and video on a display. Some mobile terminals include additional functionality which supports game playing, while other mobile terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components which form the mobile terminal.

According to the prior art, a mobile terminal including a touchscreen senses a touch operation of a user on the touchscreen, making it possible to display or select the corresponding information.

However, an input operation and an output operation associated with the touchscreen cannot be performed when the prior art mobile terminal does not receive a direct touch of the user on the touchscreen.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings Accordingly, the present invention is directed to a mobile terminal and a method sensing a proximity-touch and a proximity-touch pattern on a touchscreen to be able to perform selecting operation corresponding to the sensed proximity-touch and proximity-touch pattern.

To achieve the object, a mobile terminal according to the present invention includes a display including a touchscreen and a controller for performing an editing operation on information displayed on the touchscreen according to a state of an object in near-proximity to the displayed information.

In one feature, the editing operation includes at least one of copying, cutting, deleting, and pasting. The mobile terminal further includes a sensing unit for sensing the object in near-proximity to the displayed information. Additionally, the controller performs the editing operation on information displayed on the touchscreen according to at least one of a duration of the object near the information, position of the object relative to the information, distance of the object away from the information, and movement of the object relative to the information. The information includes at least one of a menu icon, a data list, a keypad image, a still picture, a moving picture, a web page, a map image, text, user created content, video communication related information, and instant messaging service related information.

In another feature, the controller controls the touchscreen to display a plurality of editing operations related to the information. Additionally, the controller performs an editing operation according to a state of the object in near-proximity to the displayed editing operation. Furthermore, the controller selects information displayed on the touchscreen according to a state of an object in near-proximity to the displayed information and performs the editing operation on the selected information. The controller selects a specific portion of the selected information according a state of the object in near-proximity to the specific portion.

In yet another feature, the controller identifiably displays information on the touchscreen according to the state of the object in near-proximity to the displayed information, the controller visually changes the displayed information on the touchscreen to verify that the displayed information is to be selected according to the state of the object in near-proximity to the displayed information. Additionally, the controller alters a size of the displayed information according to the state of the object in near-proximity to the displayed information. Furthermore, the controller alters a color of the displayed information according to the state of the object in near-proximity to the displayed information. Finally, the controller outputs a sound to verify that the displayed information is to be selected according to the state of the object in near-proximity to the displayed information.

In still yet another feature, the controller visually changes the displayed information on the touchscreen to verify that the displayed information is to have an editing operation performed according to the state of the object in near-proximity to the displayed information. Additionally, the controller gradually selects other information displayed on the touchscreen according to the state of the object in near-proximity to the displayed information.

In another embodiment an information selection method is presented. The method includes displaying information on a touchscreen and performing an editing operation on the information displayed on the touchscreen according to a state of an object in near-proximity to the displayed information.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

FIGS. 53-59 illustrate the information editing process in the mobile terminal according to one embodiment of the present invention when the information are menu icons.

FIGS. 60-66 illustrate the information editing process in the mobile terminal according to the one embodiment of the present invention when the information is data lists.

DETAILED DESCRIPTION OF PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

By way of non-limiting example only and for convenience and conciseness of the following description, the present invention is illustrated as a mobile phone. It is not intended to limit the scope of the present invention. The teachings of the present invention apply equally to other types of terminals.

Figure 1:
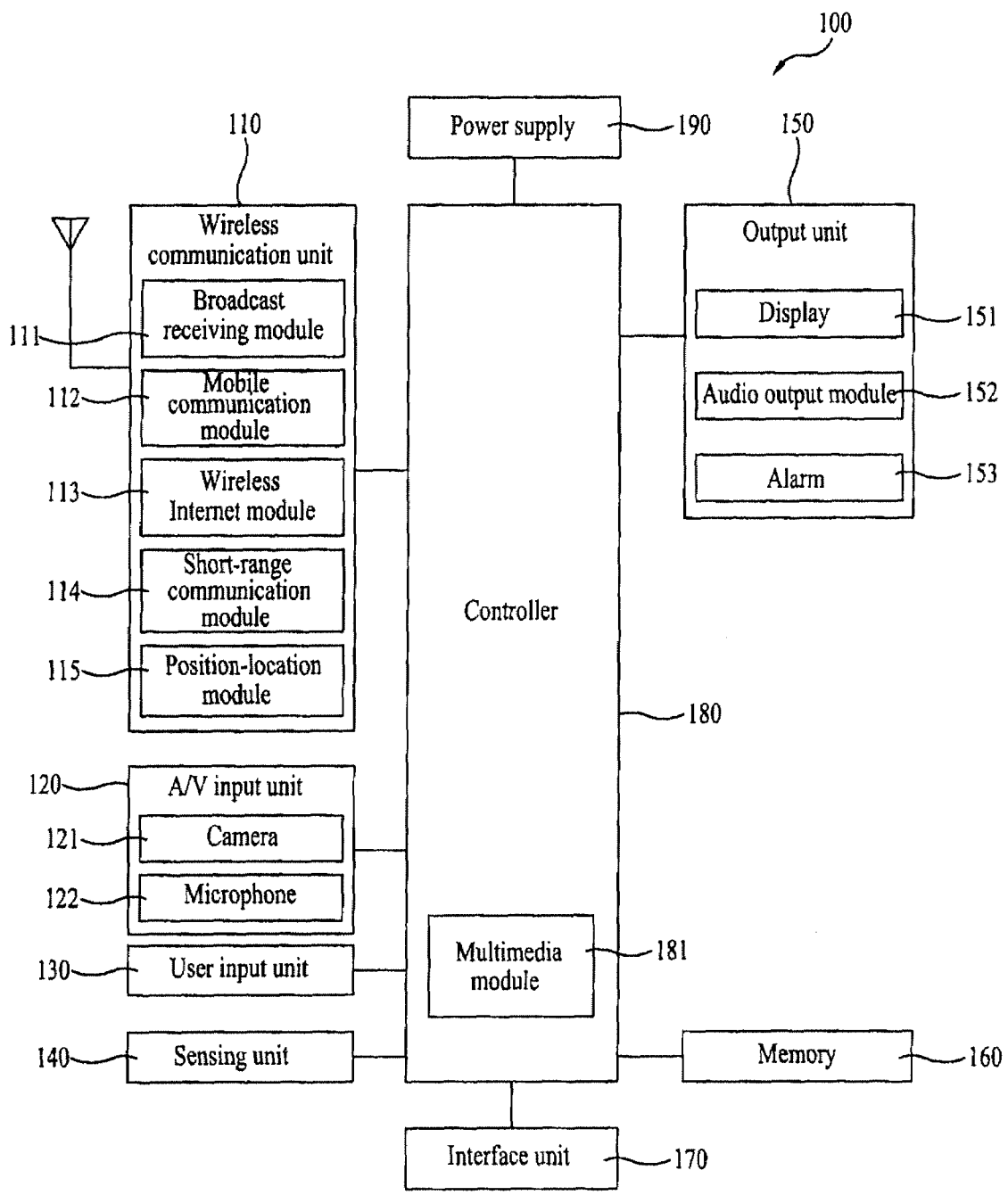
FIG. 1 is a block diagram of a mobile terminal in accordance with an embodiment of the present invention.

FIG. 1 is a block diagram of a mobile terminal 100 in accordance with an embodiment of the present invention. The mobile terminal 100 may be implemented as a variety of terminal types. Examples of such terminals include mobile phones, user equipment, smart phones, computers, digital broadcast terminals, personal digital assistants, portable multimedia players (PMP), and navigators.

FIG. 1 is a block diagram of a mobile terminal 100 in accordance with an embodiment of the present invention. The mobile terminal 100 may be implemented as a variety of terminal types. Examples of such terminals include mobile phones, user equipment, smart phones, computers, digital broadcast terminals, personal digital assistants, portable multimedia players (PMP), and navigators.

By way of non-limiting example only and for convenience and conciseness of the following description, the present invention is illustrated as a mobile phone. It is not intended to limit the scope of the present invention. The teachings of the present invention apply equally to other types of terminals FIG. 1 shows the terminal 100 having various components, but it is understood that implementing all of the illustrated components is not a requirement. Greater or fewer components may alternatively be implemented.

FIG. 1 shows a wireless communication unit 110 configured with various components. For example, the wireless communication unit 110 typically includes one or more components which permit wireless communication between the mobile terminal 100 and a wireless communication system or network within which the mobile terminal is located. In case of non-mobile terminals, the wireless communication unit 110 may be replaced with a wired communication unit. The wireless communication unit 110 and wired communication unit may be commonly referred to as a communication unit.

A broadcast receiving module 111 receives a broadcast signal and broadcast associated information from an external broadcast managing entity via a broadcast channel. The broadcast channel may include a satellite channel or a terrestrial channel. The broadcast managing entity may be a system which transmits a broadcast signal or broadcast associated information.

Examples of broadcast associated information include information associated with a broadcast channel, a broadcast program, or a broadcast service provider. For example, broadcast associated information may include an electronic program guide (EPG) of digital multimedia broadcasting (DMB) or electronic service guide (ESG) of digital video broadcast-handheld (DVB-H).

The broadcast signal may be implemented as a TV broadcast signal, a radio broadcast signal, or a data broadcast signal. The broadcast signal may further include a broadcast signal combined with a TV or radio broadcast signal.

The broadcast receiving module 111 may receive broadcast signals transmitted from various types of broadcast systems. By nonlimiting example, such broadcasting systems include digital multimedia broadcasting-terrestrial (DMB- T), digital multimedia broadcasting-satellite (DMB-S), digital video broadcast-handheld (DVB-H), the data broadcasting system known as media forward link only (MediaFLO®), and integrated services digital broadcast-terrestrial (ISDB-T).

The broadcast receiving module may also receive multicast signals. Data received by the broadcast receiving module 111 may be stored in a suitable device, such as a memory 160.

The mobile communication module 112 transmits and receives wireless signals to and from one or more network entities, such as a base station or a Node-B. The wireless signals may represent audio, video, multimedia, control signaling, or data.

The wireless Internet module 113 provides Internet access for the terminal. The wireless Internet module 113 may be internally or externally coupled to the terminal 100. Suitable technologies for wireless Internet may include, but are not limited to, WLAN (Wireless LAN) (Wi-Fi), Wibro (Wireless broadband), Wimax (World Interoperability for Microwave Access), and HSDPA (High Speed Downlink Packet Access). The wireless Internet module can be replaced with a wired Internet module in non-mobile terminals. The wireless Internet module 113 and wired Internet module may be commonly referred to as an Internet module.

The short-range communication module 114 facilitates short-range communications. Suitable technologies for implementing this module include radio frequency identification (RFID), infrared data association (IrDA), ultra-wideband (UWB), as well as the networking technologies commonly referred to as Bluetooth™ and ZigBee™.

The position-location module 115 identifies and obtains the location of the terminal 100. The position-location module 115 may be implemented using global positioning system (GPS) components which cooperate with associated satellites and network components.

The audio/video (A/V) input unit 120 provides audio or video signal input to the terminal 100. The A/V input unit 120 may include a camera 121 and a microphone 122. The camera 121 receives and processes image frames of still pictures or video.

The microphone 122 receives an external audio signal while the portable device is in a particular mode, such as a phone call mode, a recording mode, or a voice recognition mode. The audio signal is processed and converted into digital data. The terminal 100 and A/V input unit 120 may include assorted noise removing algorithms to remove noise generated in the course of receiving the external audio signal.

Data generated by the A/V input unit 120 may be stored in the memory 160, utilized by the output unit 150, or transmitted via one or more modules of communication unit 110. The terminal 100 may include two or more microphones and cameras.

The user input unit 130 generates input data in response to user manipulation of an associated input device or devices. Examples of such devices include a keypad, a dome switch, a touchpad, a jog wheel, and a jog switch.

The sensing unit 140 provides status measurements for various aspects of the terminal 100. For example, the sensing unit may detect an open and closed state of the terminal 100, relative positioning of components of the terminal, a change of position of the terminal, a change of position of a component of the terminal, a presence or absence of user contact with the terminal, orientation of the terminal, or acceleration or deceleration of the terminal. The sensing unit 140 may also sense the presence or absence of power provided by the power supply 190 and the presence or absence of a connection between the interface unit 170 and an external device.

The interface unit 170 may be implemented to connect the terminal with an external device. External devices include wired or wireless headphones, external chargers, power supplies, storage devices configured to store data, or microphones. The interface unit 170 may be configured using a wired and wireless data port, audio input/output (I/O) ports, or video (I/O) ports. The interface unit 170 may also include a card socket for connecting various cards, such as a memory card, a subscriber identity module (SIM) card, a user identity module (UIM) card, or a replaceable user identity module (RUIM) card.

The output unit 150 outputs information associated with the terminal 100. The display 151 is typically implemented to display information associated with the terminal 100. For example, the display 151 may provide a graphical user interface which includes information associated with a phone call if the terminal is operating in a phone call mode. The display 151 may display images which are associated with various modes, such as a video call mode or a photographing mode.

The display 151 may be configured as a touch screen working in cooperation with the input unit 130, in one embodiment of the present invention. This configuration allows the display 151 to function both as an output device and an input device.

The display 151 may be implemented using known display technologies such as a liquid crystal display (LCD), a thin film transistor-liquid crystal display (TFT-LCD), an organic light-emitting diode display (OLED), a flexible display, or a three-dimensional display. The terminal 100 may include one or more of such displays. An example of a two-display embodiment is one in which one display 151 is configured as an internal display which is viewable when the terminal is in an opened position and a second display 151 configured as an external display which is viewable in both the open and closed positions.

FIG. 1 further shows the output unit 150 having an audio output module 152. The audio output module 152 may be implemented using one or more speakers, buzzers, or other audio producing devices.

The audio output module 152 functions in various modes including a call-receiving mode, a call-placing mode, a recording mode, a voice recognition mode, or a broadcast reception mode. The audio output module 152 outputs audio related to a particular function, such as a call notification, a message notification, or an error notification.

The output unit 150 is further illustrated having an alarm module 153, which may be used to identify the occurrence of an event associated with the mobile terminal 100. An example of such output includes providing a vibration as a notification to a user.

The alarm module 153 may vibrate when the terminal 100 receives a call or message. Vibration may also be provided by the alarm module 153 in response to receiving user input at the terminal 100, thereby providing a tactile feedback mechanism. It is understood that the various outputs provided by the components of output unit 150 may be performed separately or performed using any combination of the components.

A memory 160 may store various types of data to support the processing, control, and storage requirements of the mobile terminal 100. Examples of such data include program instructions for applications operating on the mobile terminal 100, contact data, phonebook data, messages, pictures, and video.

Additionally, data for various patterns of vibration and sound output in response to a touch input on the touchscreen may be stored in the memory 160. Details of the various patterns of vibration and sound will be explained below.

The memory 160 may be implemented using any type of volatile and non-volatile memory or storage devices. Such devices may include random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 controls the overall operations of the terminal. For example, the controller 180 performs the control and processing associated with voice calls, data communications, video calls, camera operations, and recording operations.

The controller may include a multimedia module 181 which provides multimedia playback. The multimedia module 181 may be configured as part of the controller 180 or may be implemented as a separate component The power supply 190 provides power to the various components of the terminal 100. The power provided may be internal power or external power.

Various embodiments described herein may be implemented in a computer-readable medium using computer software. The various embodiments may also be implemented in hardware.

A hardware implementation may be implemented using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electronic units designed to perform the functions described herein. Some embodiments are implemented by a controller 180

A software implementation of the embodiments described herein may be implemented with separate software modules, such as procedures and functions, each of which perform one or more of the functions and operations described herein. The software code may be implemented with a software application written in any suitable programming language and may be stored in the memory 160 for execution by the controller 180 or a processor.

The mobile terminal 100 may be implemented in a variety of different configurations. Examples of such configurations include folder-type, slide-type, bar-type, rotational-type, and swing-type.

For clarity, further disclosure will primarily relate to a slide-type mobile terminal 100. However such teachings apply equally to other types of mobile terminals 100.

Figure 2:
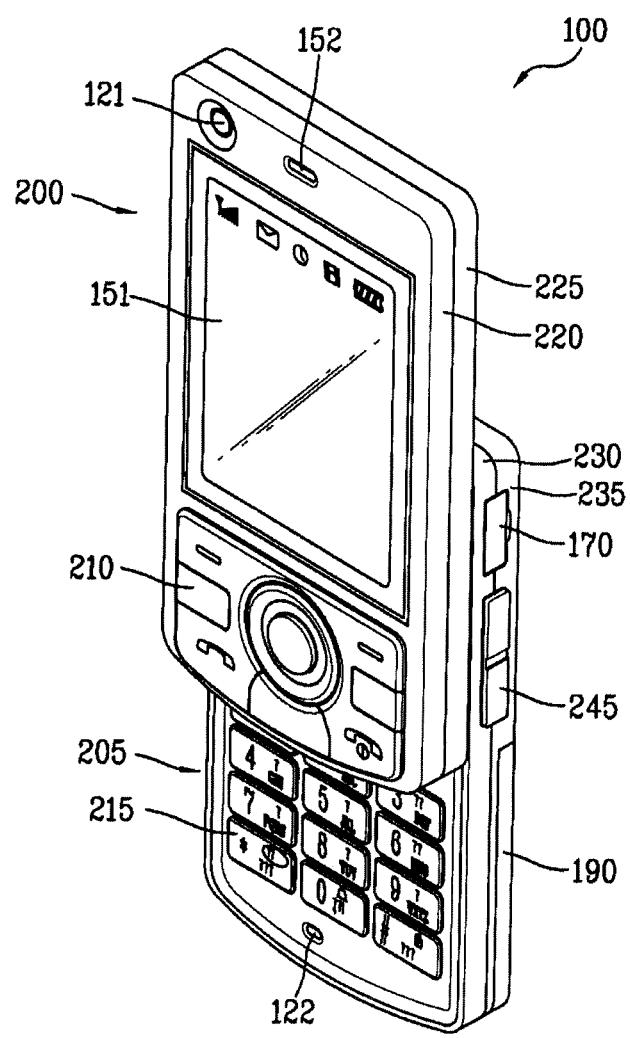
FIG. 2 illustrates a perspective view of a front side of a mobile terminal according to an embodiment of the present invention.

FIG. 2 is a perspective view of a front side of a mobile terminal 100 according to an embodiment of the present invention. As illustrated in FIG. 2, the mobile terminal 100 is shown having a first body 200 configured to slidably cooperate with a second body 205.

The user input unit 130 described in FIG. 1 may include a first input unit such as function keys and four directional keys 210, a second input unit such as keypad 215 and a third input unit such as side keys 245. The function keys 210 are associated with the first body 200, and the keypad 215 is associated with the second body 205. The keypad may include various keys such as numbers, characters, and symbols to enable a user to place a call, prepare a text or multimedia message, and otherwise operate the mobile terminal 100.

The first body 200 slides relative to the second body 205 between open and closed positions. Although not shown in drawings, in a folder-type mobile terminal, a first body thereof folds and unfolds relative to a second body thereof between open and closed positions. In addition, in a swing-type mobile terminal, a first body thereof swings relative to a second body thereof between open and closed positions.

The first body 200 is positioned over the second body 205 in the closed position such that the keypad 215 is substantially or completely obscured by the first body. The user may access the keypad 215, the display 151, and function keys 210 in the open position. The function keys 210 may be configured for a user to enter commands such as 'start', 'stop', or 'scroll'.

The mobile terminal 100 is operable in either a standby mode or an active call mode. Typically, the terminal 100 functions in the standby mode when in the closed position and in the active mode when in the open position. The mode configuration may be changed as required or desired by the user.

The first body 200 is formed from a first case 220 and a second case 225 and the second body 205 is formed from a first case 230 and a second case 235. The respective first and second cases may be formed from a suitably rigid material, such as injection molded plastic, or formed using metallic material, such as stainless steel (STS) and titanium (Ti).

One or more intermediate cases may be provided between the first case 220 and second case 225 of the first body 200 or between the first case 230 and second case 235 the second body 205. The first body 200 and the second body 205 may be sized to house electronic components necessary to support operation of the mobile terminal 100.

The first body 200 is illustrated having a camera 121 and audio output module 152. The camera 121 may be selectively positioned such that the camera may rotate or swivel relative to the first body 200.

The function keys 210 are positioned adjacent to a lower side of the display 151. The display 151 is implemented as an LCD. The display 151 may also be configured as a touchscreen having an underlying touchpad which generates signals responsive to user contact with the touchscreen.

The second body 205 is illustrated having a microphone 122 positioned adjacent to the keypad 215 and side keys 245 positioned along the side. The side keys 245 may be configured as hot keys, such that the side keys are associated with a particular function of the terminal 100.

An interface unit 170 is positioned adjacent to the side keys 245. A power supply 190 in a form of a battery is located on a lower portion of the second body 205.

Figure 3:
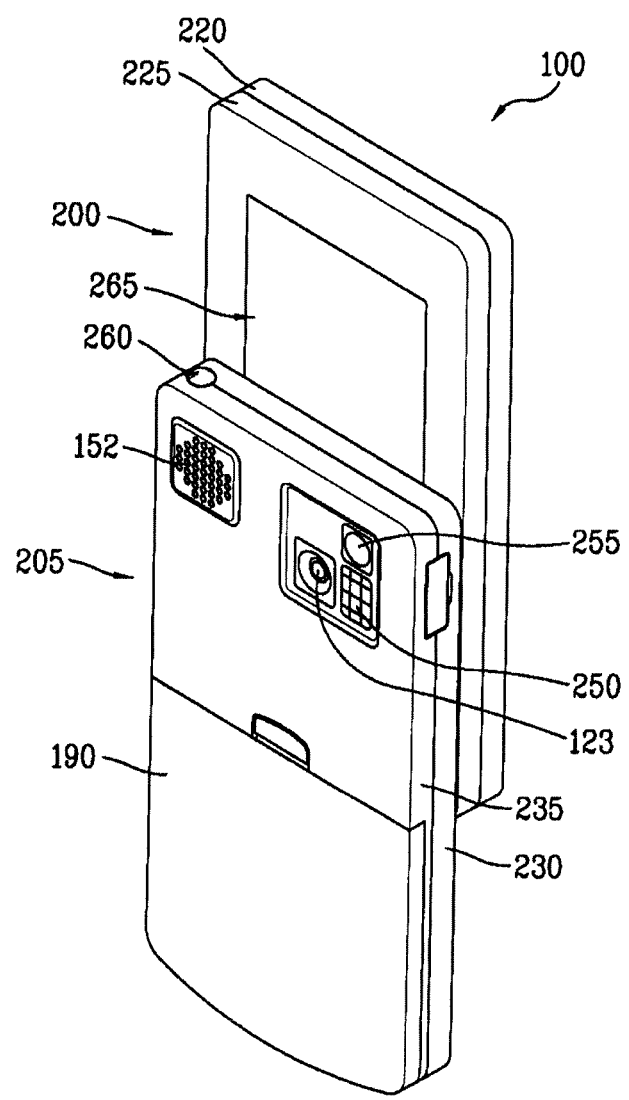
FIG. 3 illustrates a rear view of the mobile terminal shown in FIG. 2.

FIG. 3 is a rear view of the mobile terminal 100 shown in FIG. 2. As illustrated in FIG. 3, the second body 205 includes a camera 123, a flash 250, and a mirror 255.

The flash 250 operates in conjunction with the camera 123. The mirror 255 is useful for assisting a user to position the camera 123 in a self-portrait mode.

The camera 123 of the second body 205 faces a direction opposite to a direction faced by camera 121 of the first body 200. The camera 121 of the first body 200 and camera 123 of the second body 205 may have the same or different capabilities.

In one embodiment, the camera 121 of the first body 200 operates with a relatively lower resolution than the camera 123 of the second body 205. Such an arrangement works well during a video conference in which reverse link bandwidth capabilities may be limited. The relatively higher resolution of the camera 123 of the second body 205 is useful for obtaining higher quality pictures.

The second body 205 also includes an audio output module 153 configured as a speaker which is located on an upper side of the second body. The audio output module 152 of the first body 200 and the audio output module 153 of second body 205 may cooperate to provide stereo output. Moreover, either or both of the audio output modules 152 and 153 may be configured to operate as a speakerphone.

A broadcast signal receiving antenna 260 is illustrated located at an upper end of the second body 205. The antenna 260 functions in cooperation with the broadcast receiving module 111. The antenna 260 may be fixed or configured to retract into the second body 205.

The rear side of the first body 200 includes a slide module 265. The slide module 265 slideably couples with a corresponding slide module (not illustrated) located on the front side of the second body 205.

It is understood that the illustrated arrangement of the various components of the first body 200 and the second body 205 may be modified as desired. Some or all of the components of one body may alternatively be implemented on the other body. In addition, the location and relative positioning of the components are not critical to many embodiments and, therefore, the components may be positioned at locations which differ from those illustrated by the representative figures.

The mobile terminal 100 may operate in a communication system capable of transmitting data via frames or packets. The communication system may include wired communication, wireless communication, or a satellite-based communication system.

The communication system may utilize various systems such as frequency division multiple access (FDMA), time division multiple access (TDMA), code division multiple access (CDMA), universal mobile telecommunications system (UMTS), long term evolution (LTE) of the UMTS, or the global system for mobile communications (GSM). By way of non-limiting example, further description will relate to a CDMA communication system, but such teachings apply equally to other system types.

Figure 4:
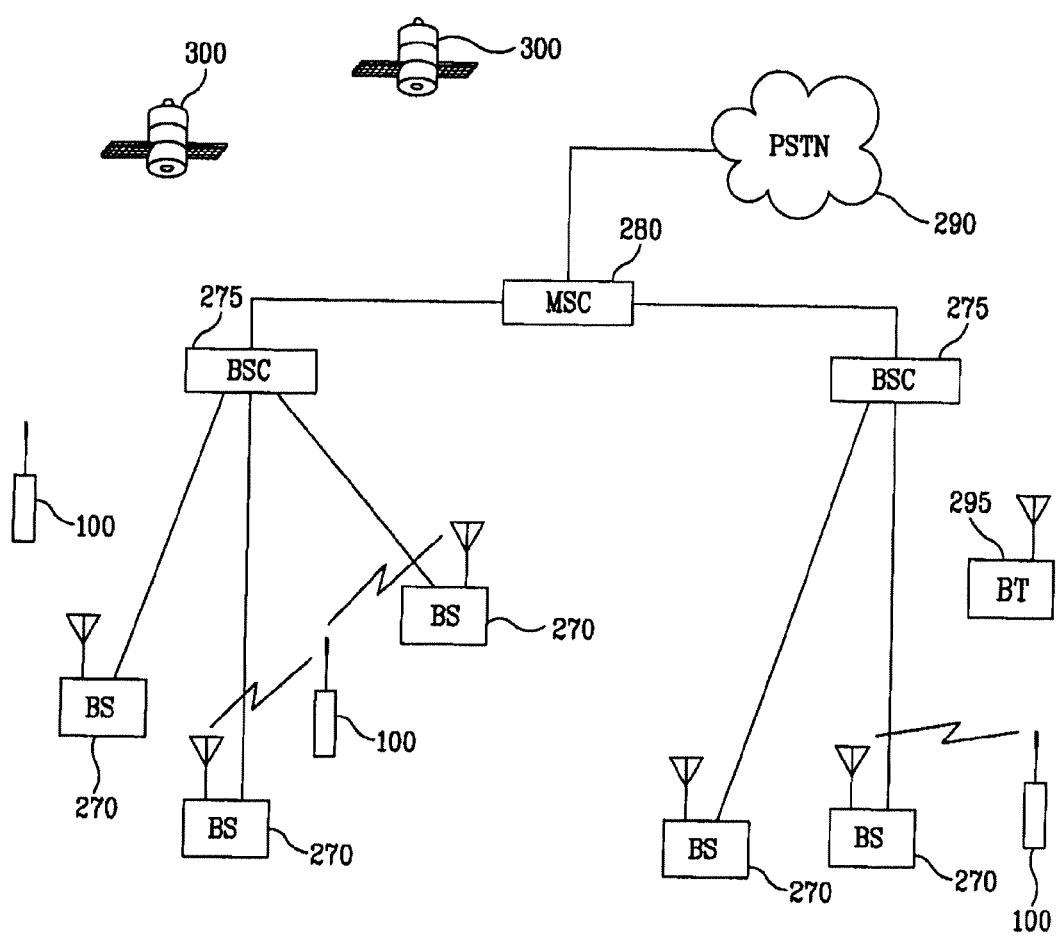
FIG. 4 illustrates a block diagram of a CDMA wireless communication system operable with the mobile terminal of FIGS. 1-3.

As illustrated in FIG. 4, a CDMA wireless communication system is illustrated having a plurality of terminals 100, a plurality of base stations (BS) 270, base station controllers (BSC) 275, and a mobile switching center (MSC) 280. The MSC 280 is configured to interface with a conventional public switch telephone network (PSTN) 290 and is also configured to interface with the BSCs 275.

The BSCs 275 are coupled to the BSs 270 via backhaul lines. The backhaul lines may be configured in accordance with any of several known interfaces including E1/T1, ATM, IP, PPP, Frame Relay, HDSL, ADSL, or xDSL. It is to be understood that the system may include more than two BSCs 275.

Each BS 270 may include one or more sectors, each sector having an omnidirectional antenna or an antenna pointed in a particular direction radially away from the BS 270. Each sector may include two antennas for diversity reception. Each BS 270 may be configured to support a plurality of frequency assignments, with each frequency assignment having a particular spectrum.

The intersection of a sector and frequency assignment may be referred to as a CDMA channel. The BSs 270 may also be referred to as base station transceiver subsystems (BTSs). In an alternate embodiment, the term "base station" may be used to refer collectively to a BSC 275 and one or more BSs 270.

The BSs 270 may also be denoted "cell sites." Alternatively, individual sectors of a given BS 270 may be referred to as cell sites.

A broadcasting transmitter (BT) 295 is illustrated broadcasting to mobile terminals 100 operating within the system. The broadcast receiving module 111 of the mobile terminal 100 is configured to receive broadcast signals transmitted by the BT 295. Similar arrangements may be implemented for other types of broadcast and multicast signaling.

FIG. 4 also shows several global positioning system (GPS) satellites 300. The GPS satellites 300 facilitate locating the position of some or all of the terminals 100. The position-location module 115 of the mobile terminal 100 is typically configured to cooperate with the satellites 300 to obtain position information.

Other types of position detection technology may be used in addition to or instead of GPS location technology. Some or all of the GPS satellites 300 may alternatively or additionally be configured to provide satellite DMB transmissions.

The BSs 270 receive sets of reverse-link signals from various terminals 100 during operation of the wireless communication system. The terminals 100 are performing calls, messaging, or other communications.

Each reverse-link signal received by a BS 270 is processed within that BS. The resulting data is forwarded to an associated BSC 275. The BSC 275 provides call resource allocation and mobility management functionality including soft handoffs between base stations 270. The BSCs 275 also route the received data to the MSC 280, which provides additional routing services for interfacing with the PSTN 290. Similarly, the PSTN 290 interfaces with the MSC 280 and the MSC interfaces with the BSC 275, which in turn control the BSs 270 to transmit sets of forward-link signals to the terminals 100.

It is assumed that the mobile terminal 100 includes a touchscreen. The touchscreen receives a direct touch from a user and may perform the corresponding information input/output operation as well as receiving a proximity-touch to perform the corresponding information input/output operation. Herein, the proximity-touch is preferably a virtual touch on a space using a pointer, such as a finger, at a predetermined distance away from the touchscreen. No contact is made with the touchscreen when the proximity-touch occurs.

The mobile terminal senses a proximity-touch and a proximity-touch pattern, such as a proximity-touch distance, a proximity-touch direction, a proximity-touch speed, a proximity-touch time, a proximity-touch position, and a proximity-touch movement state, using a proximity sensor included in the mobile terminal.

The proximity-sensor, which is a sensor for sensing the proximity-touch and the proximity-touch pattern, may be included in a sensing unit 140 illustrated in FIG. 1. For example, the proximity sensor may include a photoelectric sensor. Additionally, the proximity sensor may include a transmission photoelectric sensor, a direct reflection photoelectric sensor, and a mirror reflection photoelectric sensor, a high frequency oscillation proximity sensor, a capacitance proximity sensor, a magnetic proximity sensor, or an infrared proximity sensor.

Figure 5:
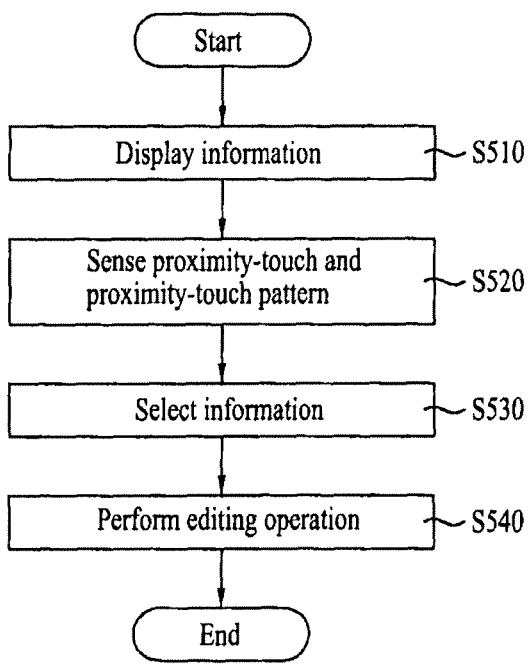
FIG. 5 illustrates a flow chart of a method of displaying information in a mobile terminal according to one embodiment of the present invention.
Figure 6:
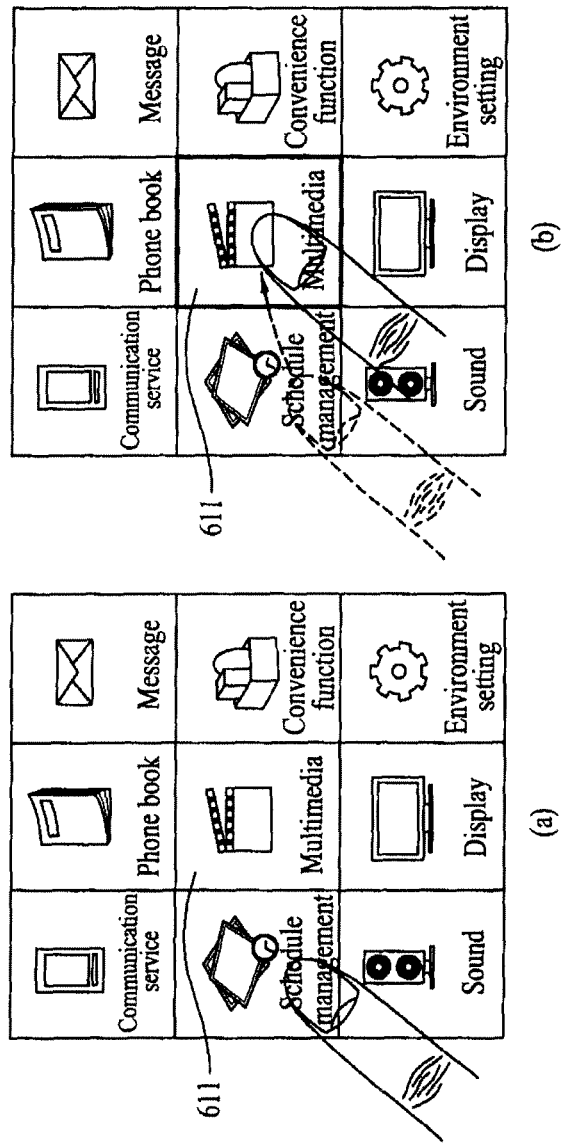
FIGS. 6-10 illustrate an information selection process in the mobile terminal according to one embodiment of the present invention when the information are upper menu icons.
Figure 7:
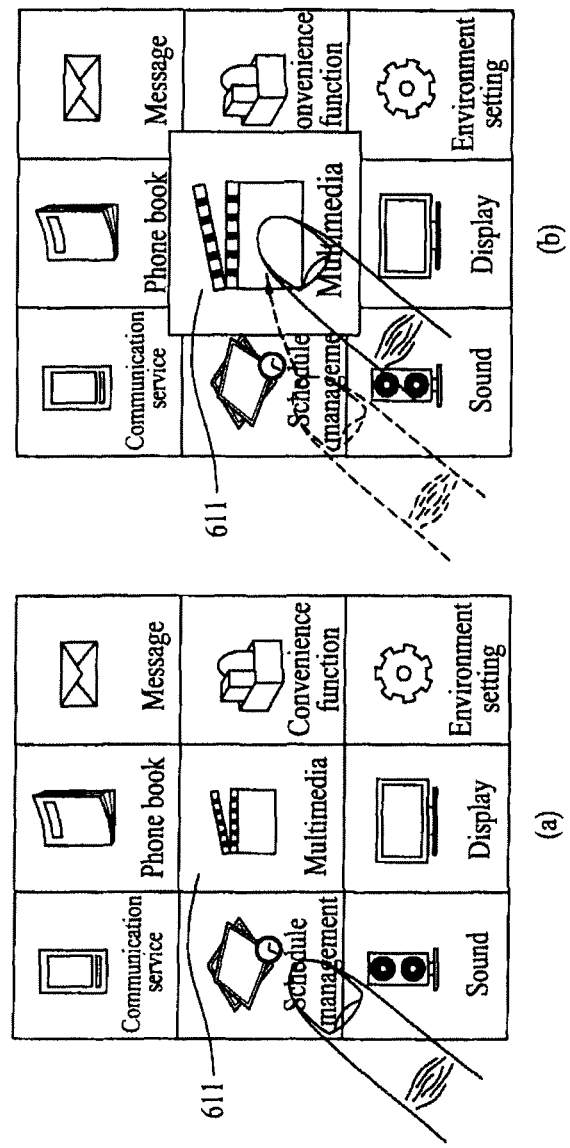
Figure 8:
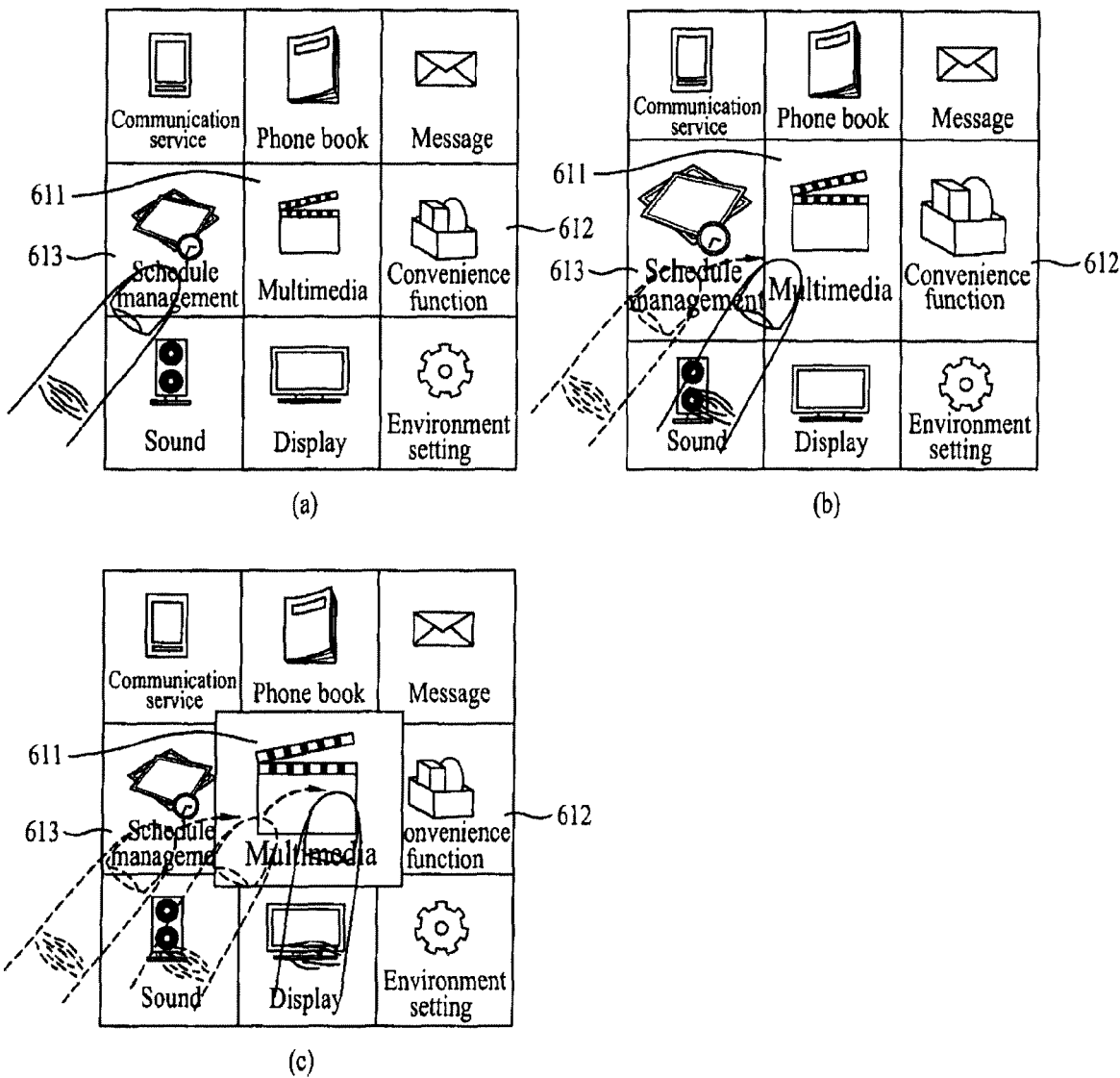
Figure 9:
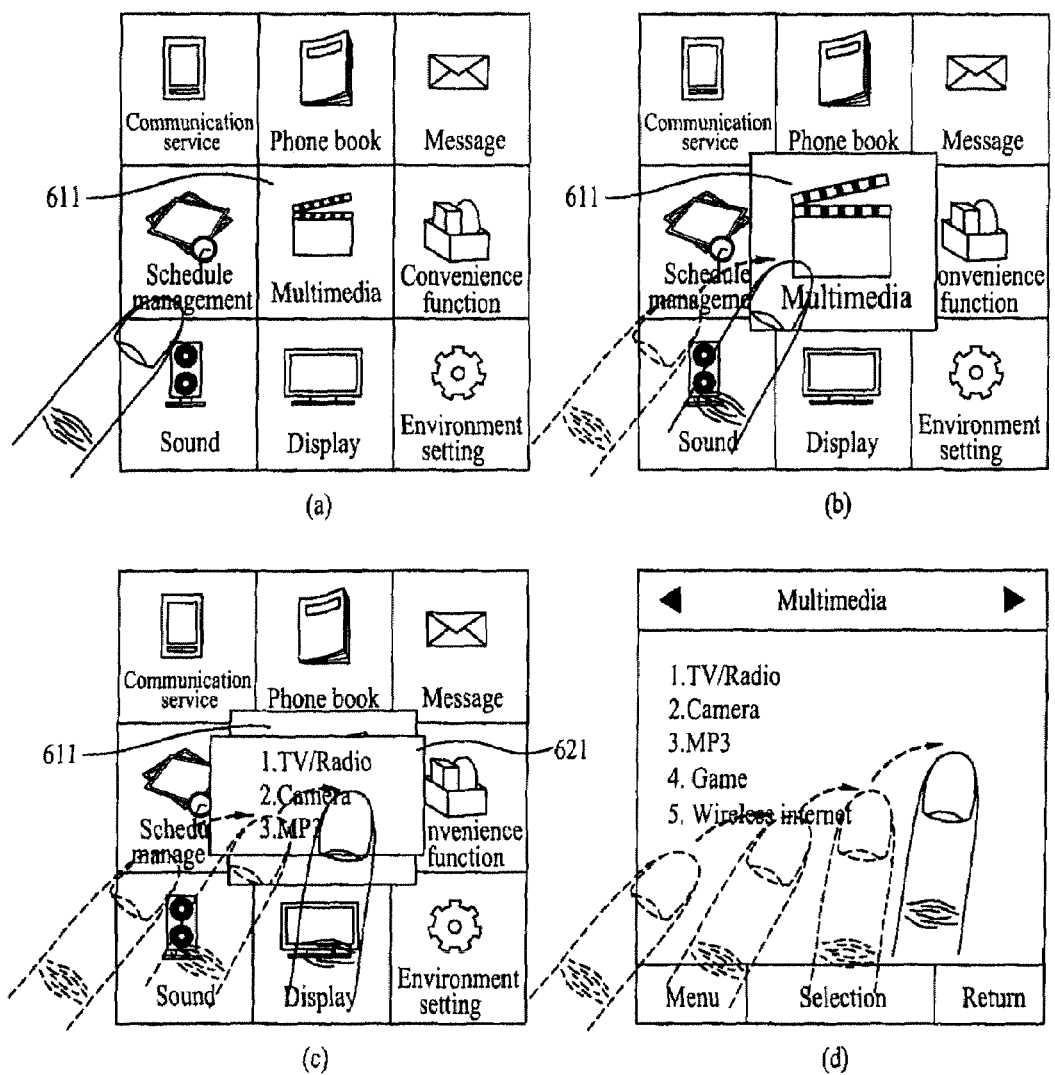

Hereinafter, referring to FIG. 5, a method of displaying information in the mobile terminal according to one embodiment the present invention is described. FIG. 5 illustrates a flow chart for a method of displaying information in the mobile terminal according to one embodiment of the present invention.

As illustrated in FIG. 5, the mobile terminal 100 displays information on the touch screen (S510). The mobile terminal 100 senses the proximity-touch and the proximity-touch pattern on the display via the proximity sensor (S520). The mobile terminal 100 selects information among the plurality of information displayed corresponding to the sensed proximity-touch pattern, when the proximity-touch and the proximity-touch pattern are sensed by the proximity sensor (S530). Finally, the mobile terminal may edit the selected information (S540).

The displayed information may include at least one of menu icons, data lists, keypads, still pictures, moving pictures, web pages, map images, texts, user created contents (UCCs), video communication related information, and instant messaging service related information.

The proximity-touch pattern may include at least one of the proximity-touch distance, the proximity-touch direction, the proximity-touch speed, the proximity-touch time, the proximity-touch position, and the proximity-touch movement state, such as vibration, continuity of touch, or discontinuity of touch.

The selecting step S530 may be performed by a controller 180. For example, information may include a display region associated with the sensed proximity-touch pattern for the information displayed in the display step S510.

In step S530, the mobile terminal 100 may gradually select information associated with the sensed proximity-touch pattern. The gradual selection may be defined as gradually increasing the number of selected information or gradually increasing the number of display regions selected among the plurality of displayed regions.

For example, the mobile terminal 100 may use vibration, light, alarm sound, highlight display, contrast control, darkness control, and blink, to inform that information has been selected.

Step S530 will be described with reference to the accompanying drawings.

The mobile terminal 100 may perform a display operation for information selected in step S530 associated with the sensed proximity-touch pattern. For example, the display operation may be performed by the touch screen according to a control signal from the controller 180.

For example, the mobile terminal 100 may distinguish the selected information, zoom-in or zoom-out the selected information, or display detailed information associated with the selected information.

Also, the mobile terminal 100 may display an operation list of operations executable from the information selected in the step S530. A displayed operation may be selected and executed via a proximity-touch. The execution of a selected operation execution may be performed by the controller 180.

The execution of a selected operation will be described with reference to the accompanying drawings.

The proximity-touch pattern may include the proximity-touch time, the proximity-touch speed, the proximity-touch direction, or the proximity-touch movement state.

The information selection process in the mobile terminal according to the present invention will be described with reference to FIGS. 6-10.

Menu icons may include images, emoticons, symbols, texts, animation, and flash. Additionally, the upper menu icons may be associated with at least one lower menu item.

As illustrated in FIGS. 6(a) and 6(b), a plurality of upper menu icons may be displayed on the touchscreen, and the mobile terminal 100 may distinguish an upper menu icon 611 indicated by a pointer as the pointer approaches the display. The space between the display and the pointer will be referred to as the spaced distance.

The icon selection illustrated in FIG. 6(b) may be performed when the spaced distance is less than a proximity-touch sense distance. Additionally, the selection of the specific upper menu icon may be distinguished by a highlight, contrast, darkness, blink, vibration, light, or alarm sound.

If the spaced distance is greater than the proximity-touch distance, such as the pointer moving away from the display, or if a proximity-touch operation includes a setting, the display may return to the state illustrated in FIG. 6(a).

As illustrated in FIG. 7(a), a plurality of upper menu icons may be displayed on the touchscreen. The mobile terminal 100 may expand upper menu icon 611 as the pointer approaches the display (FIG. 7(b)). Additionally, the size of the upper menu icon 611 may increase as the spaced distance decreases. The size of the upper menu icon 611 may decrease as the spaced distance increases. Additionally, the upper menu icon 611 may immediately increase in size when the upper menu icon 611 is touched by the pointer.

As illustrated in FIG. 8(a), a plurality of upper menu icons is displayed on the touchscreen. As illustrated in FIGS. 8(b) and 8(c), the mobile terminal 100 may expand one of the plurality of upper menu icons 611, 612, 613 as the pointer approaches the respective menu icon. The size of the upper menu icon 611 may increase as the spaced distance decreases. The size of the upper menu icon 611 may decrease as the spaced distance increases. Additionally, the upper menu icon 611 may immediately increase in size when the upper menu icon 611 is touched by the pointer.

As illustrated in FIG. 9(a), a plurality of upper menu icons may be displayed on the touchscreen. As illustrated in FIG. 8(b), the mobile terminal 100 may expand the upper menu icon 611 as the pointer approaches the menu icon. As illustrated in FIG. 9(c), the mobile terminal 100 may display a list 621 of a predetermined number of lower menu items associated with the selected upper menu icon 611 as the spaced distance decreases. Finally, as illustrated in FIG. 9(d), after displaying the lower menu items according to FIG. 9(c), the mobile terminal 100 may display the list of all lower menu items associated with the selected menu item.

The displayed lower menu items may include a predetermined number of items for all lower menu items according to predetermined criteria, such as, a user, a use frequency, or an order of use time. Additionally, the displayed lower menu items may be one example of the detailed information associated with the upper menu icon 611.

The menu icon may return to a previous display state as the spaced distance increases or if a specific proximity-touch operation is performed. Additionally, the upper menu icon 611 may immediately display the menu according to FIG. 9(d) when the upper menu icon 611 is touched by the pointer.

Figure 10:
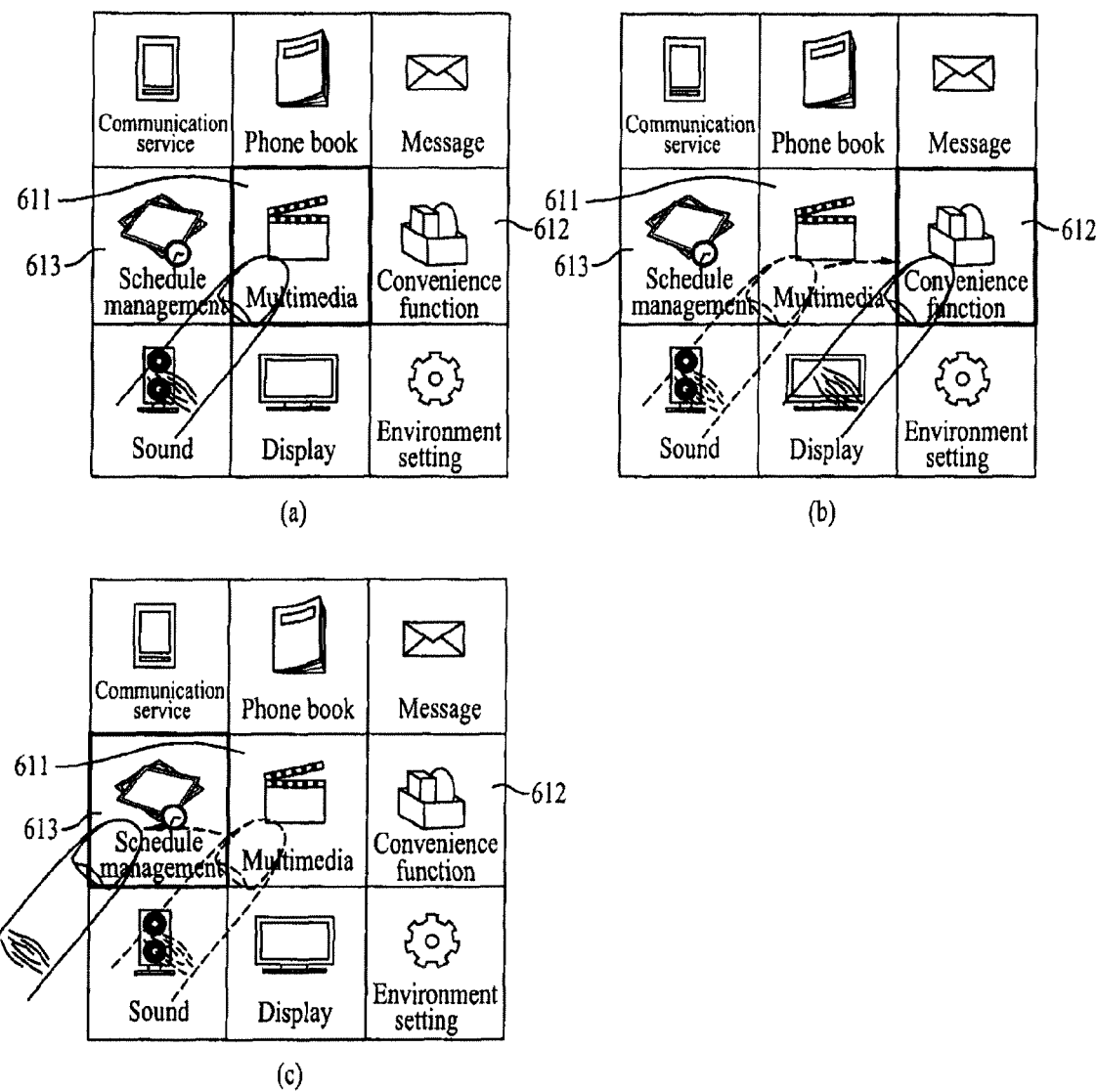

As illustrated in FIG. 10, a menu icon will be selected according to the location of the proximity touch. For example, as illustrated in FIG. 10(a), the first menu icon 611 will be selected when the proximity touch is in the center icon. Additionally, as illustrated in FIGS. 10(b)-(c), the mobile terminal 100 may select the second menu icon 612 or the third menu icon 613 according to the location of the proximity touch.

The information selection according to one embodiment of the present invention will be described with reference to FIG. 11. FIG. 11 illustrates the information selection process in the mobile terminal when the information are lower menu icons.

Figure 11A:
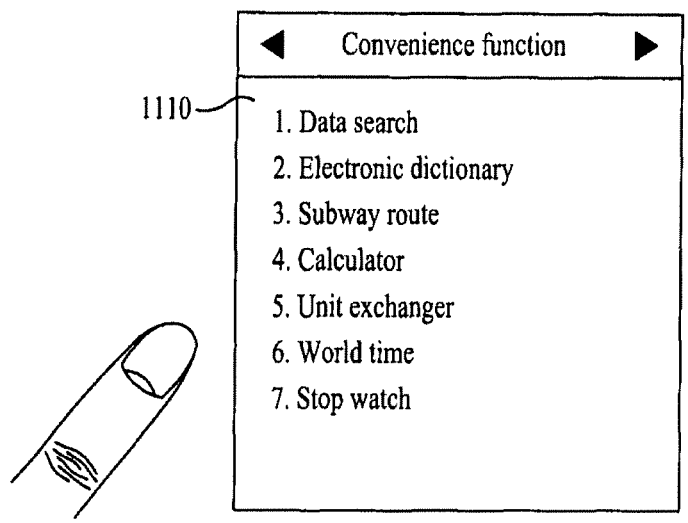
FIG. 11 illustrates the information selection process in the mobile terminal according to one embodiment of the present invention when the information are lower menu icons.
Figure 11B:
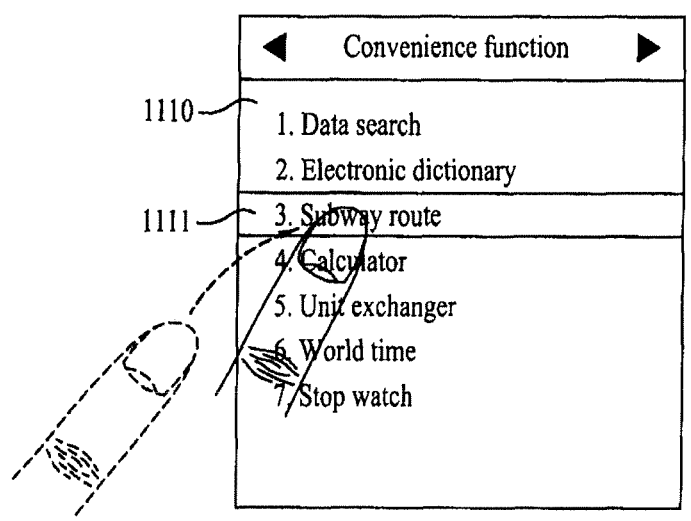
Figure 11C:
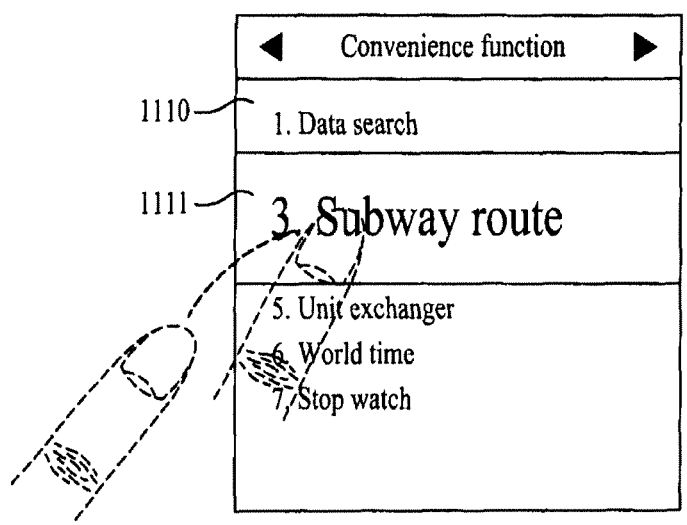
Figure 11D:
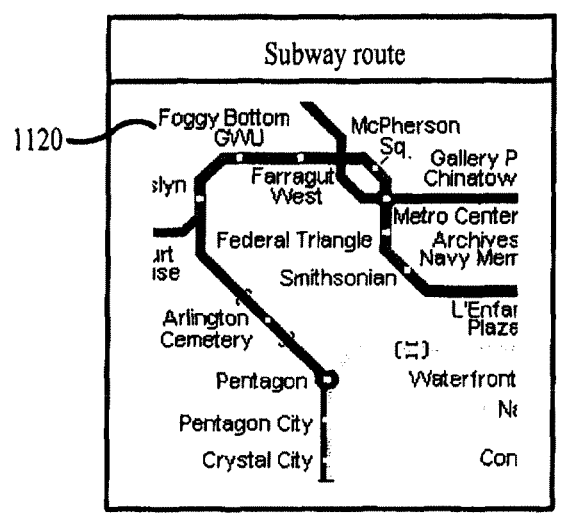
Figure 12A:
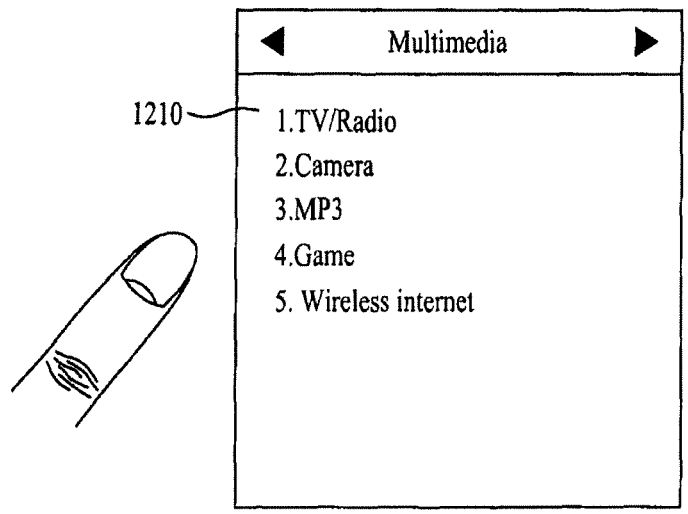
FIG. 12 illustrates the information selection process in the mobile terminal according to one embodiment of the present invention when the information are lower menu icons.
Figure 12B:
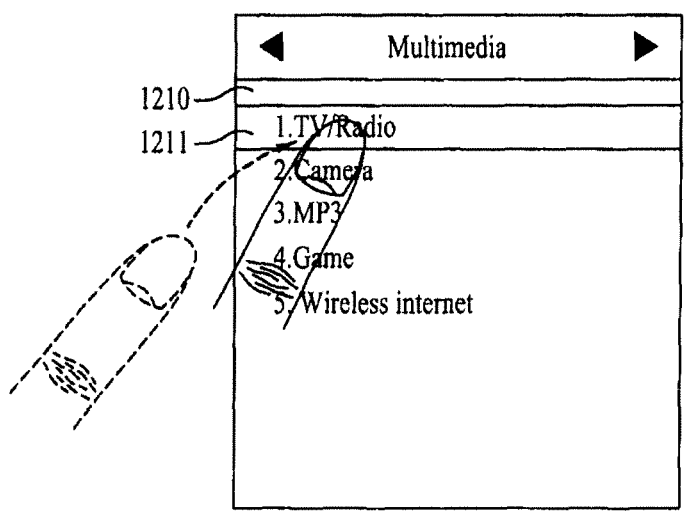
Figure 12C:
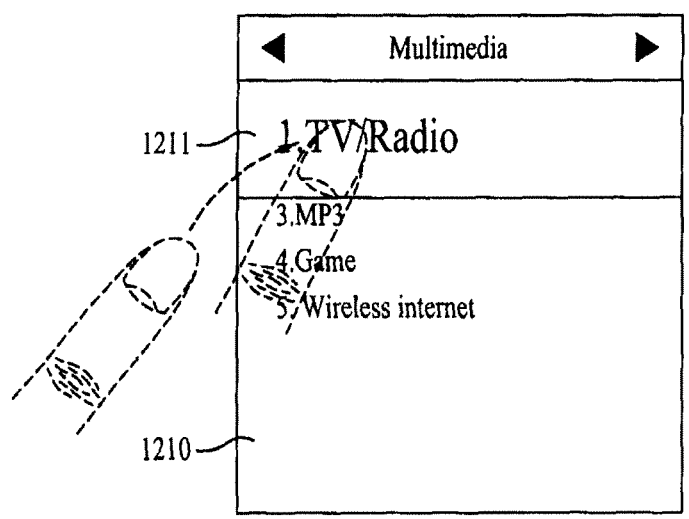
Figure 12D:
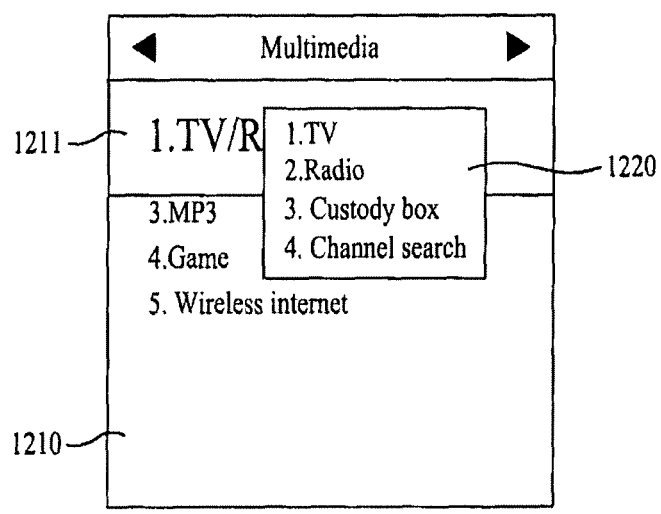

As illustrated in FIG. 11(a), a plurality of lower menu icons may be displayed on the touchscreen. The mobile terminal 100 may distinguish a lower menu icon 1111 indicated by the pointer as the pointer approaches the display, FIG. 11(b). Additionally, the mobile terminal 100 may expand a size of a lower menu icon 1111 as the spaced distance decreases, FIG. 11(c). Finally, the mobile terminal 100 may execute a menu item associated with the lower menu icon 1111 as the spaced distance decreases, FIG. 11(d). For example, when the selected menu item associated with the lower menu icon 1111 is a "subway route", the mobile terminal 100 can display the subway route as illustrated in FIG. 11(*d*).

The lower menu icon 1111 may return to a previous state as the spaced distance increases or if a specific proximity-touch operation is executed. Additionally, the lower menu icon 1111 may be immediately executed when it is directly touched by the pointer.

The information selection process according to one embodiment the present invention will be described with reference to FIG. 12. FIG. 12 illustrates the information selection process of the mobile terminal when the information are lower menu icons.

As illustrated in FIG. 12(*a*), a plurality of lower menu icons may be displayed on the touchscreen. The mobile terminal 100 may distinguish a lower menu icon 1211 indicated by the pointer as the pointer approaches the display, FIG. 12(*b*). Additionally, the mobile terminal 100 may expand a size of a lower menu icon 1211 as the spaced distance decreases, FIG. 12(*c*). Additionally, as illustrated in FIG. 12(*d*), the mobile terminal 100 may execute a menu item associated with the lower menu icon 1211 as the spaced distance decreases. For example, the mobile terminal 100 may display a list 1220 of the lower menu items associated with "TV/Radio" if the menu item associated with the lower menu icon 1211 is "TV/Radio".

The lower menu icon 1211 may return to a previous state as the spaced distance increases or if a specific proximity-touch operation is executed. Additionally, the lower menu icon 1211 may be immediately executed when it is directly touched by the pointer.

Figure 13:
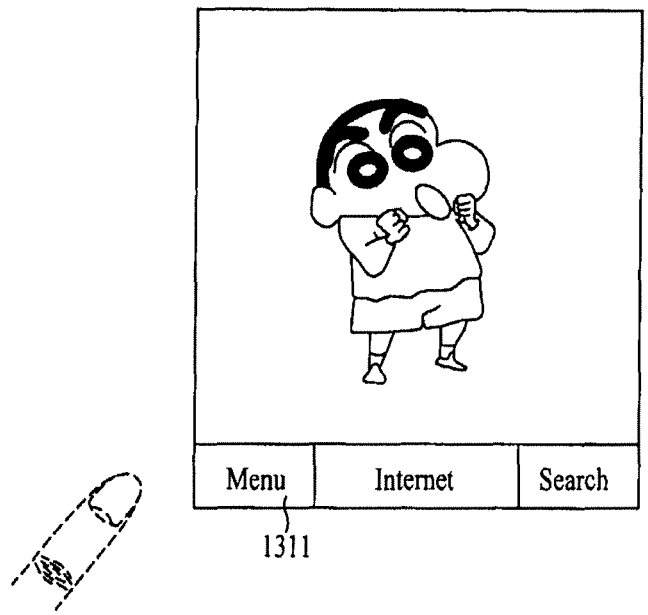
FIGS. 13-14 illustrate the information selection process in the mobile terminal according to one embodiment of the present invention when the information are soft menu icons.

The information selection process according to one embodiment of the present invention will be described with reference to FIGS. 13 and 14. FIGS. 13 and 14 illustrate the information selecting process in the mobile terminal when the information are soft menu icons.

As illustrated in FIG. 13, the mobile terminal 100 may display at least one soft menu icon on one region of the display.

Figure 14A:
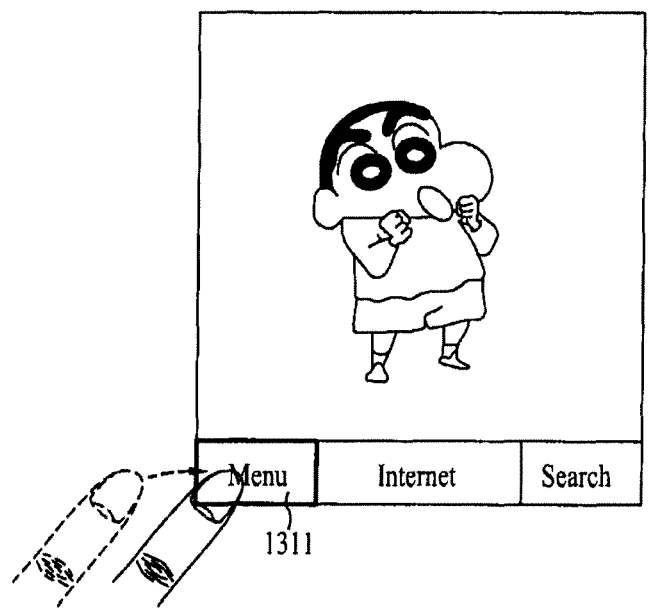
Figure 14B:
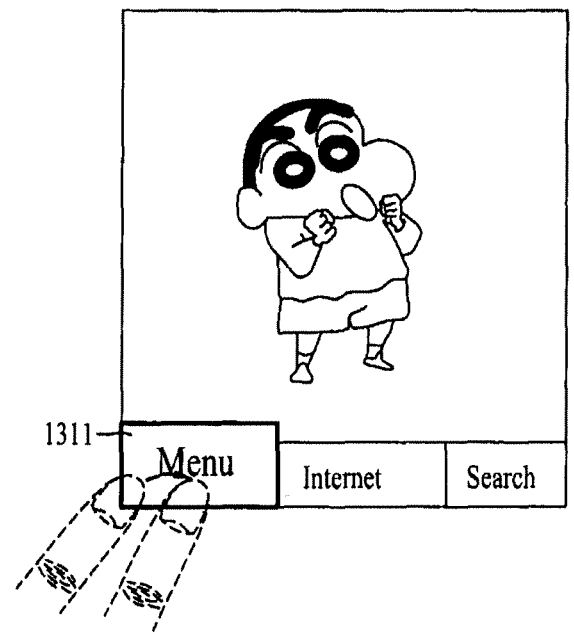

As illustrated in FIGS. 14(A) and 14(B), the mobile terminal 100 may distinguish and expand a soft menu icon 1311 as the pointer approaches the display.

The specific soft menu icons may be distinguished according to a highlight, contrast, darkness, blink, vibration, light, or alarm sound. Additionally, as illustrated FIG. 14(B), the soft menu icon 1311 may be expanded as the spaced distance decreases. The soft menu icon 1311 may return to a previous state if the spaced distance increases beyond a specific level or if a specific proximity-touch operation is executed.

Figure 14C:
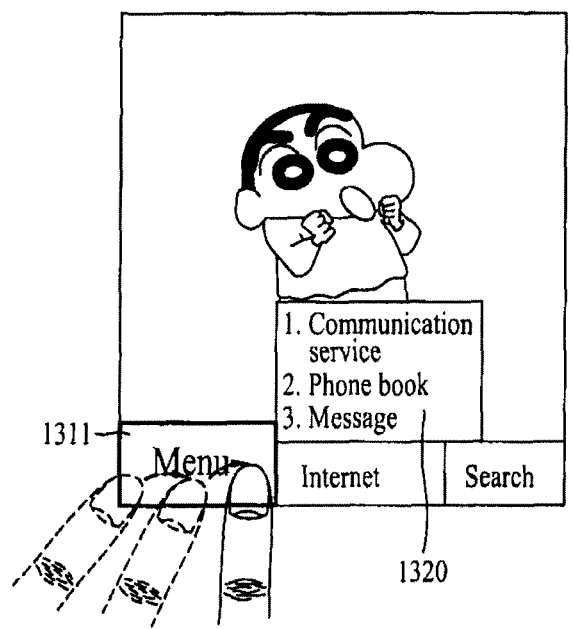
Figure 14D:
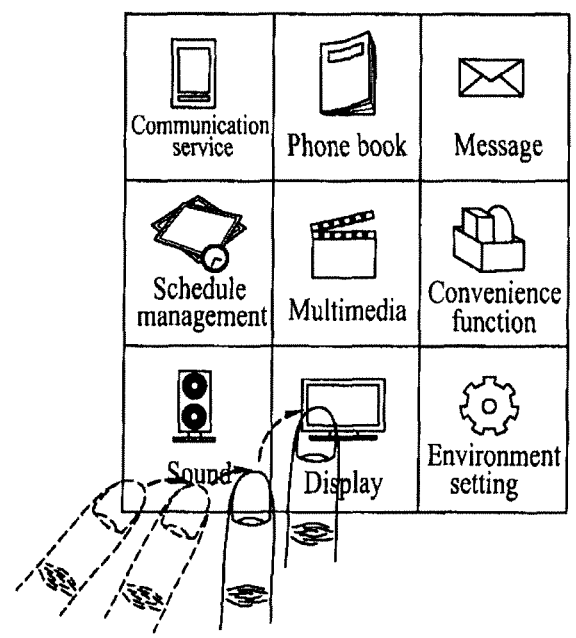

As illustrated in FIG. 14(C), the mobile terminal 100 may display a list 1320 of lower menu items associated with the soft menu icon 1311 as the spaced distance decreases. Finally, as illustrated in FIG. 14(D), the mobile terminal 100 executes the lower menu item associated with the soft menu icon 1311 as the spaced distance decreases.

Additionally, a soft menu icon 1311 may be immediately executed when the soft menu icon 1311 is directly touched by the pointer. Furthermore, a soft menu icon 1311 may return to a previous state if the spaced distance increases beyond a predetermined level or if a specific proximity-touch operation is executed.

The information selection process according to one embodiment of the present invention will be described with reference to FIGS. 15-21. FIGS. 15-21 illustrate the information selection process of the mobile terminal when the information is a data list.

Figure 15:
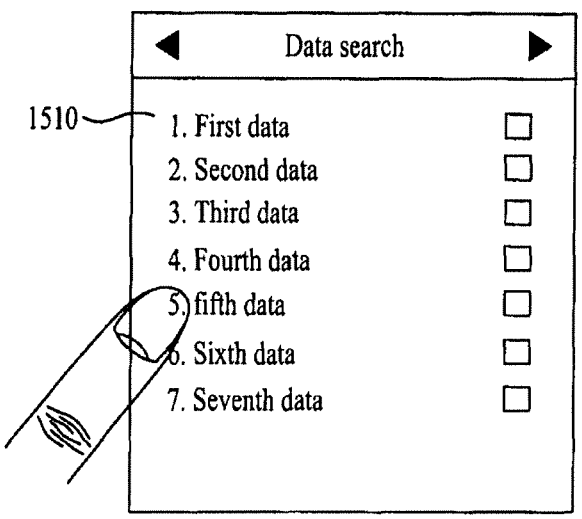
FIGS. 15-21 illustrate the information selection process in the mobile terminal according to one embodiment of the present invention when the information are the data lists.

As illustrated in FIG. 15, the mobile terminal 100 may display a data list 1510 associated with a plurality of data names.

Figure 16:
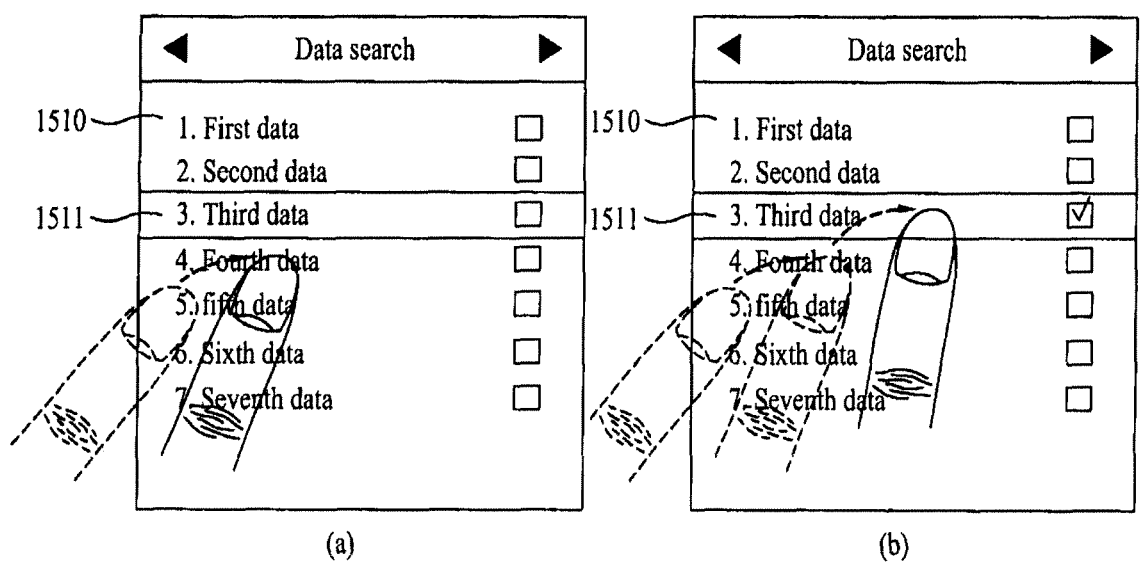

As illustrated in FIG. 16(*a*), the mobile terminal 100 may distinguish a data name 1511 as the pointer approaches the display. Additionally, as illustrated in FIG. 16(*b*), the mobile terminal 100 may further distinguish the data name 1511 as the spaced distance decreases.

Figure 17:
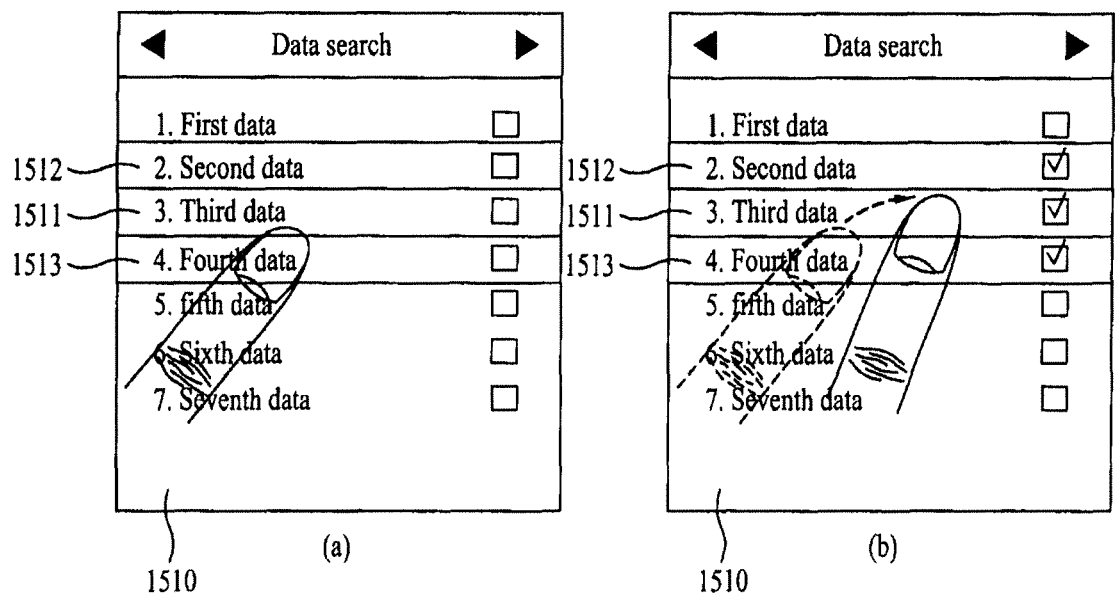

As illustrated in FIG. 17, the mobile terminal 100 may sequentially display and distinguish the data name 1511 indicated by the pointer and the plurality of data names 1512, 1513 adjacent to the data name 1511 as the pointer approaches the display or as the proximity-touch is maintained for a predetermined time at a predetermined spaced. Additionally, as illustrated in FIG. 17(*b*), the mobile terminal 100 may further distinguish the data name 1511 as the spaced distance decreases.

The data name 1511 of FIGS. 16 and 17 may return to a previous space if the spaced distance increases or if a specific proximity-touch operation is executed. Additionally, the data name 1511 may be immediately set when the data name is touched by the pointer.

Figure 18:
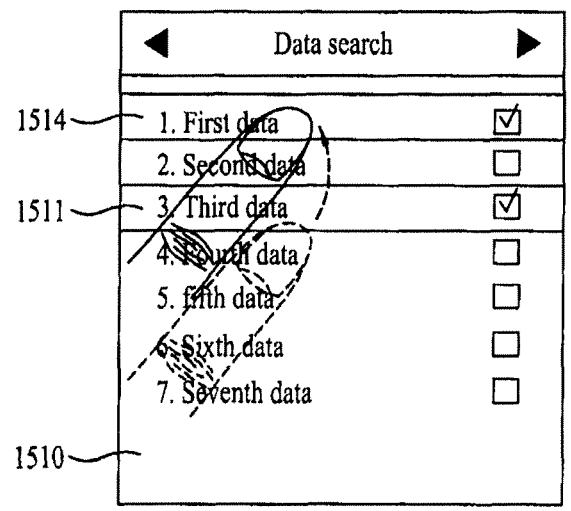

As illustrated in FIG. 18, if the first data name 1511 is distinguished or selected, a second data name 1514 may be distinguished or selected when a proximity-touch drag operation is performed from the first data name 1511 to a second data name 1514.

Figure 19:
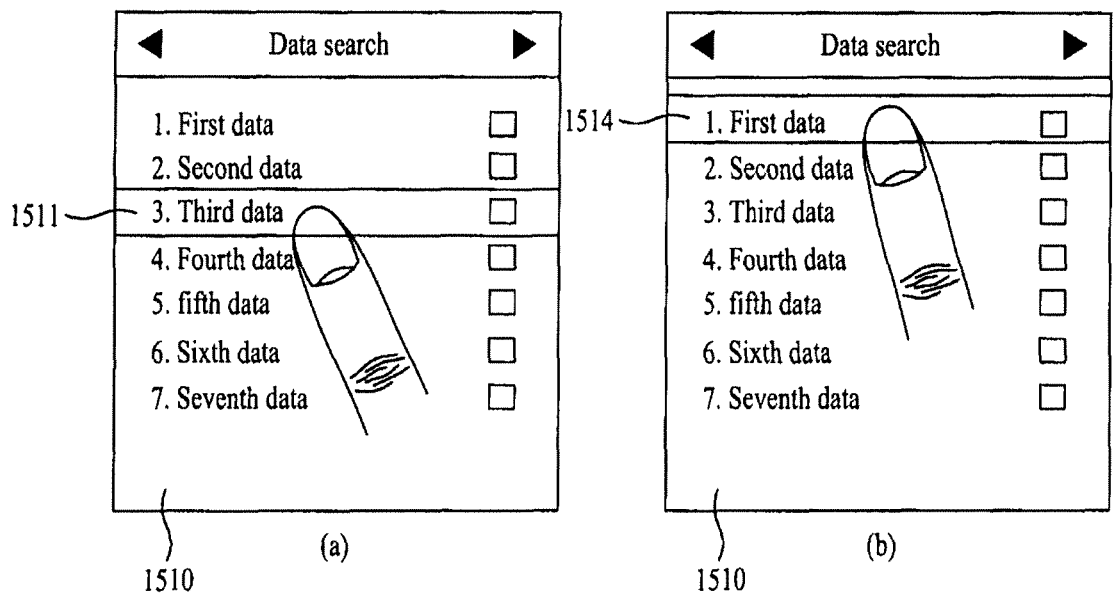

As illustrated in FIG. 19, if the first data name 1511 is distinguished or selected, a second data name 1514 may be distinguished or selected when a proximity-touch drag is performed to the second data name 1514.

Figure 20:
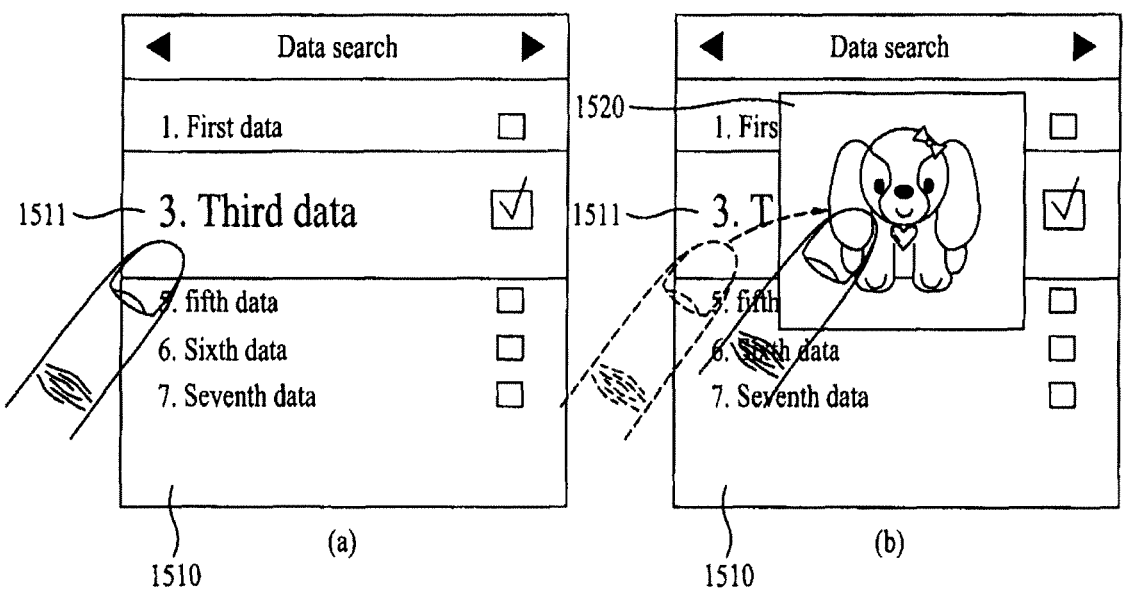

As illustrated in FIG. 20, if the first data name 1511 is selected, the mobile terminal 100 may expand the first data name 1511 as the spaced distance decreases, FIG. 20(*a*). Additionally, the mobile terminal 100 may execute data corresponding to the first data name 1511 as the spaced distance further decreases, FIG. 20(*b*). For example, as illustrated in FIG. 20(*b*), a photograph 1520 can be displayed if the data corresponding to the first data name 1511 is a "photograph file".

The data name 1511 may return to a previous state as the spaced distance increases beyond a predetermined level or if a specific proximity-touch operation is executed. Additionally, the data name 1511 may be immediately executed if the data name 1511 is touched by the pointer.

As illustrated in FIGS. 21A and 21B, the mobile terminal 100 may display a list 1530 of executable operations associated with the data corresponding to the selected data name 1511 as the spaced distance decreases.

Figure 21C:
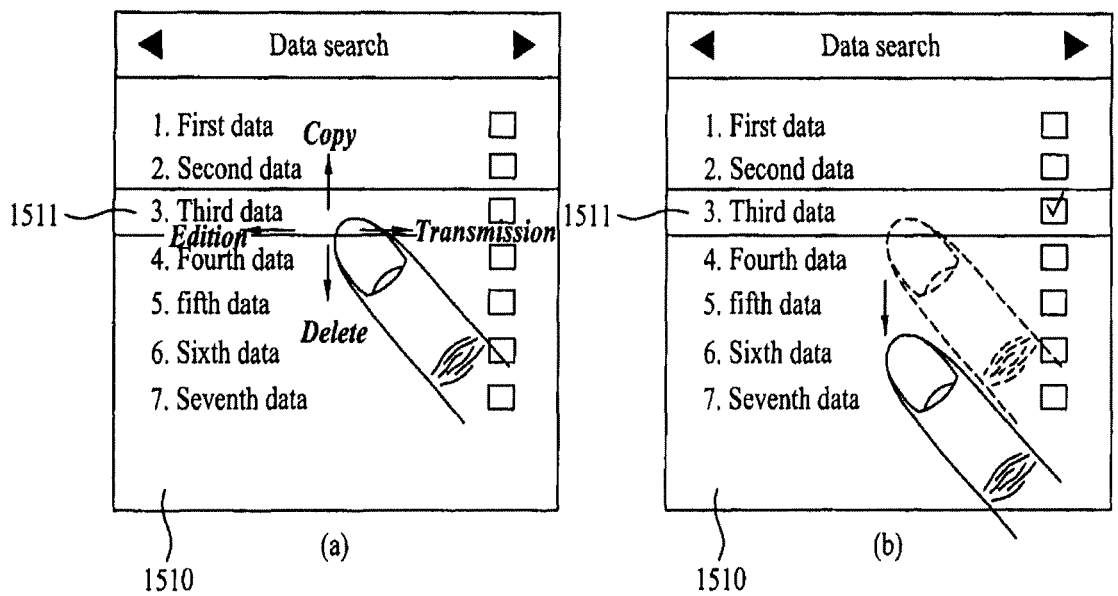
Figure 21D:
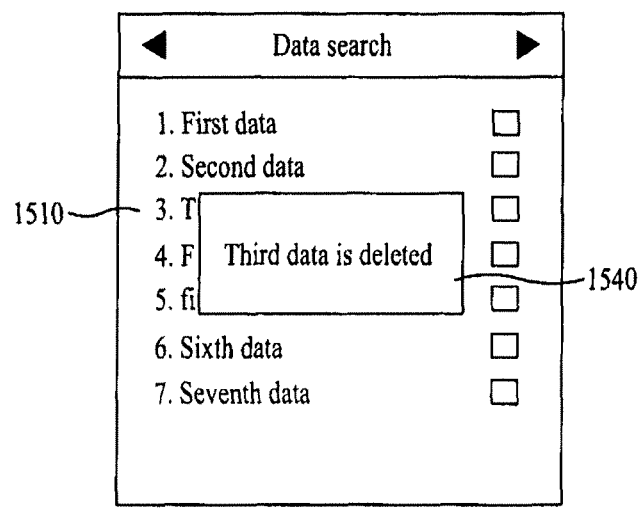

Additionally, as illustrated in FIG. 21C, the mobile terminal 100 may display proximity-touch directions associated with the executable data associated with the selected data name 1511 as the spaced distance decreases.

Furthermore, as illustrated in FIGS. 21C(*b*) and 21D, the mobile terminal 100 may delete the data associated with the selected data name 1511 and may inform the user of the deletion if the "delete" operation is selected.

The information selection process according to the present invention will be described with reference to FIGS. 22-25. FIGS. 22-25 illustrate the information selection process of the mobile terminal when the information is a keypad.

Figure 22:
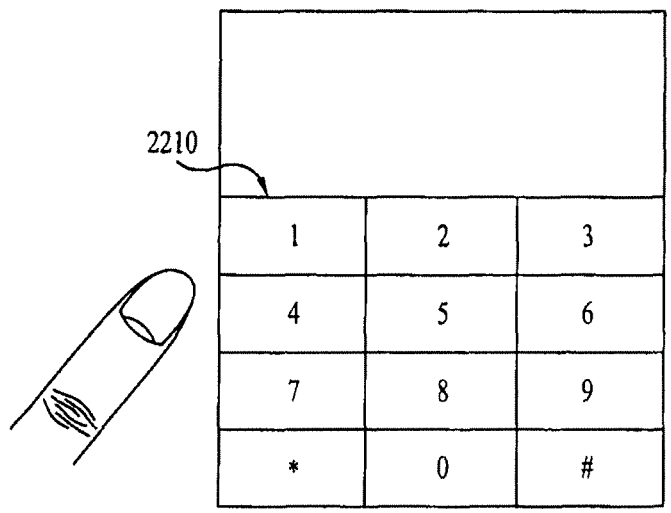
FIGS. 22-25 illustrates the information selection process in the mobile terminal according to one embodiment of the present invention when the information are keypads.

As illustrated in FIG. 22, the mobile terminal 100 may display the keypads including a plurality of key buttons on one region of the display. The mobile terminal may generate the associated key data according to the recognition of the touch or the proximity-touch on the specific key button.

Figure 23:
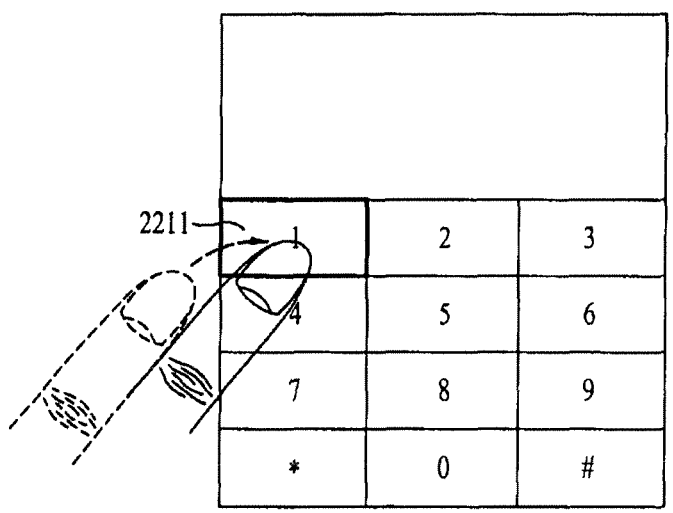
Figure 24:
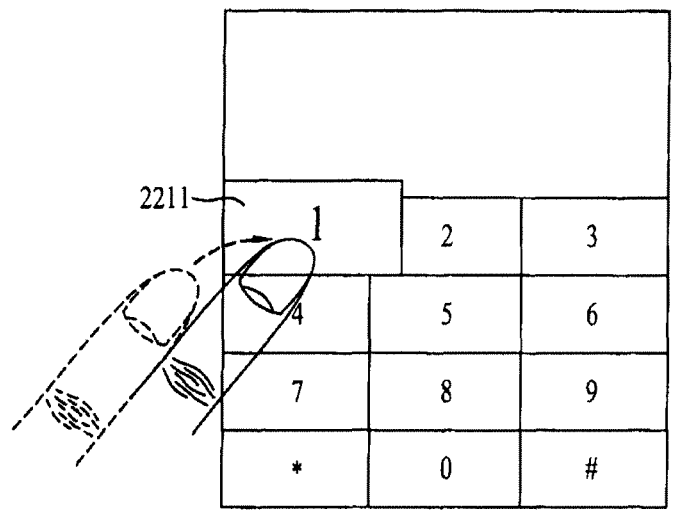

The mobile terminal 100 may distinguish a key button 2211 indicated by the pointer, FIG. 23, or may expand a key button as the pointer approaches, FIG. 24.

The key button 2211 may be distinguished via a highlight, contrast, darkness, blink, vibration, light, or alarm. Additionally, the specific key button 2211 may be further expanded as the spaced distance decreases. The key button 2211 may return to a previous state as the spaced distance increases beyond a predetermined level or if a specific proximity-touch operation is executed.

Figure 25:
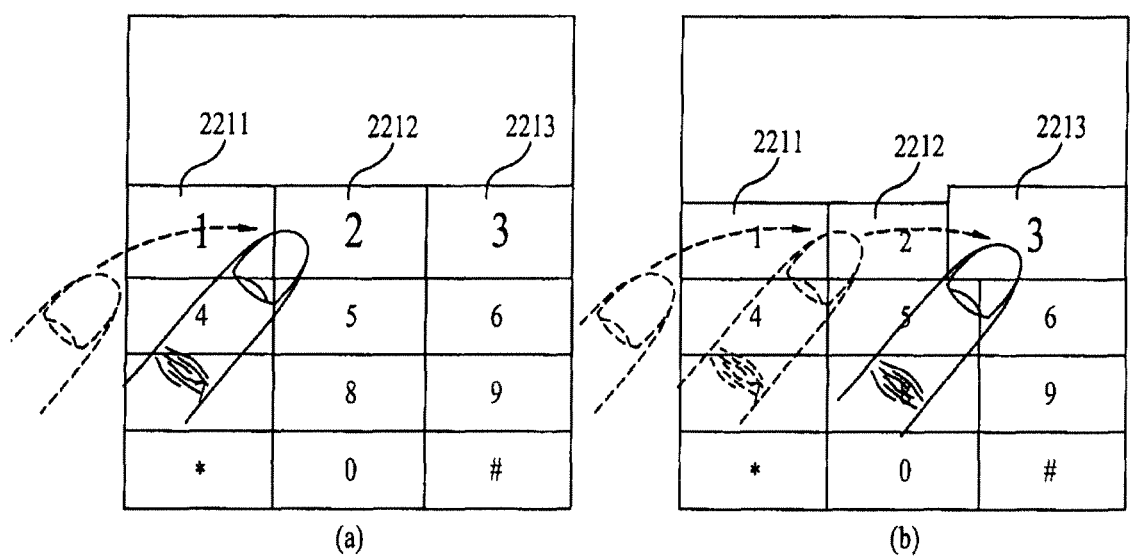

As illustrated in FIG. 25, the mobile terminal 100 can expand key buttons included in a column or a row or a predetermined number of key buttons adjacent to a selected key button as the pointer approaches the display. The expanded key buttons may return to a previous state as the spaced distance increases beyond a predetermined level or if a specific proximity-touch operation is executed.

The information selection according an embodiment of the present invention will be described with reference to FIGS. 26-31. FIGS. 26-31 illustrate the information selecting process in the mobile terminal when the information are still pictures.

Figure 26:
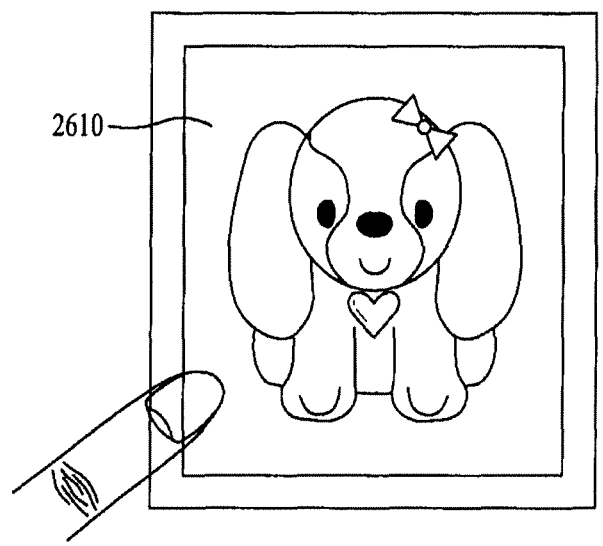
FIGS. 26-31 illustrate the information selection process in the mobile terminal according to one embodiment of the present invention when the information are still pictures.

As illustrated in FIG. 26, the mobile terminal 100 may display the still pictures on the touchscreen.

Figure 27:
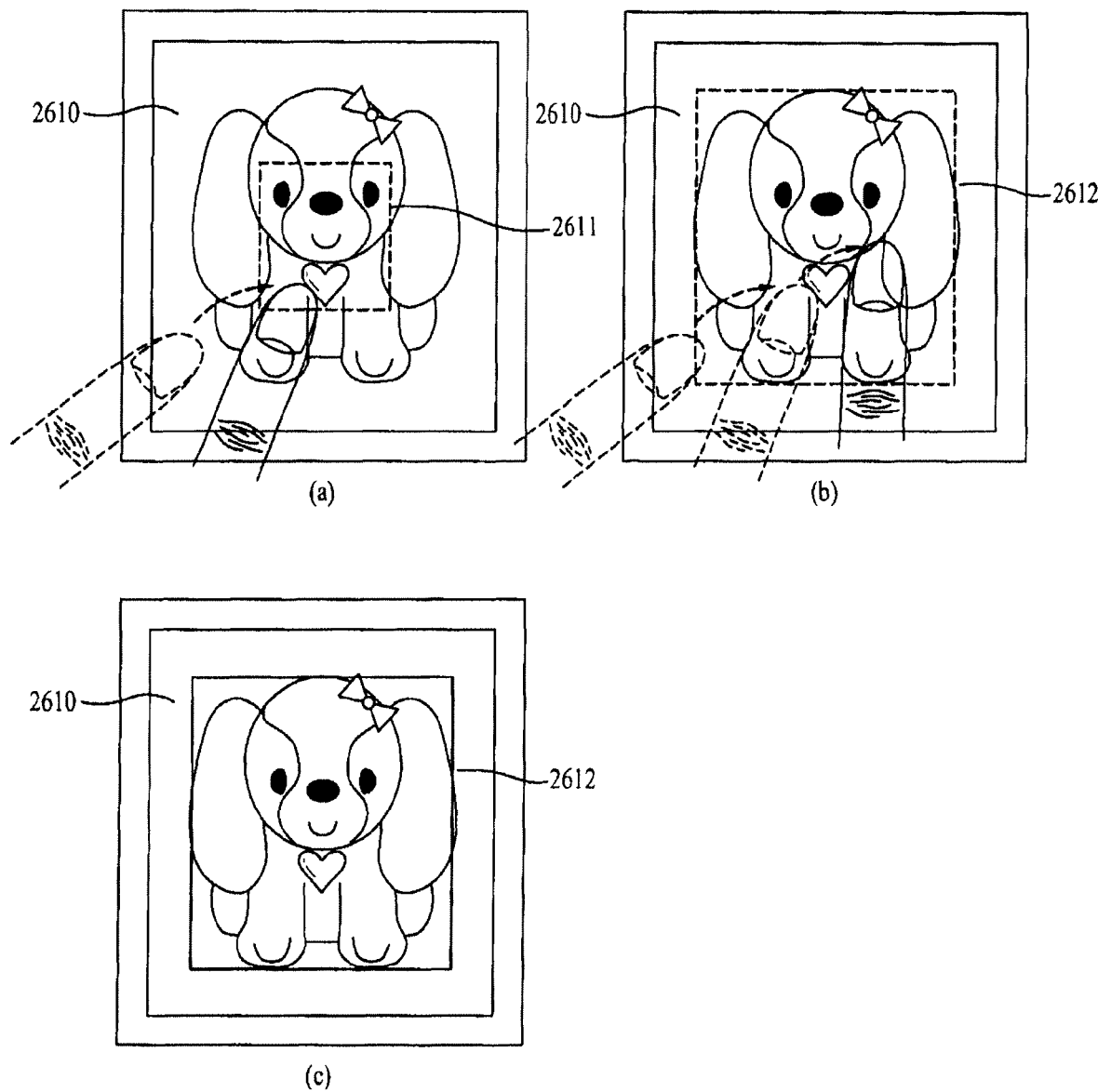

As illustrated in FIG. 27(*a*), the mobile terminal 100 may select a first region 2611 as the pointer approaches the display. Furthermore, as illustrated in FIG. 27(*b*), the mobile terminal 100 may select a second region 2612, which is larger than the first region 2611, as the pointer further approaches the display. The mobile terminal 100 may select the photograph portion associated with the second region 2612 or the first region 2611 if the proximity-touch is maintained for a predetermined time or a proximity-touch operation is executed. The mobile terminal 100 may inform a user of the selection of the photograph portion via a highlight, vibration, contrast, light, or alarm.

The mobile terminal 100 can immediately select the photograph portion if the first region 2611 or the second region 2612 is touched. Additionally, the still image may return to a previous state if the spaced distance increases beyond a predetermined level or if a specific proximity-touch operation is executed.

Figure 28:
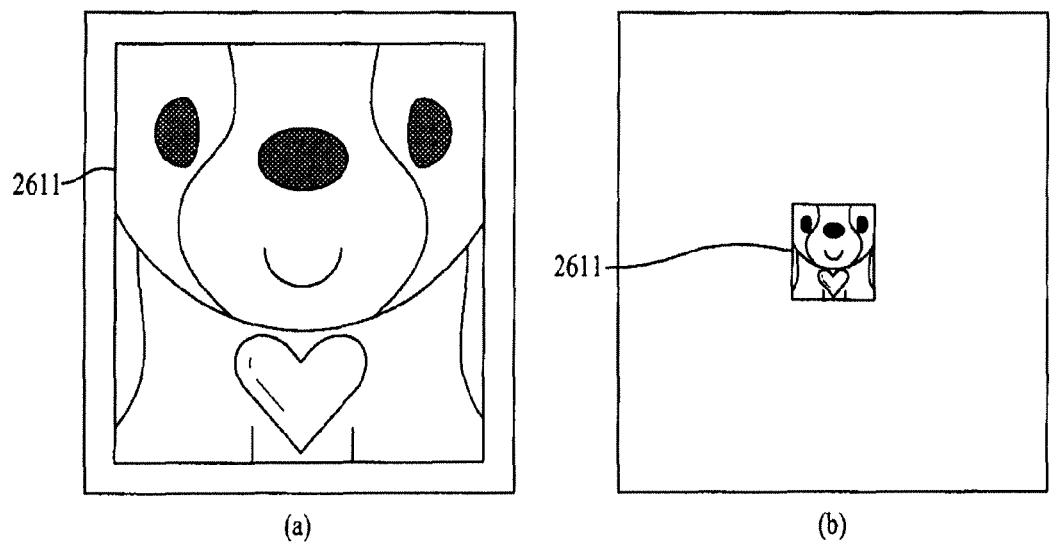

As illustrated in FIG. 28(*a*) the mobile terminal 100 may expand the photograph portion associated with the first region 2611 when the pointer approaches the display or a specific proximity-touch operation is input. Additionally, as illustrated in FIG. 28(*b*), the mobile terminal 100 may reduce the display of the extended photograph portion when the pointer moves away from the display or a specific proximity-touch operation is input.

Figure 29:
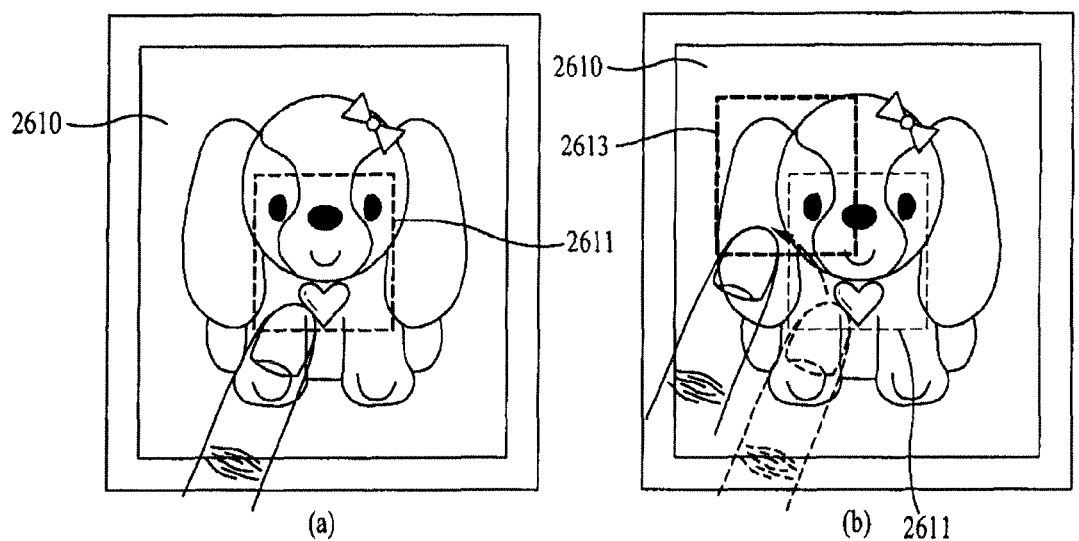

As illustrated in FIG. 29, the first region 2611 may be selected, FIG. 29(*a*), and proximity-dragged to a new location on the display 2610, FIG. 29(*b*).

Figure 30:
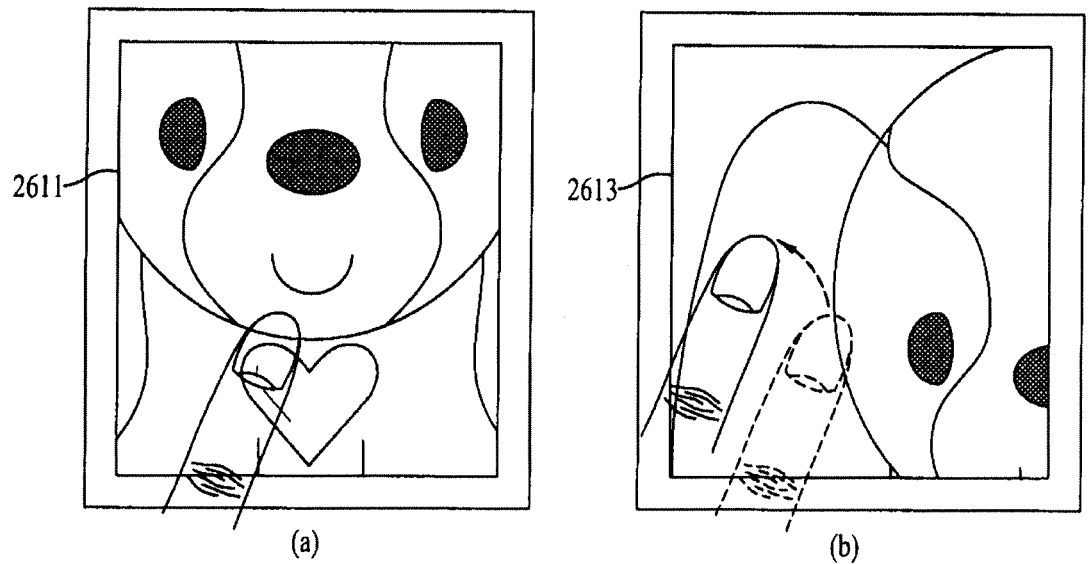

As illustrated in FIG. 30, the expanded portion of the photograph associated with the first region, FIG. 30(*a*), may move according to the direction of a proximity-drag, FIG. 30(*b*).

Figure 31A:
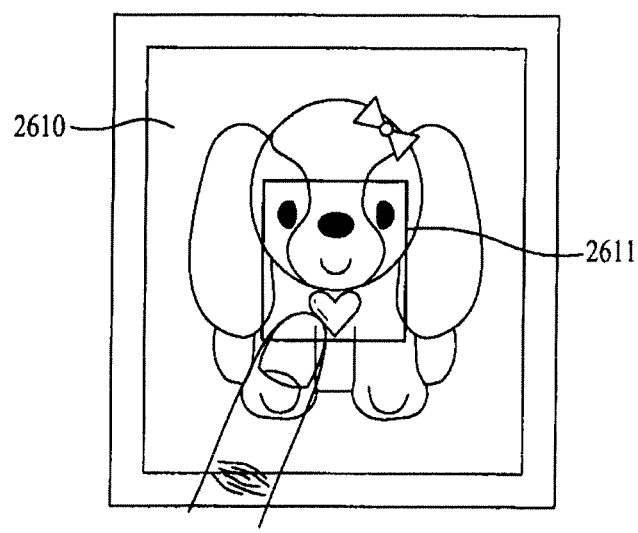
Figure 31B:
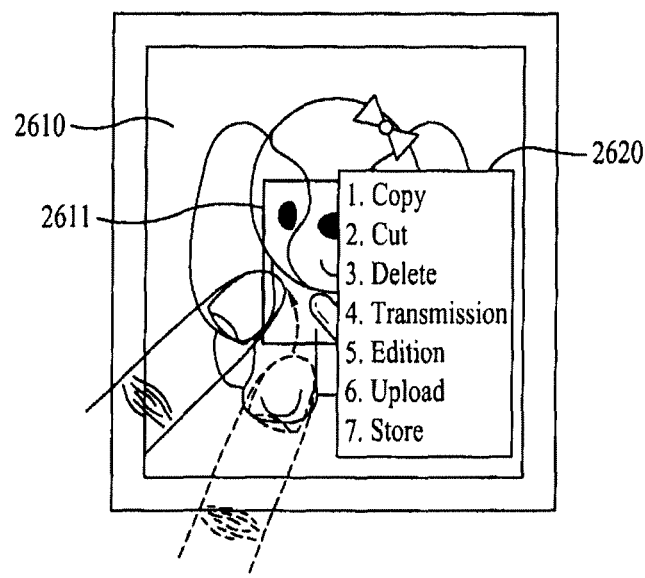

As illustrated in FIGS. 31A and 31B, the mobile terminal 100 may display a list 2620 of operations associated with the photograph portion associated with the first region 2611.

Figure 31C:
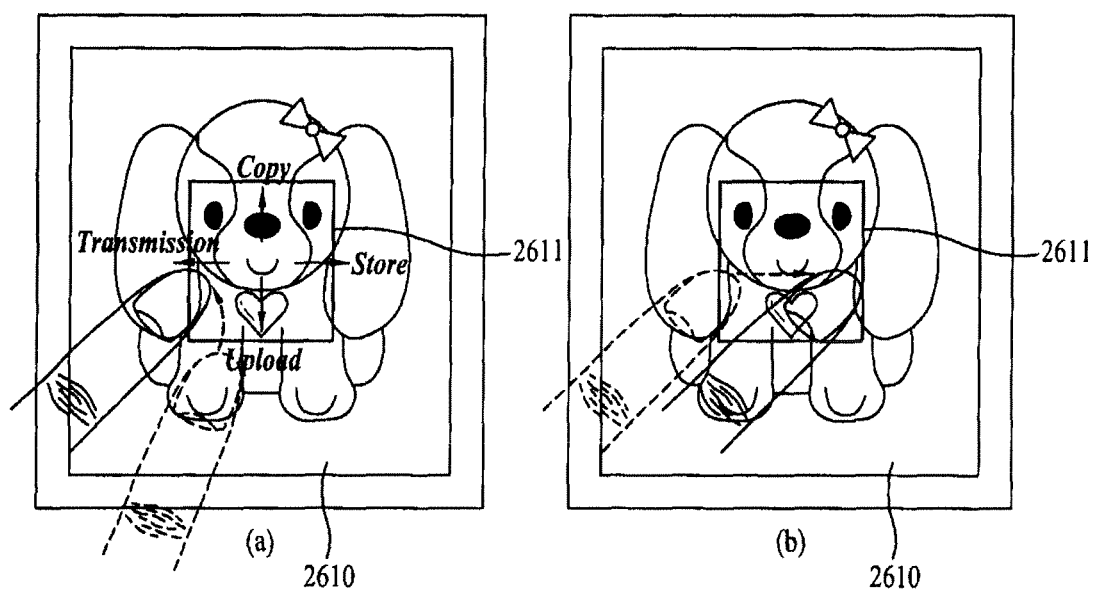

Additionally, as illustrated in FIG. 31C, the mobile terminal 100 may display the respective operations associated with the photograph portion of the first region 2611 as the spaced distance decreases.

Figure 31D:
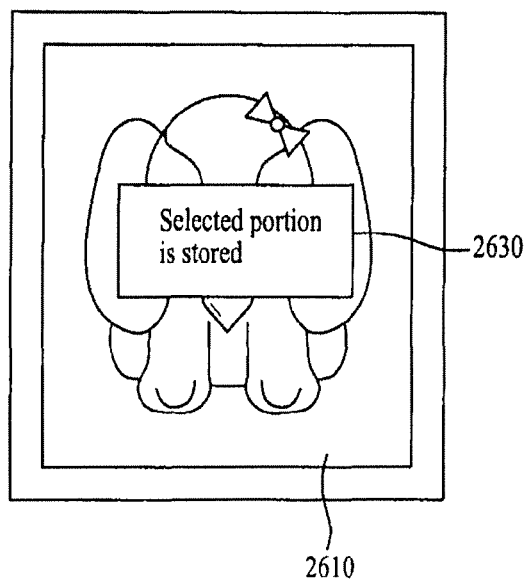

As illustrated in FIG. 31D, the mobile terminal 100 may store the photograph portion associated with the first region 2611 and may inform the user that the photograph is stored if the "store" operation is selected in FIG. 31B.

The selection process described above may be applied to a photograph, a web page, a map image, an instant messaging service, or any program capable of displaying an image.

Figure 32:
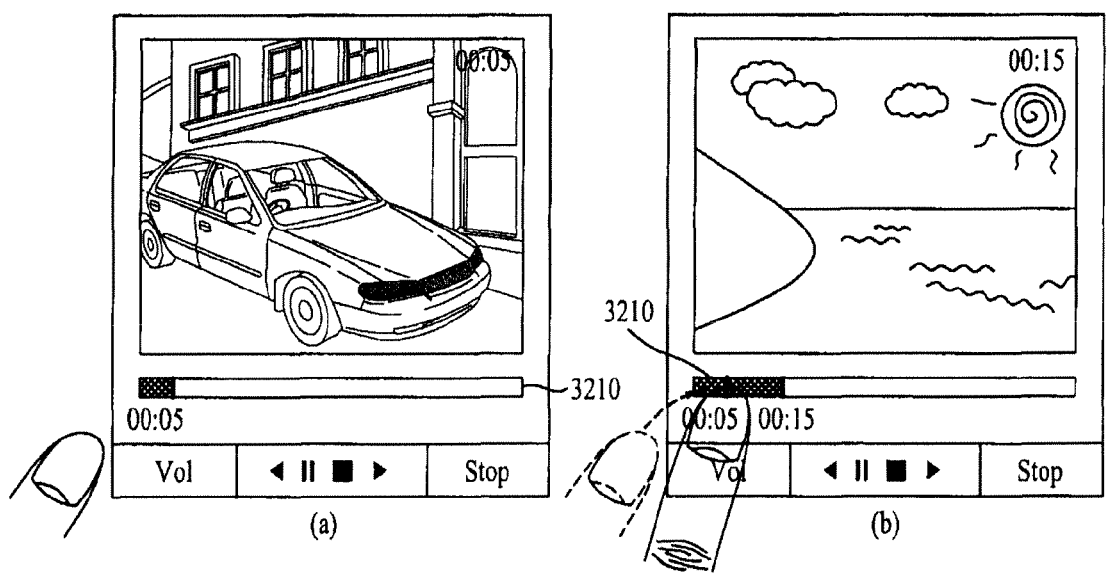
FIGS. 32-34 illustrate the information selection process in the mobile terminal according to one embodiment of the present invention when the information are moving pictures.
Figure 33:
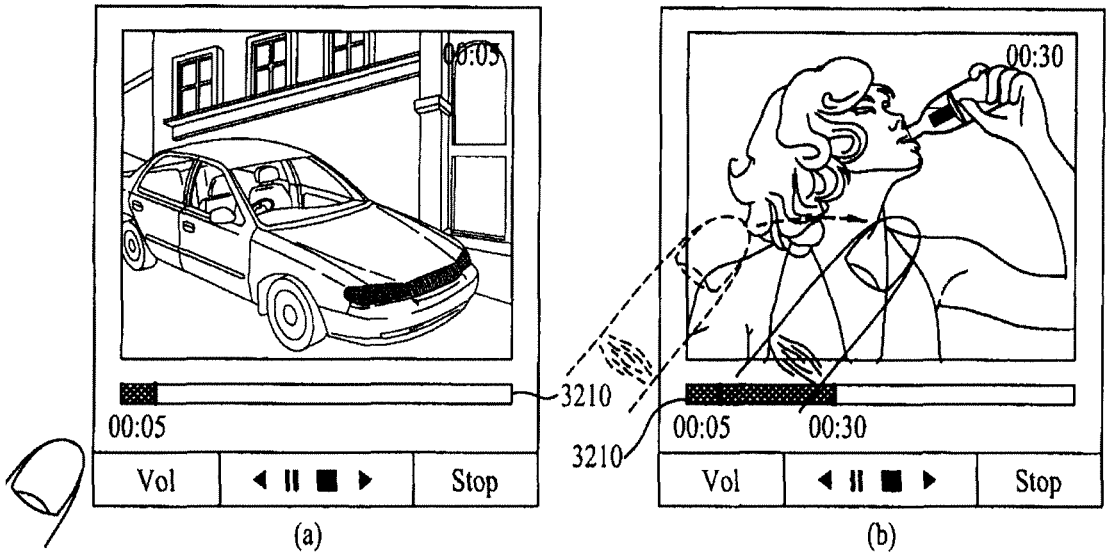
Figure 34:
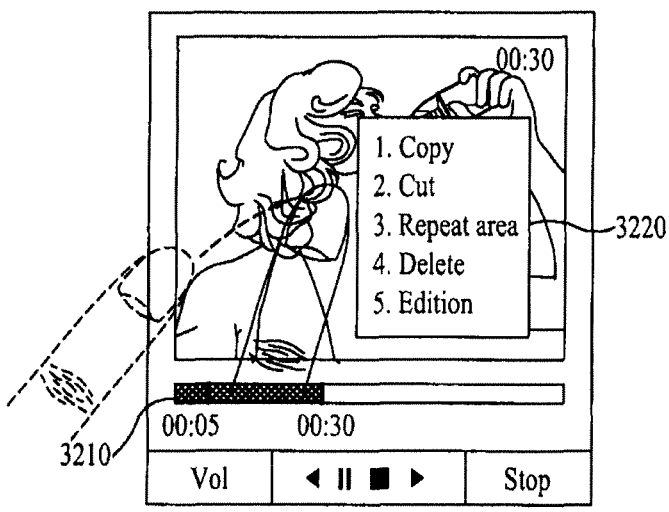

The information selection process according to one embodiment of the present invention will be described with reference to FIGS. 32-34. FIGS. 32-34 illustrate the information selection process in the mobile terminal when the information is a moving picture.

As illustrated in FIG. 32, an indicator 3210 may indicate the current position of a moving picture. The playing point of the moving picture may be adjusted to the position associated with the proximity-touch on the indicator 3210.

As illustrated in FIG. 33, the playing point of the moving picture may be adjusted according to a proximity-drag performed on the display.

As shown in FIG. 34, the mobile terminal 100 may display a list 3220 of operation associated with the moving picture if the spaced distance reaches a predetermined level or if a specific proximity-touch operation is input. Additionally, the mobile terminal may display the proximity-touch directions associated with the respective executable operations associated with the selected moving picture portions (Not Shown).

The mobile terminal 100 may execute the specific operation if the specific operation is selected from the list 3220 or a proximity-touch operation is input corresponding to the specific operation.

Additionally, the mobile terminal may select the moving picture playing point according to a proximity-touch time, a proximity-touch speed, a proximity-touch direction, or a proximity-touch frequency.

The information selection process according to one embodiment of the present invention will be described with reference to FIGS. 35-38. FIGS. 35-38 illustrate the information selecting process in the mobile terminal when the information are control regions.

For convenience of explanation, the control regions will be illustrated as volume control regions.

Figure 35:
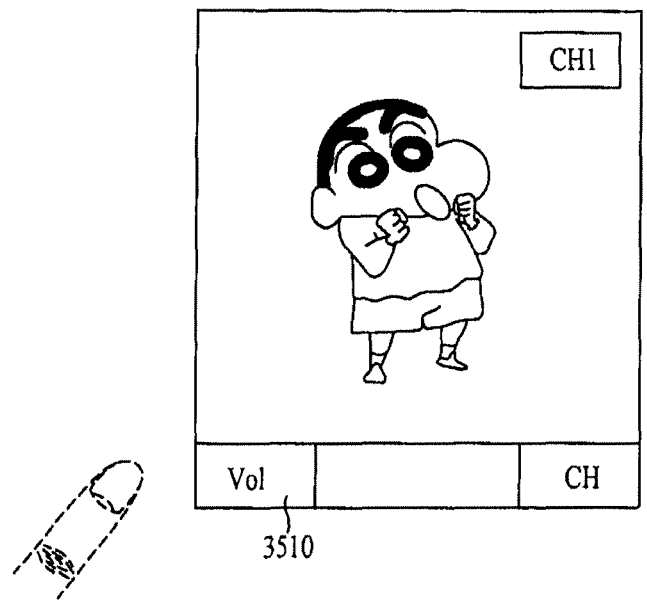
FIGS. 35-38 illustrate the information selection process in the mobile terminal according to one embodiment of the present invention when the information are control regions.

As illustrated in FIG. 35, the mobile terminal 100 may display a volume control region 3510 on one region of the display.

Figure 36:
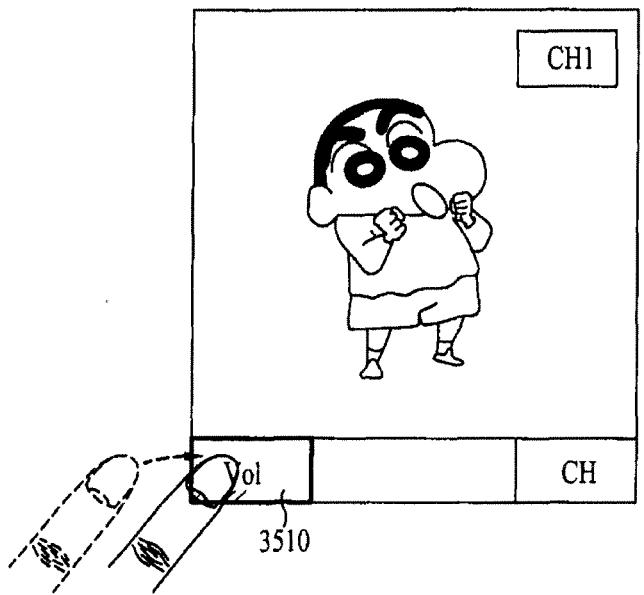
Figure 37:
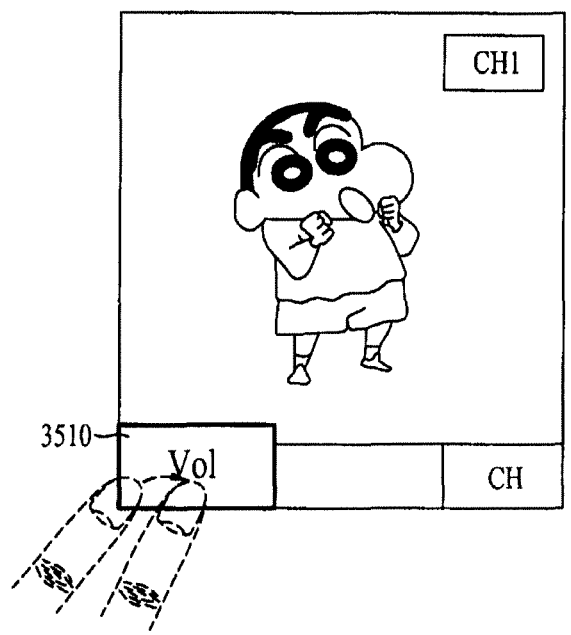

The mobile terminal 100 may distinguish the volume control region 3510 indicated by the pointer, FIG. 36, and may expand the volume control region 3510 as the pointer approaches the display, FIG. 37.

The volume control region 3510 may be distinguished via a highlight, contrast, darkness, blink, vibration, light, or alarm sound. Additionally, the volume control region 3510 may be further expanded as the spaced distance decreases. The volume control region 3510 may return to a previous state when the spaced distance increases beyond a predetermined level or if a specific proximity-touch operation is executed.

Figure 38:
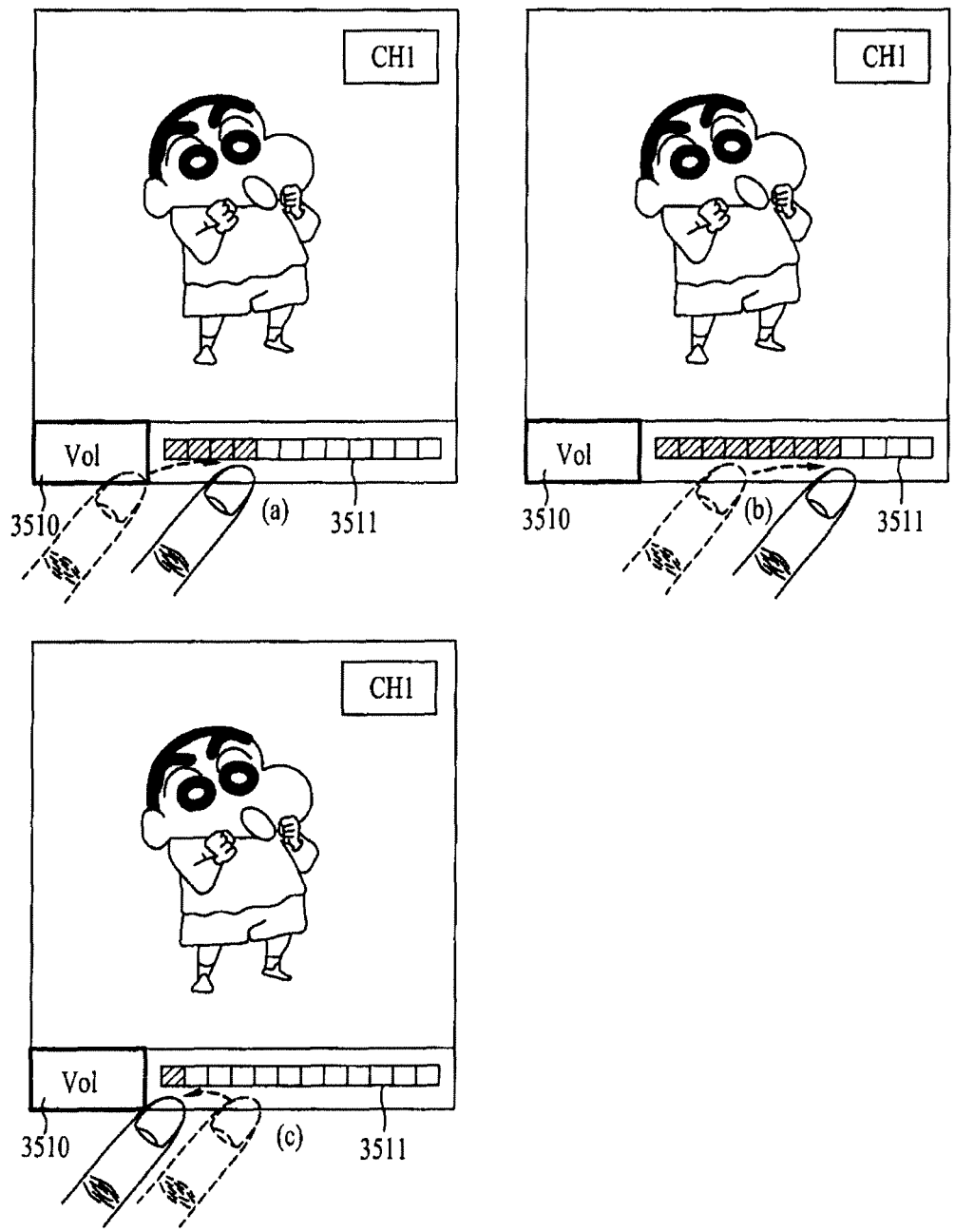

As illustrated in FIG. 38, the mobile terminal 100 can increase or decrease the volume according to a proximity-drag performed on a volume control window 3511.

The volume control region may be applied to a broadcast signal output, an audio file output, a moving picture file output, or the volume control of the mobile terminal 100. Additionally, the control region may include the volume control region in addition to the level control regions for screen brightness and screen chroma brightness.

The information selection process according to one embodiment of the present invention will be described with reference to FIGS. 39-43. FIGS. 39-43 illustrate the information selecting process in the mobile terminal when the information is a web page.

Figure 39:
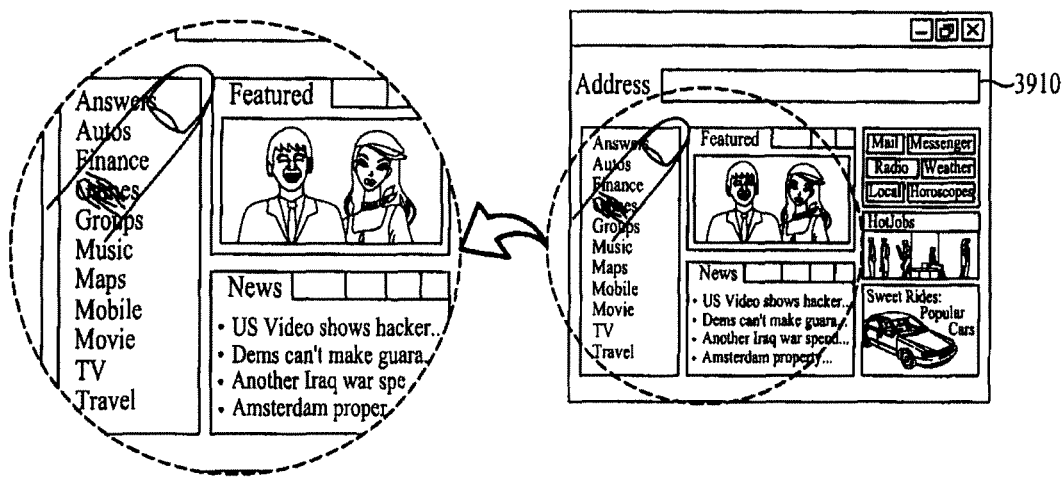
FIGS. 39-43 illustrate the information selection process in the mobile terminal according to one embodiment of the present invention when the information are web pages.

As illustrated in FIG. 39, the mobile terminal 100 may display a web page and an address input window 3910.

Figure 40:
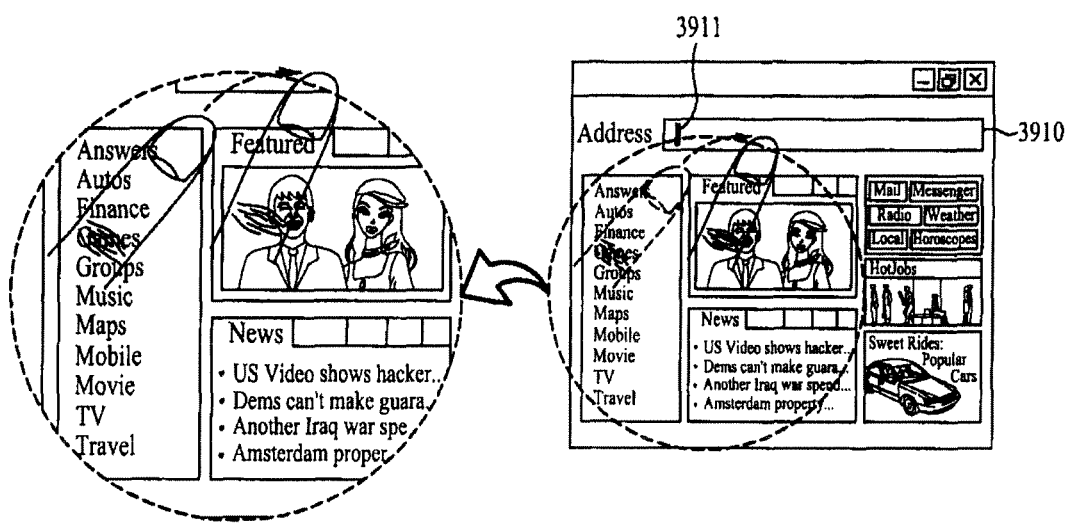

As illustrated in FIG. 40, when the spaced distance reaches a predetermined level or when the spaced distance is maintained for the predetermined time, the mobile terminal 100 may position a cursor for receiving the address in the address input window 3910.

Figure 41:
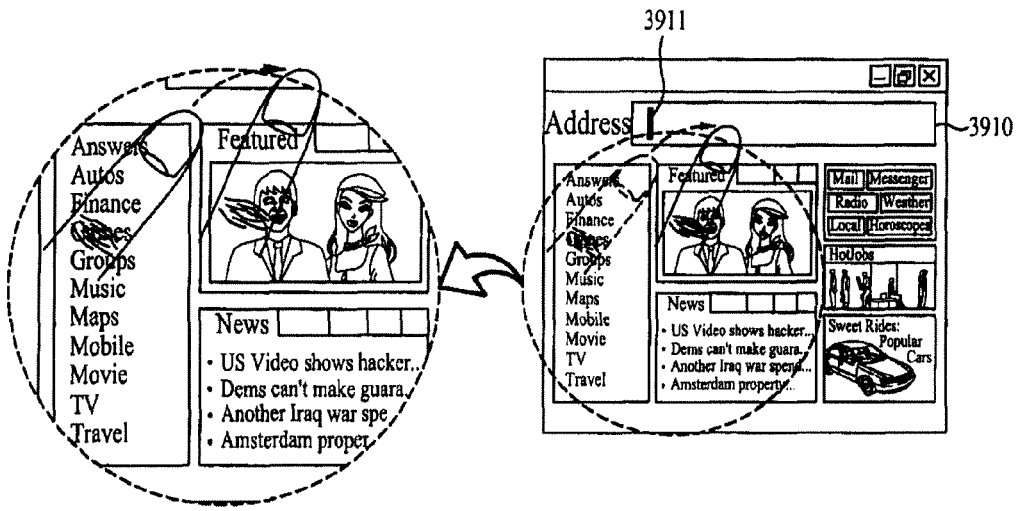

The mobile terminal 100 may expand the address input window 3910 when the spaced distance reaches a predetermined level or when the spaced distance is maintained for the predetermined time, FIG. 41.

Figure 42:
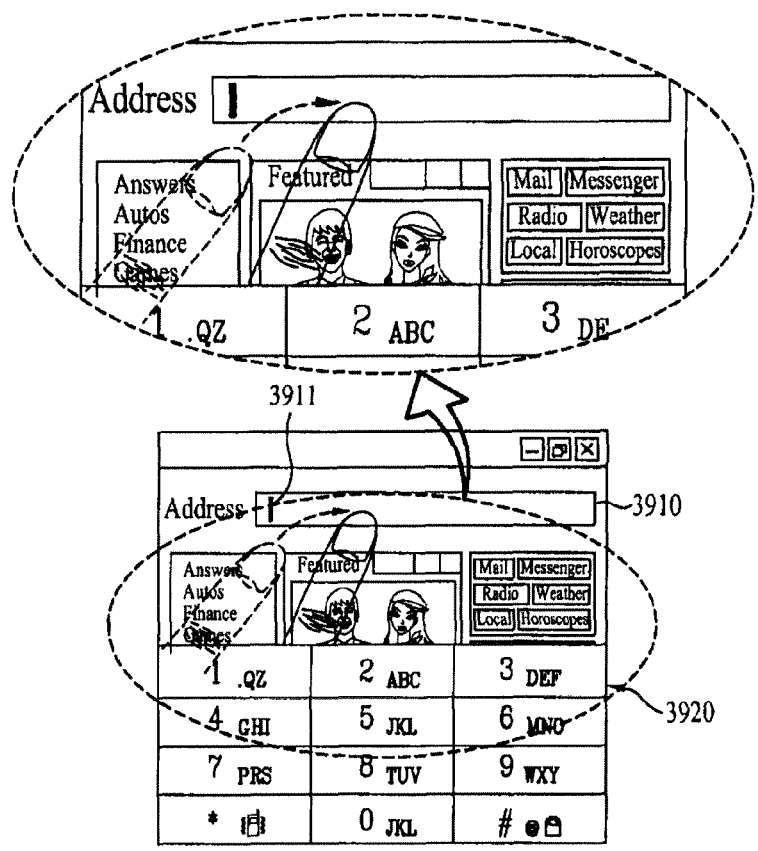

Additionally, the mobile terminal 100 can display a keypad 3920 for receiving the address from the user when the spaced distance reaches a predetermined level or when the spaced distance is maintained for the predetermined time, FIG. 42.

Figure 43:
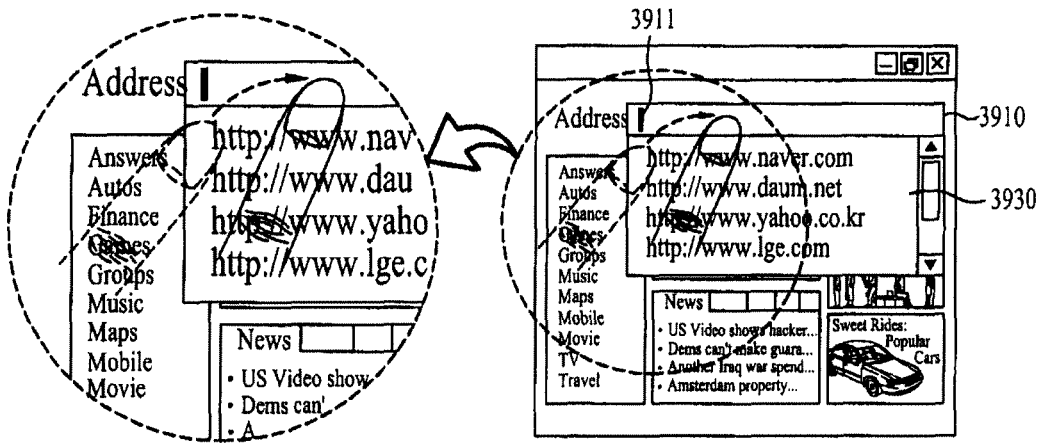

Finally, as illustrated in FIG. 43, the mobile terminal 100 can display a list 3930 configured of a plurality of addresses while displaying the address input window 3910 when the spaced distance reaches a predetermined level or when the spaced distance is maintained for the predetermined time. The address list may include a recent access list, an access frequency order list, a bookmark list, or a user designation list.

Furthermore, the mobile terminal 100 may display the address input window as a pop-up display when the spaced distance reaches a predetermined level or when the spaced distance is maintained for the predetermined time. The address input window displayed on the pop-up display may be expanded such that the pop-up display is greater than the address input window 3910.

The information selection process according to one embodiment of the present invention will be described with reference to FIGS. 44-48. FIGS. 44-48 illustrate the information selecting process in the mobile terminal when the information is text.

For convenience of explanation, it is assumed that the text is content included in a message. The text may include transceiving message contents, memo contents, electronic book contents, telephone numbers, names designated for the telephone numbers, conversation contents of instant messages, or text regions of the web page.

Figure 44:
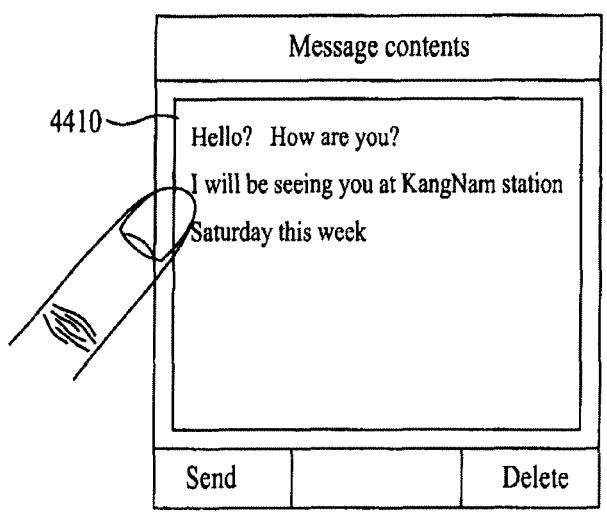
FIGS. 44-48 illustrate the information selection process in the mobile terminal according to one embodiment of the present invention when the information are texts.

As illustrated in FIG. 44, the mobile terminal 100 displays the message window 4410 on the display.

Figure 45:
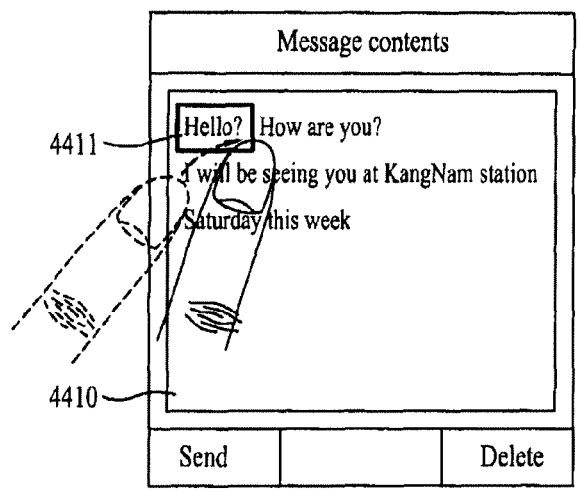
Figure 46:
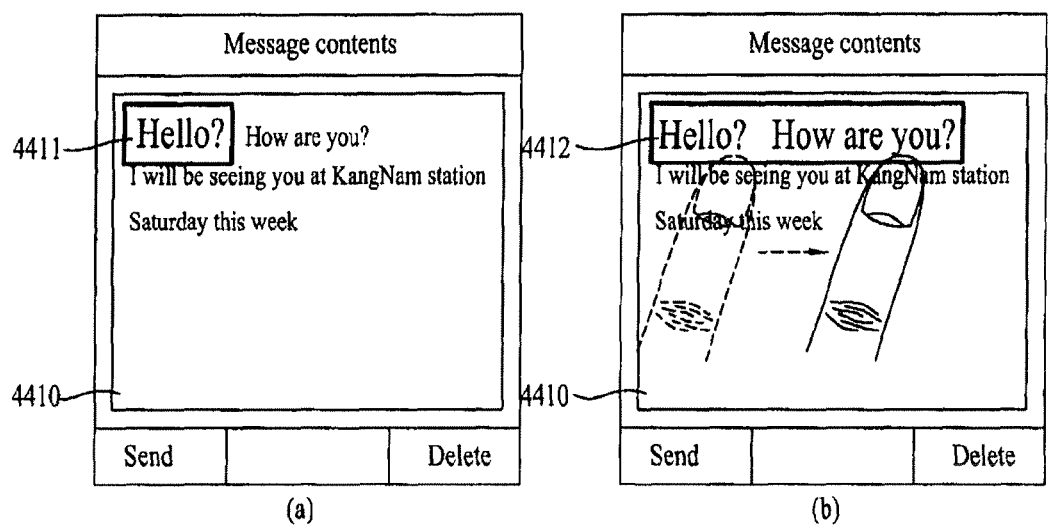

As illustrated in FIG. 45, the mobile terminal 100 may sense a proximity-touch and select a region of text, such as "Hello?", in the message window 4410. The selection may be enhanced when the spaced distance is reduced or the proximity-touch is maintained for a predetermined time.

Additionally, as illustrated in FIG. 46(a), the mobile terminal 100 may expand the "Hello?" region associated with a point indicated by the pointer in the message window 4410 when the spaced distance reaches a predetermined level. Furthermore, as illustrated in FIG. 46(b), a proximity-touch drag operation may select a region corresponding to the proximity-touch drag distance.

Figure 47:
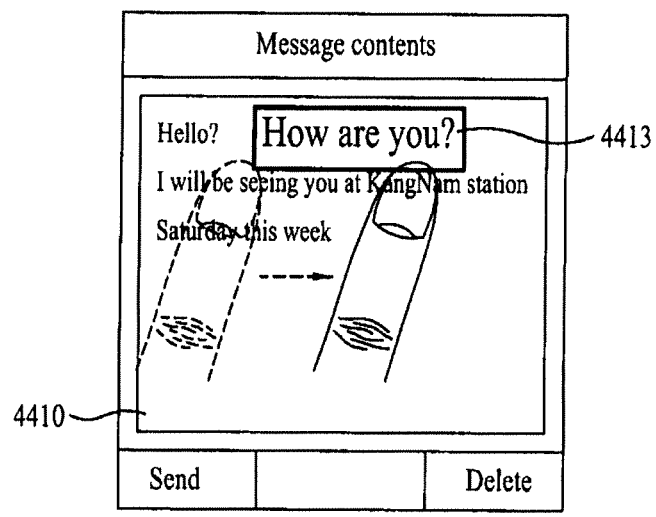

Moreover, the mobile terminal 100 may select other regions associated with the direction and position of the proximity-touch drag operation, FIG. 47.

Figure 48:
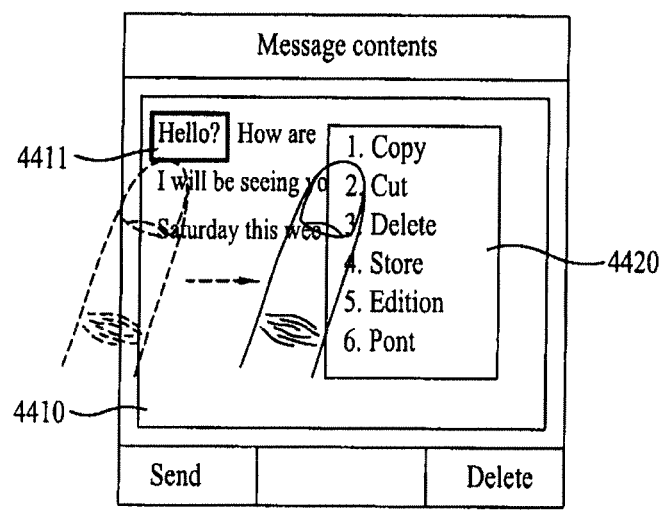

After a region in the message window 4410 is selected, the mobile terminal 100 may display a list 4420 of operations associated with the selected region when the spaced distance reaches a predetermined level or a specific proximity-touch operation is input, FIG. 48. The mobile terminal 100 may display the proximity-touch directions associated with executable operations associated with the selected region.

The mobile terminal 100 may execute the specific operation, when a specific operation is selected via the list 4420.

The information selection process according to one embodiment of the present invention will be described with reference to FIGS. 49-52. FIGS. 49-52 illustrate the information selecting process in the mobile terminal when the information is video communication related information.

Figure 49:
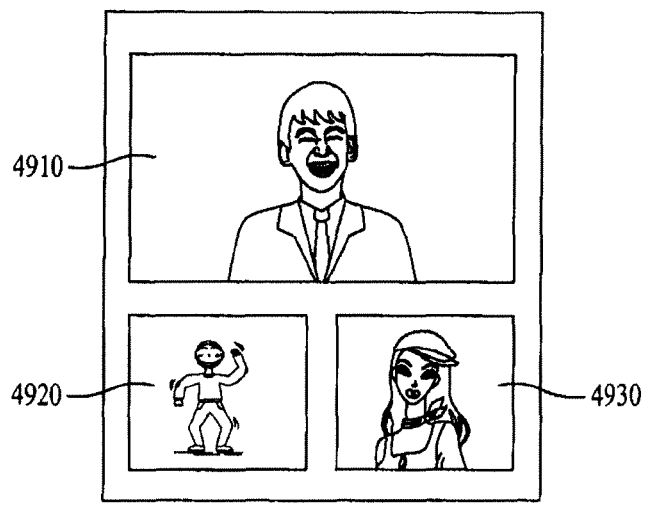
FIGS. 49-52 illustrate the information selection process in the mobile terminal according to one embodiment of the present invention when the information is video communication related information.

As illustrated in FIG. 49, the mobile terminal 100 may display a video image 4910, an alternate image region 4920, and a user's image 4930.

Figure 50:
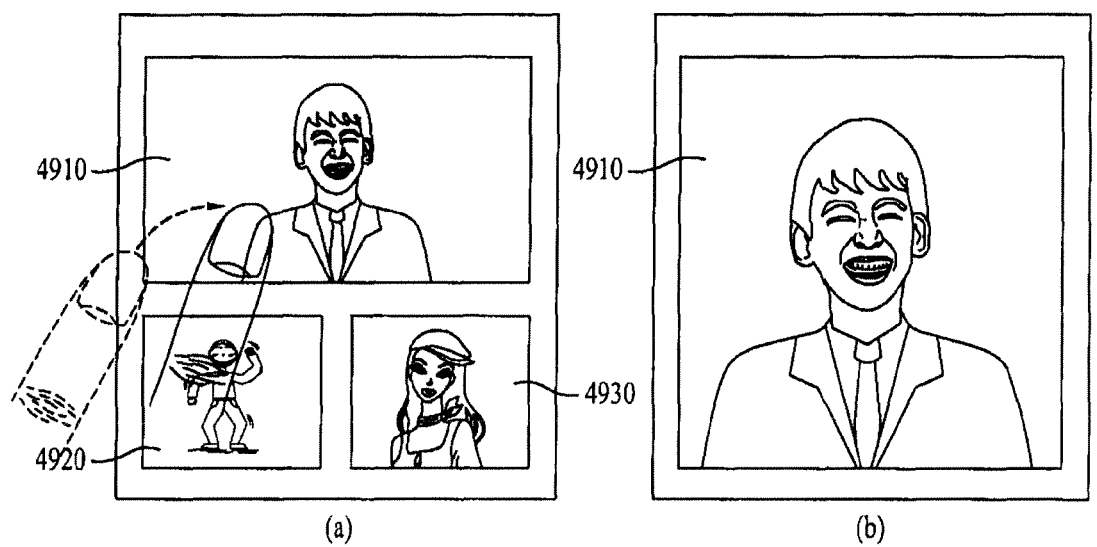

FIG. 50 illustrates a video expansion method. The mobile terminal 100 may expand the video image 4910 when the spaced distance reaches a predetermined level or if a proximity-touch is maintained for a predetermined time.

Figure 51:
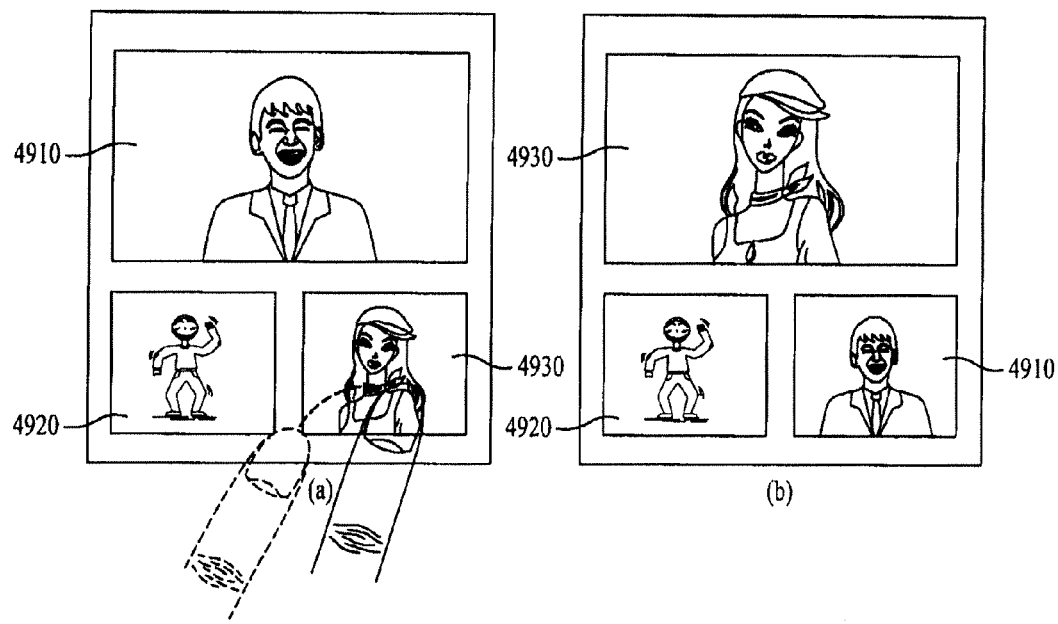

As illustrated in FIG. 51, the mobile terminal 100 may alternately display the display positions of the video image 4910 and the user's image 4930 in response to a proximity-touch. Additionally, the mobile terminal 100 may expand the user image 4930 according to the method of FIG. 50.

Figure 52:
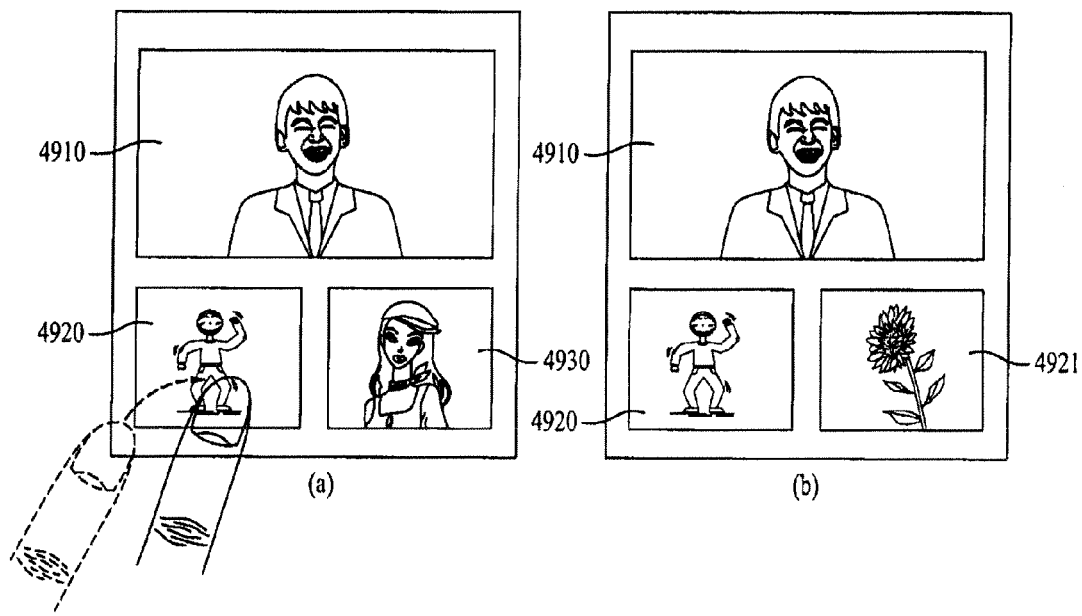

Furthermore, as illustrated in FIG. 52, the mobile terminal 100 may display the alternate image instead of the user's image 4910 in response to a proximity-touch.

The images of FIGS. 50-52 may return to a previous state when the spaced distance reaches a predetermined level.

According to the method of FIG. 5, the mobile terminal 100 may edit the selected information (S540). The editing operation may include at least one of a copy, a cut, a paste, and a delete.

Additionally, the mobile terminal 100 may inform the user of the editing via the output unit 150. For example, the mobile terminal may output a vibration, an alarm sound, or a light.

The information editing method in the mobile terminal according to one embodiment of the present invention will be described with reference to the FIGS. 53-59. FIGS. 53-59 illustrate the information editing process of the mobile terminal when the information is a menu icon.

For convenience of explanation, the menu icons are limited to the upper menu icon. Menu icons may include the lower menu icons and the menu icons may be displayed in various forms, such as an image, a symbol, a text, an animation, a flash, or an emoticon.

Figure 53:
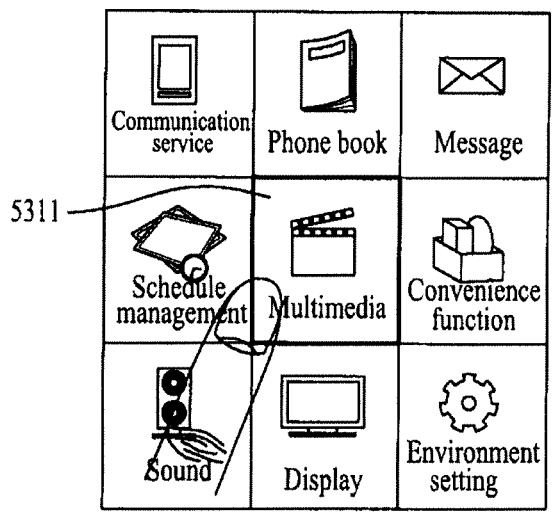

As illustrated in FIG. 53, when an icon 5311 is selected, the mobile terminal 100 may distinguish the selected icon 5311. The selecting process is the same as described above according to the various embodiments.

Figure 54A:
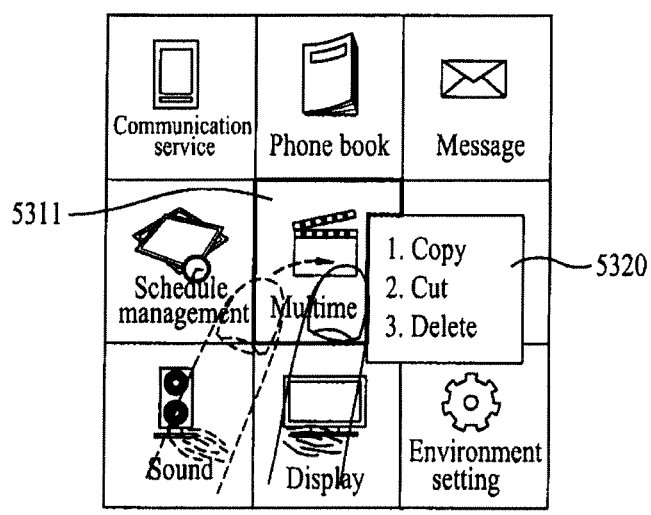
Figure 54B:
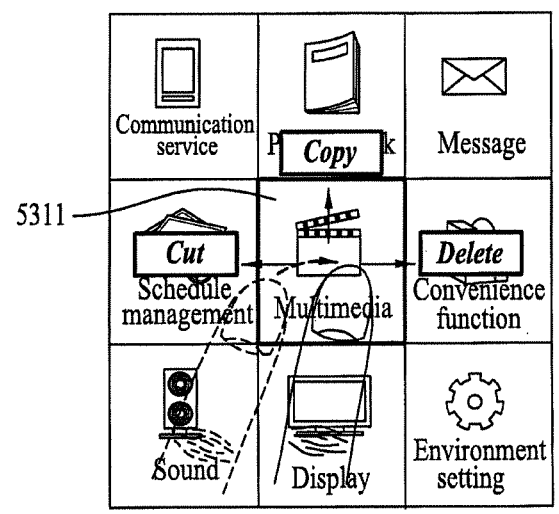

As illustrated in FIG. 54A, the mobile terminal 100 may display a list 5320 of executable operations for the selected icon 5311 in response to a proximity-touch. Additionally, the mobile terminal 100 may display proximity-touch directions associated with the respective executable operations for the selected icon 5311.

The mobile terminal 100 may execute the selected operation when a operation, such as "copy", "cut", or "delete", is selected from the list 5320.

Figure 55A:
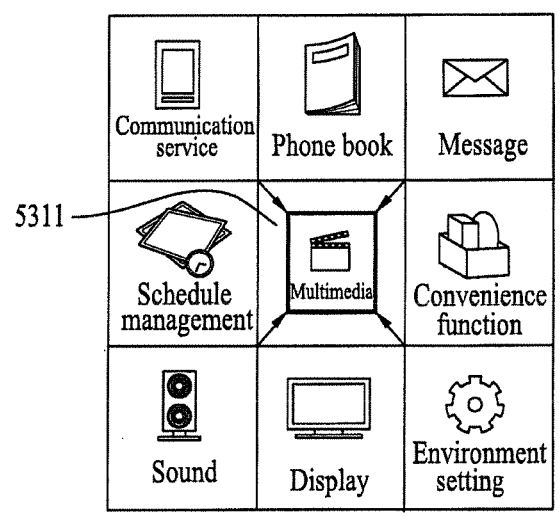
Figure 55B:
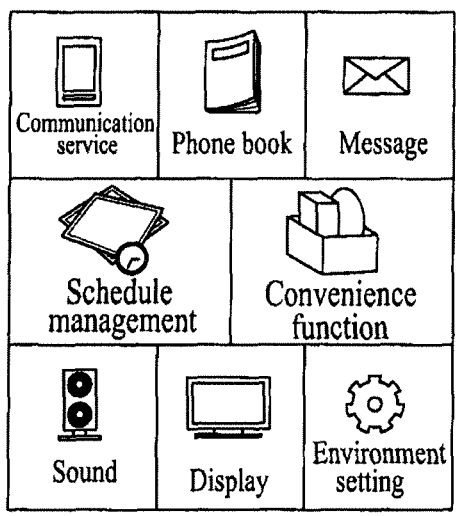

For example, the mobile terminal 100 may display to reduce the icon 5311, FIG. 55A, or may delete the icon 5311, FIG. 55B, according to the execution of any one of the "copy", the "cut", or the "delete". Additionally, the mobile terminal 100 may process the icon 5311 region as a blank, set the darkness/contrast to be relatively lower as compared to other upper menu icons, display the animation corresponding to the "copy", the "cut", or the delete", and display icon 5311 as the pointer. Furthermore, the mobile terminal 100 may output messages informing the execution of any one of the "copy", the "cut", and the "delete" on the display. Specifically, when the specific operation is the "copy", the icon 5311 is returned to an original state after a predetermined time.

Figure 56:
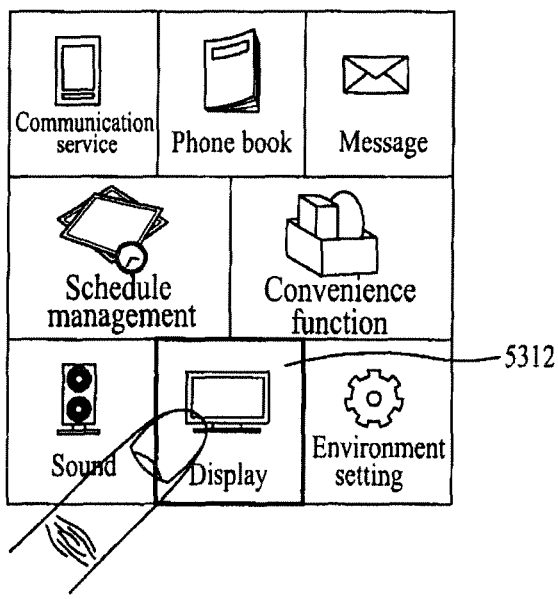

FIG. 56 illustrates selecting an icon associated with the display function of the mobile terminal 100. The mobile terminal 100 may execute the operations associated with the display when the display icon 5312 is selected via a proximity touch.

Figure 57A:
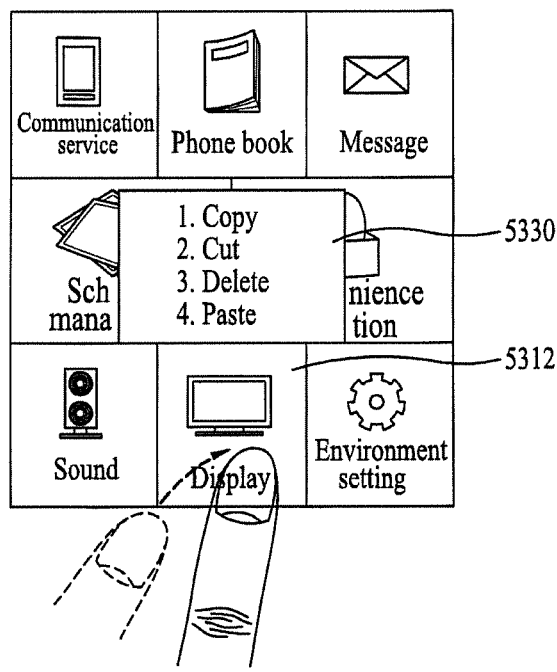
Figure 57B:
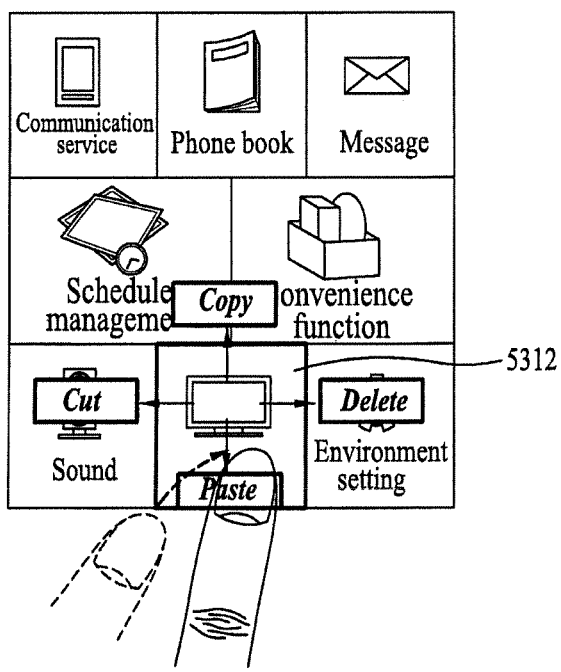

A list 5330 of the executable operations for the display icon 5312 may be displayed via a proximity-touch on the display icon 5312, FIG. 57A. Additionally, the proximity-touch directions associated with the executable operations for the display icon 5312 may displayed via a proximity-touch.

The mobile terminal 100 may execute a specific operation when an operation, such as, any one of the "copy", the "cut", the "delete", and the "paste", is selected.

Figures 58, 59:
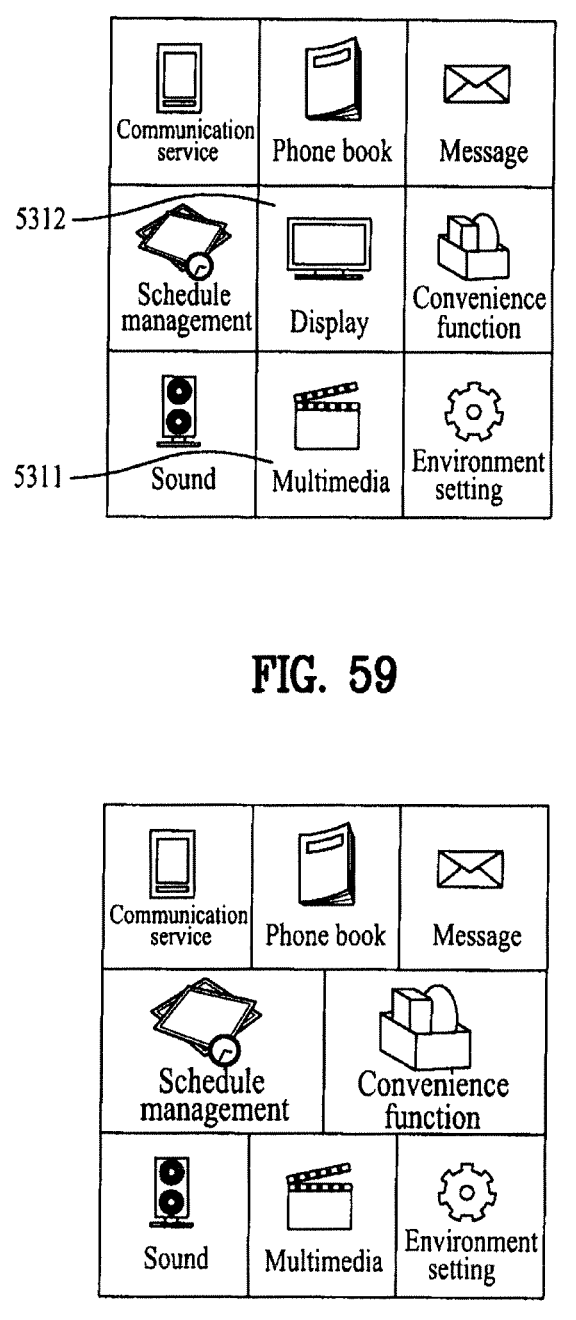

For example, the mobile terminal 100 may alternate the positions for the regions of the display icon 5312 and the icon 5311 when the icon 5311 is "copied" and then "pasted", FIG. 58. Additionally, the display icon 5312 may be removed if the "delete" or "cut" functions are selected.

Additionally, the mobile terminal 100 may temporarily expand the display region performing the "paste" to inform the user that the "paste" has been performed, and the region may return to an original state after the "paste" is performed, set the darkness/contrast to be higher as compared to other upper menu icons, or display the animation corresponding to the "paste". In addition, the display icon 5312 may be absorbed by the pointer. Furthermore, the mobile terminal 100 may output a message regarding the execution of the "paste" on the display.

The information editing process according to one embodiment of the present invention will be described with reference to the FIGS. 60-66. FIGS. 60-66 illustrate the information editing process in the mobile terminal when the information is a data list.

For convenience of explanation, the data list is limited to a text list. The data list may be displayed in various form, such as an image, an emoticon, or a data preview.

As illustrated in FIG. 60, when a "third data" 6011 is selected, the mobile terminal 100 may distinguish the "third data" 6011. The selection process is the same as above.

Figure 61B:
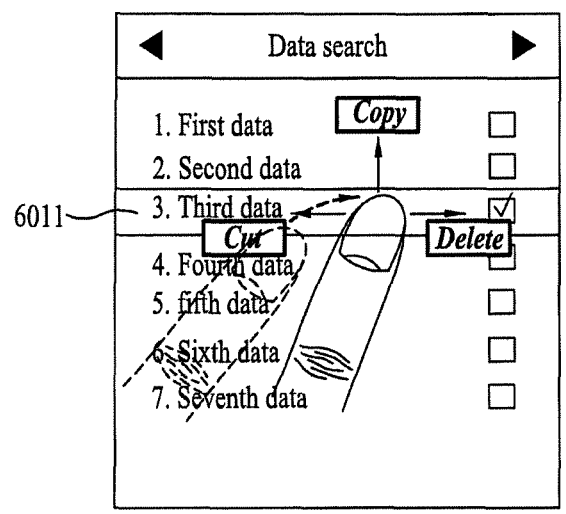

The mobile terminal 100 may display, FIG. 61A, a list 6020 of executable operations for the "third data" 6011, FIG. 61a, or display the proximity-touch directions associated with the respective executable operations, FIG. 61B, in response to a proximity touch.

The mobile terminal 100 may execute a specific operation when an operation, such as "copy", "cut", and "delete", is selected from the list 6020.

Figure 62A:
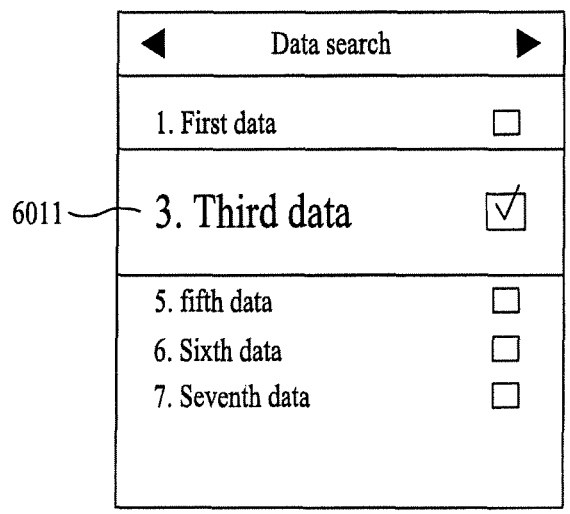

For example, the mobile terminal 100 may delete the "third data" 6011, FIG. 62C, by temporarily reducing the "third data" 6011, FIG. 62B, according to the execution of any one of the "copy", the "cut", and the "delete". The "third data" 6011 may be immediately be deleted without the temporary reduction process.

Additionally, the mobile terminal 100 may process the "third data" 6011 as a blank, set the darkness/contrast to be relatively lower as compared to other data names, display the animation corresponding to the "copy", the "cut", or the "delete". Furthermore, the "third data" 6011 may be absorbed by the pointer. Finally, the mobile terminal 100 may output messages informing the execution of any one of the "copy", the "cut", and the "delete" on the display. Specifically, when the specific operation is the "copy", the "third data" 6011 is returned to an original state after a predetermined time.

Figure 63:
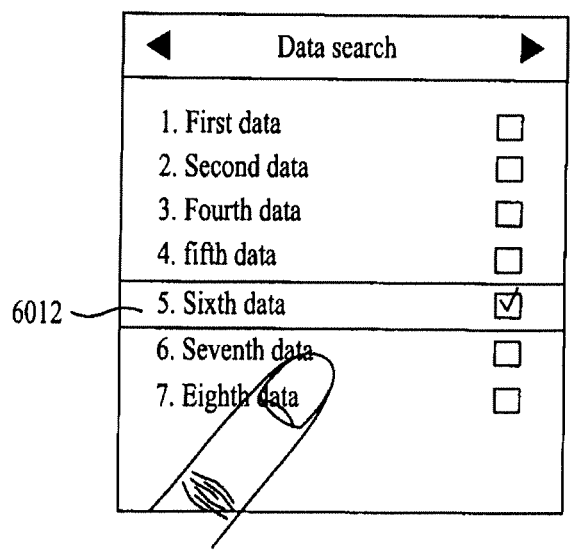

As illustrated in FIG. 63, when a "sixth data" 6012 of the plurality of data names is selected, the mobile terminal 100 may distinguish the "sixth data" 6012. The selection process is same as the process described above.

Figure 64A:
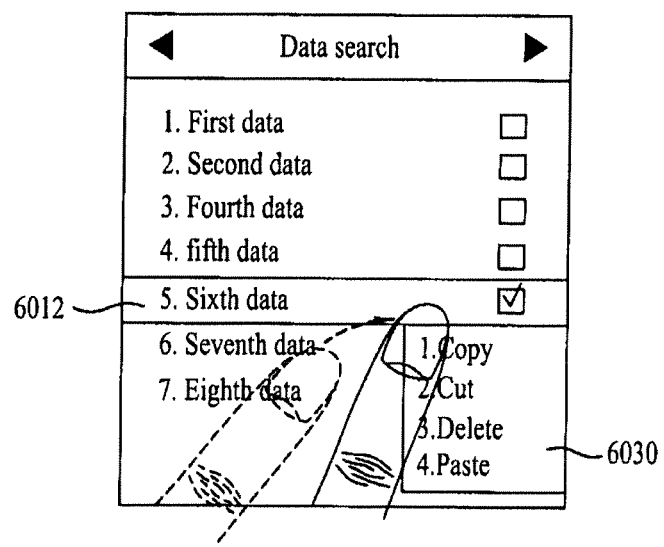
Figure 64B:
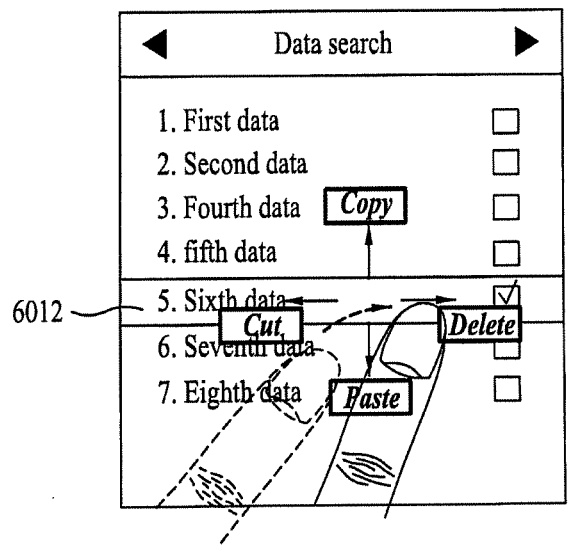

The mobile terminal 100 may display, FIG. 64A, a list 6030 of the executable operations for the "sixth data" 6012, FIG. 64A, or may display the proximity-touch directions associated with the executable operations for the "sixth data" 6012, FIG. 64B, in response to a proximity-touch.

The mobile terminal 100 may execute a selected operation, when an operation, such as "copy", "cut", "delete", and "paste", is selected from the list 6030.

Figure 65:
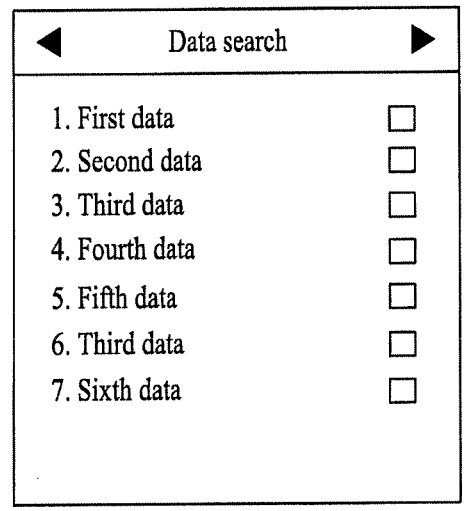
Figure 66:
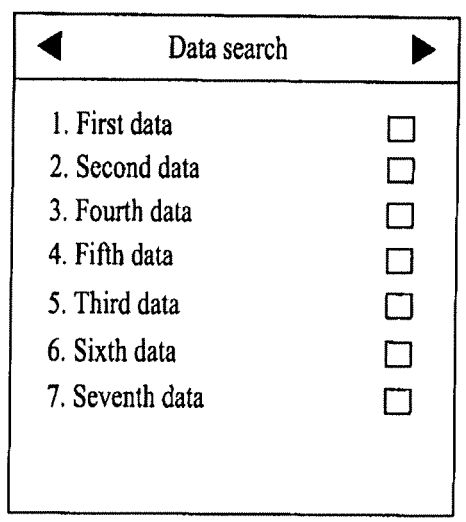

For example, all icons may be displayed when a "copy" function is selected. Thus, as illustrated in FIGS. 65 and 66, the mobile terminal 100 may display the "third data" 6011 on the "sixth data" 6012 when the "third data" 6011 is "copied", FIG. 65, or "cut", FIG. 66, and then "pasted". The "third data" 6011 is displayed twice in the data list of FIG. 65.

The information editing process according to one embodiment of the present invention will be described with reference to the FIGS. 67-72. FIGS. 67-72 illustrate the information editing process in the mobile terminal when the information is a still picture.

For convenience of explanation, the still pictures may be limited to a photograph. The still pictures may be displayed in various form, such as a web page, a map image, a capture image of moving images, an opponent/user image during the image communication, or a conversation display of instance message services.

Figure 67:
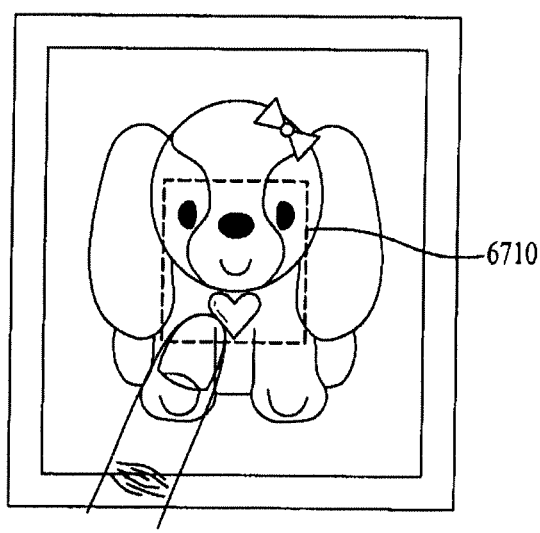
FIGS. 67-72 illustrate an information editing process in the mobile terminal according to one embodiment of the present invention when the information are still pictures.

As illustrated in FIG. 67, the mobile terminal 100 can display the photograph portions belonging to the "first region" 6710 when a first region 6710 in the photograph is selected. The selecting process is the same as described above.

Figure 68A:
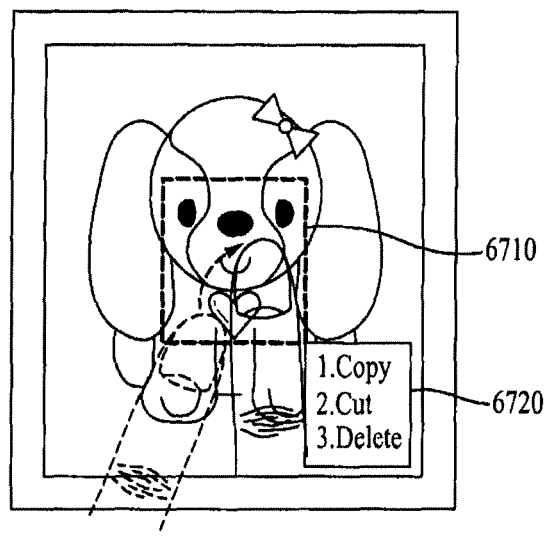
Figure 68B:
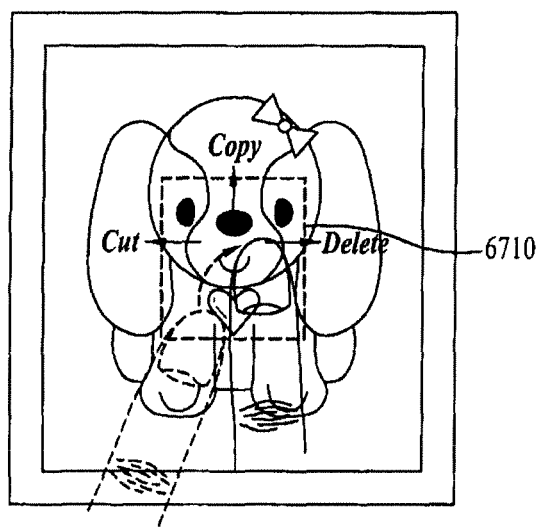

The mobile terminal 100 may display a list 6720 of executable operations for the photograph portions belonging to the "first region" 6710, FIG. 68A, or may display the proximity-touch directions associated with the respective executable operations for the photograph portions associated with the first region 6710, FIG. 68B, in response to a proximity touch.

The mobile terminal 100 may execute a selected operation, when a specific operation, such as "copy", "cut", and "delete", is selected from the list 6720.

Figure 69A:
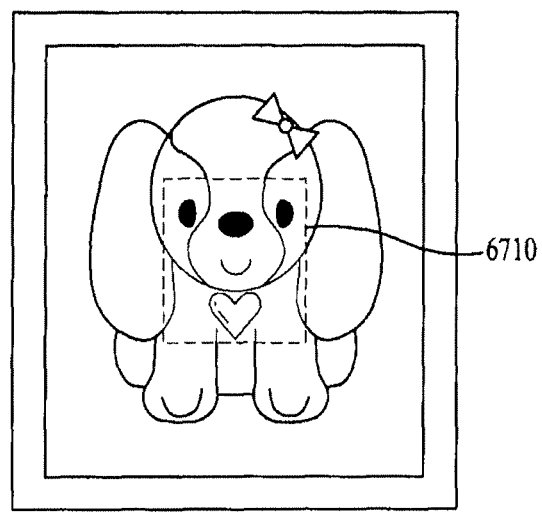
Figure 69B:
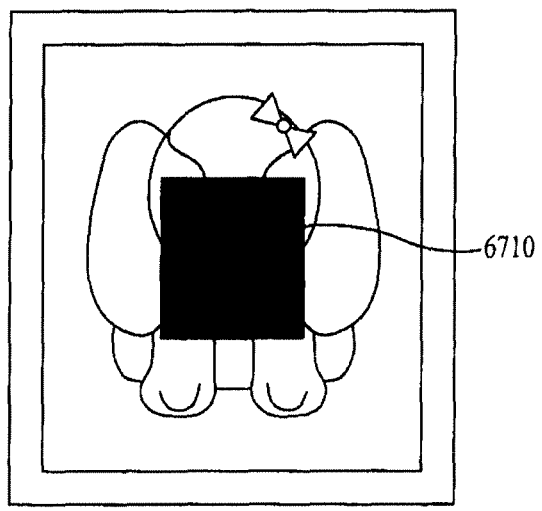

For example, the mobile terminal 100 may dim the photograph portions belonging to the first region 6710, FIG. 69B or may process the first region 6710 as a blank, according to the execution of any one of the "copy", the "cut", and the "delete".

Additionally, the mobile terminal 100 may display the photograph portions associated with the first region 6710 to be deleted by temporarily reducing the photograph portions, and display the animation associated with the "copy", the "cut", or the delete". In addition, the mobile terminal 100 may display the first region 6710 as absorbed in the pointer. Finally, the mobile terminal 100 may output a message informing the execution of any one of the "copy", the "cut", and the "delete" on the display. Specifically, when the specific operation is the "copy", the photograph portions associated with the first region 6710 is returned to an original state after a predetermined time.

Figure 70:
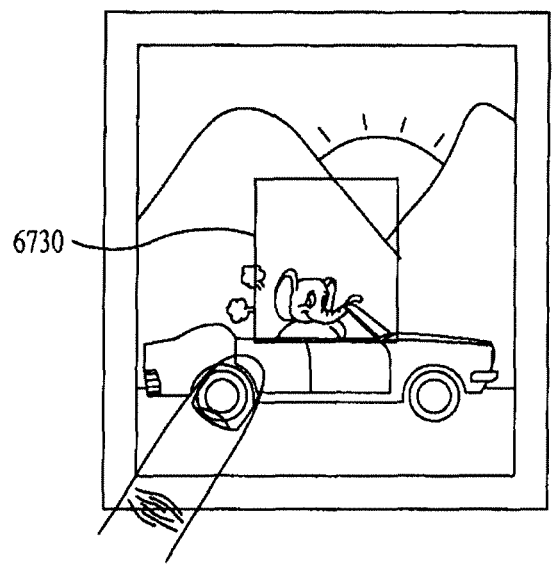

As illustrated in FIG. 70, the mobile terminal 100 may distinguish the photograph portion associated with the second region 6730, when a second region 6730 of the photographs is selected. The selecting process is the same as described above.

Figure 71A:
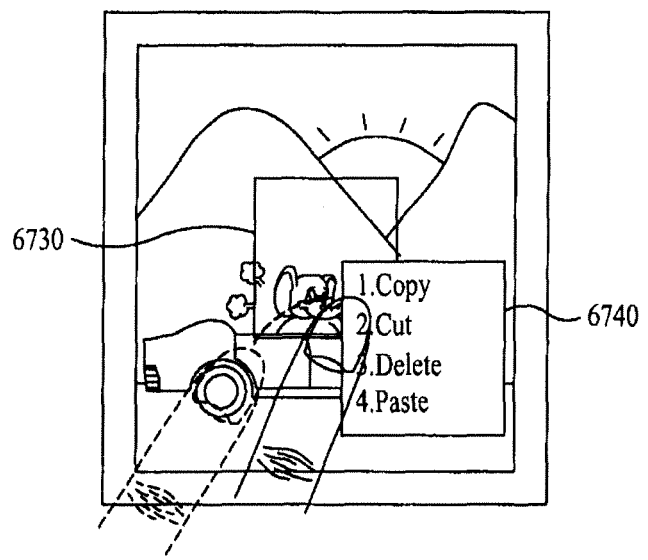
Figure 71B:
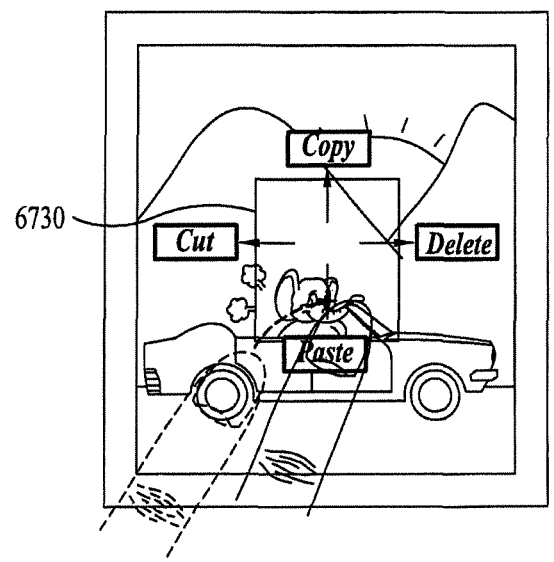

The mobile terminal 100 may display a list 6740 of executable operations for the photograph portion associated with the second region 6730, FIG. 71A, or may display the proximity-touch directions associated with the respective executable operations for the photograph portion associated with the second region 6730, FIG. 71B, in response to a proximity touch.

The mobile terminal 100 may execute a selected operation, when a specific operation, such as "copy", "cut", and "delete", is selected from the list 6740.

Figure 72:
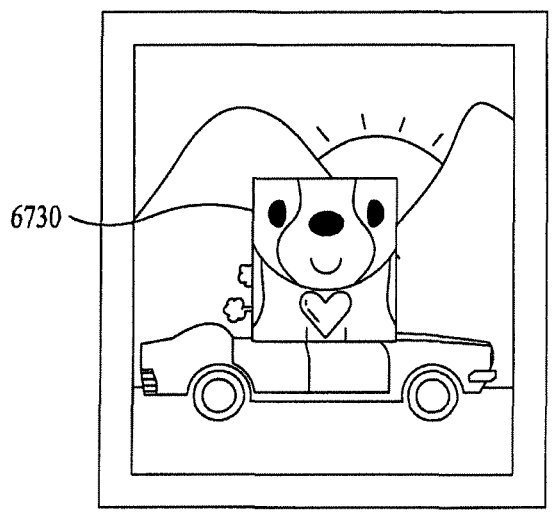

For example, the mobile terminal 100 may display the photograph portions associated with the second region 6730 by replacing them with the photograph portions belonging to the first region 6710 when the photograph portions associated with the first region 6710 are "copied" or "cut", FIG. 72.

Additionally, the mobile terminal 100 may temporarily expand the region performing the "paste" to inform that the "paste" is performed, set the darkness/contrast to be relatively higher as compared to the remaining portions other than the photograph portions associated with the second region 6730, or display the animation corresponding to the "paste". Also, the mobile terminal 100 may animate the first region 6710 being disbursed from the pointer during the "paste". Finally, the mobile terminal 100 may output messages informing the execution of the "paste".

The information editing process according to one embodiment of the present invention will be described with reference to the FIGS. 73-75. FIGS. 73-75 illustrate the information editing process in the mobile terminal when the information is a moving pictures.

Figure 73A:
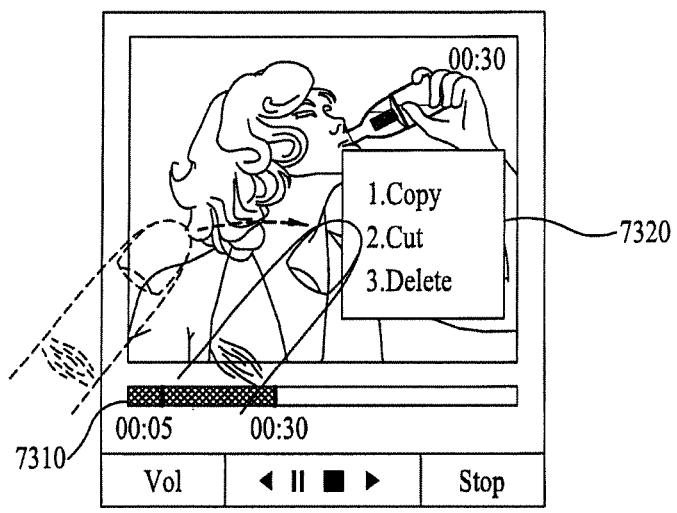
FIGS. 73-75 illustrate the information editing process in the mobile terminal according to one embodiment of the present invention when the information are moving pictures.
Figure 73B:
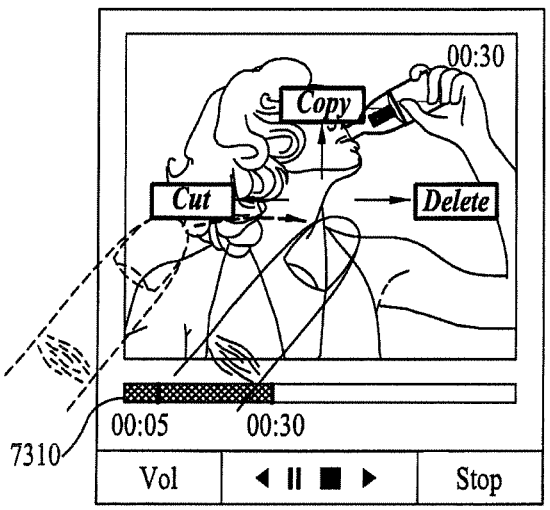

As illustrated in FIGS. 73A and 73B, the mobile terminal 100 may display a list 7320 of executable operations for the moving picture portions or may display the proximity-touch directions associated with the respective executable operations for the moving picture portions belonging to the first region 7310, in response to a proximity-touch.

The mobile terminal 100 may execute a selected operation, when a specific operation, such as "copy", "cut", and "delete", is selected from the list 7320.

The mobile terminal 100 may output a message informing the execution of any one of the "copy", the "cut", and the "delete" on the display. Additionally, after a predetermined time, the mobile terminal may display the indicator where the moving picture portions associated with the first region 7310 is returned to an original state if the selected operation is "copy".

Figure 74A:
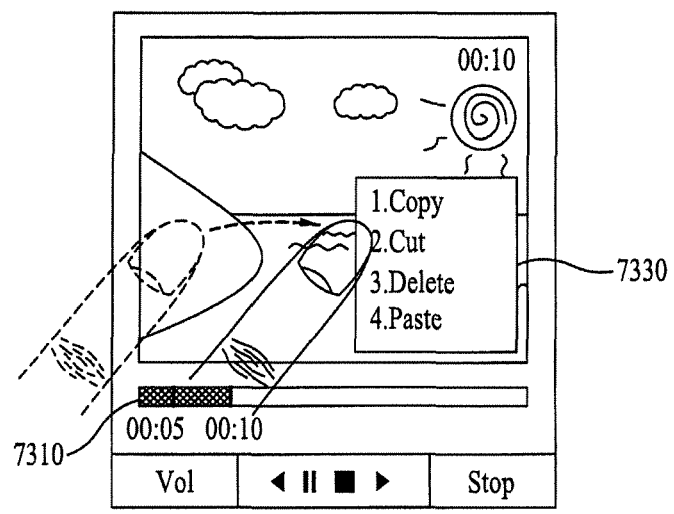
Figure 74B:
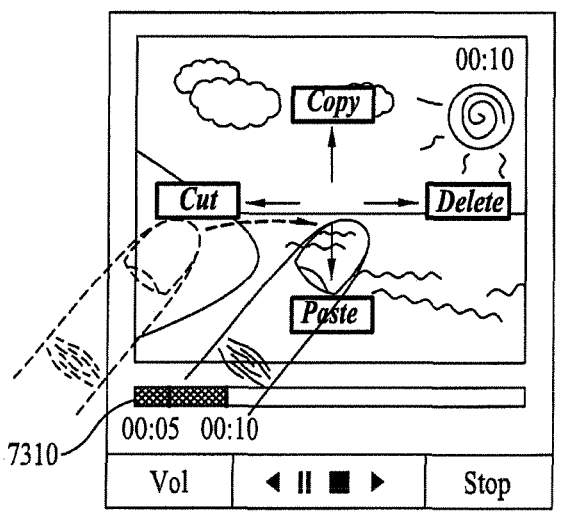
Figure 75:
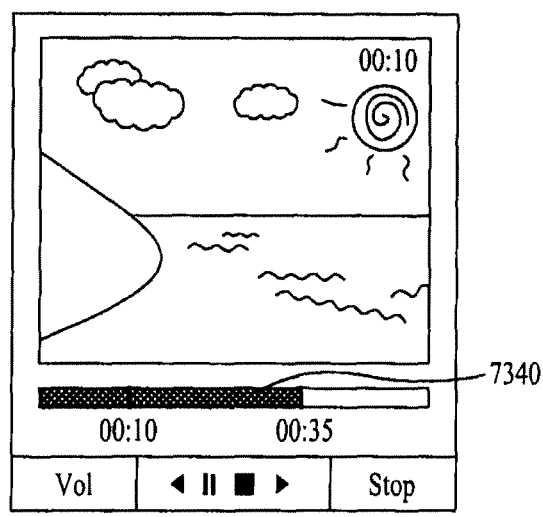

As illustrated FIGS. 74A and 74B, the mobile terminal may display a list 7330 of executable operations at the specific time or may display the proximity-touch directions associated with the respective executable operations at the specific timing, in response to a proximity-touch.

The mobile terminal 100 may execute a selected operation, when a specific operation, such as "copy", "cut", and "delete", is selected from the list 7330.

For example, when the moving picture portions associated with the first region 7310 are "copied" or "cut", the mobile terminal 100 may paste the moving picture portions associated with the first region 7310 at the specific time.

The mobile terminal 100 may temporarily expand the region performing the "paste" on the indicator to inform that the "paste" is performed, set the darkness/contrast to be relatively higher on the indicator as compared to other portions, or display the animation corresponding to the "paste". Additionally, the mobile terminal 100 may animate the first region 7310 being disbursed from the pointer during the "paste". Finally, the mobile terminal 100 may output messages informing the execution of the "paste".

The information editing process according to one embodiment of the present invention will be described with reference to the FIGS. 76-79. FIGS. 76-79 illustrate the information editing process in the mobile terminal when the information is text.

For convenience of explanation, the text is limited to message content. The text may include the transceiving message contents, the memo contents, the electronic book contents, the telephone numbers, the names designated for the telephone numbers, the conversation contents of instant messages, and the text regions of the web page.

Figure 76A:
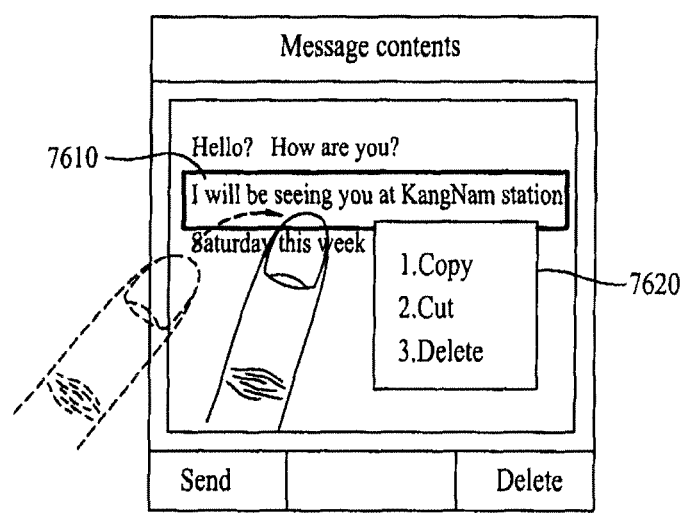
FIGS. 76-79 illustrate the information editing process in the mobile terminal according to one embodiment of the present invention when the information are texts.
Figure 76B:
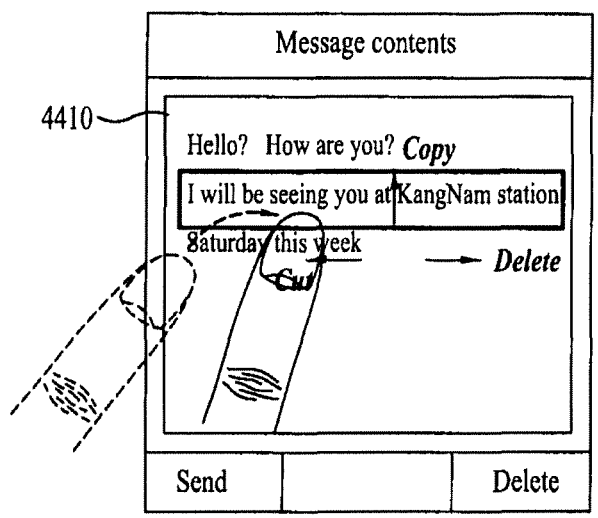

As illustrated in FIGS. 76A and 76B, the mobile terminal may display a list 7620 of executable operations for the "KangNam station Saturday this week" region 7610 or may display the proximity-touch directions associated with the respective executable operations for the "KangNam station Saturday this week" region 7610, in response to a proximity-touch.

Figure 77:
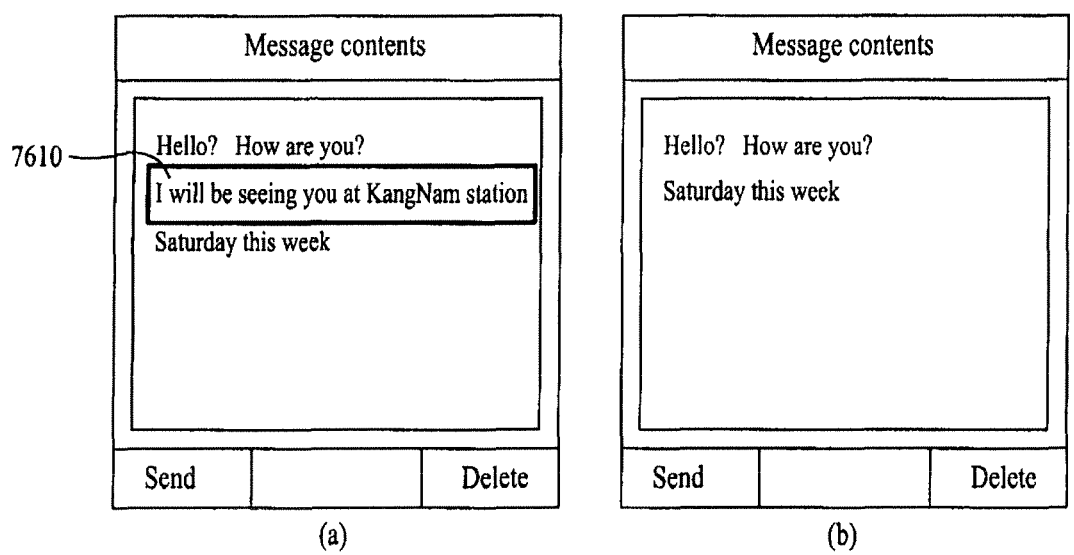

For example, as illustrated in FIG. 77, the mobile terminal 100 may display the "KangNam station Saturday this week" region 7610 by setting the darkness/contrast to be relatively lower as compared to other message contents according to the execution of any one of the "copy", the "cut", and the "delete". FIG. 77(b) illustrates the message content displayed when the delete function is executed.

Additionally, the mobile terminal 100 may temporarily reduce the "KangNam station Saturday this week" region 7610, process the "KangNam station Saturday this week" region 7610 as a blank, display the animation corresponding to the "copy", the "cut", or the delete". In addition, the mobile terminal 100 may animate the "KangNam station Saturday this week" region 7610 as absorbed in the pointer. Finally, the mobile terminal 100 may output messages informing the execution of any one of the "copy", the "cut", and the "delete" on the display. Specifically, when the specific operation is the "copy", the "KangNam station Saturday this week" region 7610 is returned to an original state after a predetermined time.

Figure 78A:
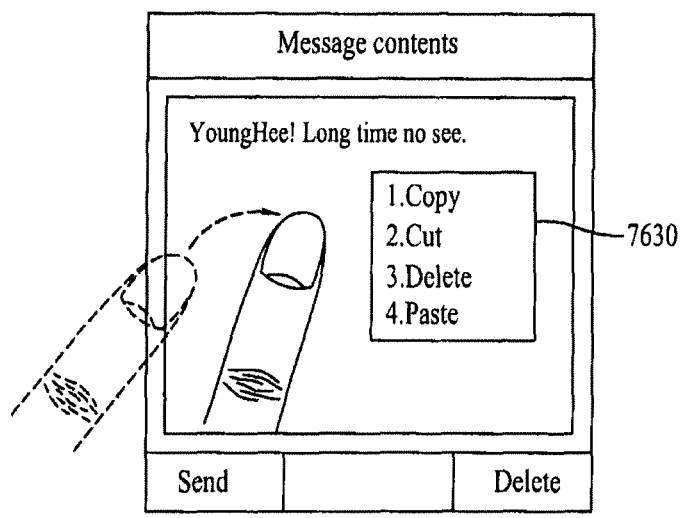
Figure 78B:
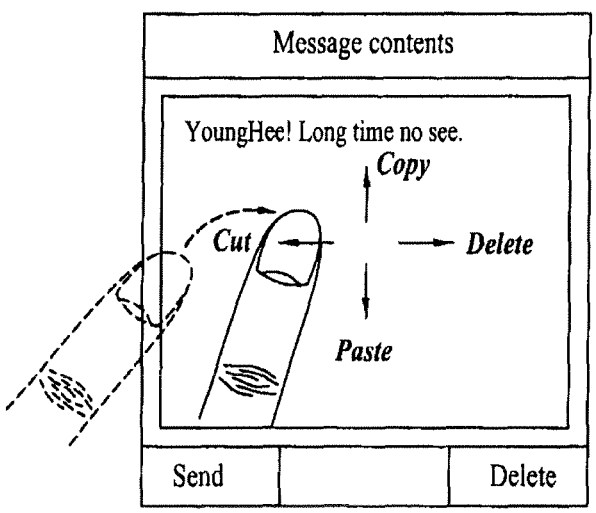

As illustrated in FIGS. 78A and 78B, the mobile terminal may display a list 7630 of executable operations for the specific point or may display the proximity-touch directions associated with the respective executable operations for the specific point, in response to a proximity-touch.

The mobile terminal 100 may execute a selected operation, when a specific operation, such as "copy", "cut", and "delete", is selected from the list 7630.

Figure 79:
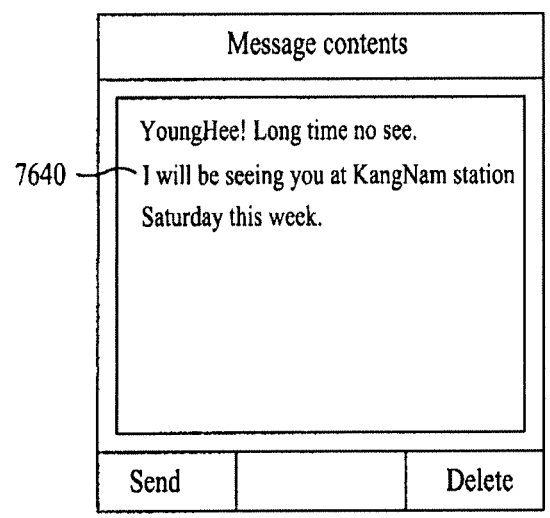

For example, when the "KangNam station Saturday this week" region 7610 is "copied" or "cut", the mobile terminal may display the "KangNam station Saturday this week" region 7610 by adding it to the specific point according to the execution of the "paste", FIG. 79.

Additionally, the mobile terminal 100 may temporarily expand the "KangNam station Saturday this week" region 7610, which is an object of the paste, to inform that the "paste" is performed, set the darkness/contrast to be relatively higher as compared to other message contents, or display the animation corresponding to the "paste". In addition, the mobile terminal 100 may animate the first region 7610 being disbursed from the pointer during the "paste". Finally, the mobile terminal 100 may output messages informing the execution of the "paste".

Furthermore, the mobile terminal 100 may display the copy, the cut, or the information, such as a menu icon, a data list, or an image text associated with the deleted portions.

Also, with one embodiment of the present invention, the aforementioned mobile terminal and the broadcast control method therein can be implemented by code in the medium recording the program readable by the computer. The medium readable by the computer includes all kinds of recording devices storing data readable by the computer system. Examples of the medium readable by the computer, include a ROM, a RAM, a CD-ROM, a magnetic tape, a floppy disk, an optical disk, an optical data storage, etc. and also include an object implemented by a form of a carrier wave (for example, transmission through an Internet). Also, the computer may include the controller 180 of the mobile terminal 100.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents The effect of the mobile terminal according to the present invention as described above and the method of displaying the information therein is as follows.

The information selecting operation is performed according to the sense of the proximity-touch and the proximity-touch pattern on the touchscreen, making it possible to effectively perform the information selecting operation.

What is claimed is:

1. A mobile terminal, comprising:
    a display unit including a touchscreen configured to display a plurality of menu items;
    a sensing unit configured to receive proximity touch input for selecting a menu item among the plurality of menu items;
    a controller configured to:
    select one menu item of the plurality of menu items indicated by the proximity touch when a distance between a pointer for inputting the proximity touch input and the touchscreen enters a first range;
    wherein as the distance between the pointer and the touchscreen is decreased, in response to the distance between the pointer and the touchscreen entering a second range whose maximum value is less than a maximum value of the first range, the controller is further configured to control the touchscreen to display a predetermined number of sub-menu items subordinated to the selected menu item;
    wherein the predetermined number of sub-menu items are determined based on an order of frequency of use or time of use among all sub-menu items subordinated to the selected menu item; and
    wherein as the distance between the pointer and the touchscreen is decreased, in response to the distance between the pointer and the touchscreen entering a third range whose maximum value is less than the maximum value of the second range, the controller is further configured to control the touchscreen to display a number of sub-menu items subordinated to the selected menu-item that is greater than the predetermined number of sub-menus;
    wherein in response to one of a number of sub-menu items being selected, the controller is configured to cause the display unit to display an overlaying interface selectable by the proximity touch input;
    wherein the overlaying interface comprises a plurality of editing operation icons related to the selected sub-menu item;
    wherein the plurality of editing operation icons comprise one or more visual direction indicators that display a corresponding position of the plurality of editing operation icons on the touchscreen; and
    wherein in response to detection of the proximity touch input moving in a specific direction indicated by the one or more visual direction indicators, the controller is configured to perform a corresponding editing operation of the plurality of editing operation icons.

2. The mobile terminal of claim 1, wherein the predetermined number of sub-menu items are displayed via a pop-up window overlapped displayed on the plurality of menu items.

3. The mobile terminal of claim 2, wherein if the distance between the pointer and the touch screen enters the third range, the controller is further configured to control the touchscreen to stop displaying the plurality of menu items and the pop-up window and then display an additional number of sub-menu items subordinated to the selected menu item.

4. The mobile terminal of claim 1, wherein when the menu item is selected, the controller is configured to visually change the selected menu item.

5. The mobile terminal of claim 4, wherein the controller is further configured to control at least one of a size of the selected menu item or a color of the selected menu item to be changed.

6. The mobile terminal of claim 1, wherein as the distance between the pointer and the touchscreen is increased, if the distance between the pointer and the touchscreen is changed from the second range to the first range, the controller is further configured to control the touchscreen to stop displaying the predetermined number of sub-menu items.

7. The mobile terminal of claim 1, wherein as the distance between the pointer and the touchscreen is increased, if the distance between the pointer and the touchscreen is changed from the third range to the second range, the controller is further configured to control the touchscreen to display the predetermined number of sub-menu items among all sub-menu items subordinated to the selected menu item.

8. The mobile terminal of claim 1, wherein if a location of the proximity touch is changed by a proximity drag input dragging the pointer in a specific direction, the controller is further configured to control the selected menu item to be changed based on the changed location of the proximity touch.

9. The mobile terminal of claim 1, wherein as the distance between the pointer and the touchscreen is decreased, if the distance between the pointer and the touchscreen enters a fourth range whose maximum value is less than the maximum value of the third range, the controller is further configured to control the touchscreen to display an image related to a specific sub-menu item indicated by the proximity touch.

10. An information selection method, the method comprising:
    displaying a plurality of menu items on a touchscreen;
    receiving proximity touch input for selecting a menu item among the plurality of menu items; and
    selecting one menu item of the plurality of menu icons indicated by the proximity touch when a distance between a pointer and the touchscreen enters a first range;
    wherein as the distance between the pointer and the touchscreen is decreased, in response to the distance between the pointer and the touchscreen entering a second range whose maximum value is less than a maximum value of the first range, the method further comprises:
    displaying a predetermined number of sub-menu items subordinated to the selected menu icon on the touchscreen;
    wherein the predetermined number of sub-menu-items are determined based on an order of frequency of use or time of use among all sub-menu items of the selected menu item,
    wherein as the distance between the pointer and the touchscreen is decreased, in response to the distance between the pointer and the touchscreen entering a third range whose maximum value is less than the maximum value of the second range, the method further comprises:

displaying a number of sub-menu items subordinated to the selected menu-item that is greater than the predetermined number of sub-menus on the touchscreen, wherein in response to one of a number of sub-menu items being selected, the method further comprises:

displaying an overlaying interface selectable by the proximity touch input wherein the overlaying interface comprises a plurality of editing operation icons related to the selected sub-menu item and the plurality of editing operation icons comprise one or more visual direction indicators that display a corresponding position of the plurality of editing operation icons on the touchscreen; and wherein in response to detection of the proximity touch input moving in a specific direction indicated by the one or more visual direction indicators, the method further comprises:

performing a corresponding editing operation of the plurality of editing operation icons.

* * * * *